US009026759B2

(12) United States Patent
Tomida et al.

(10) Patent No.: US 9,026,759 B2
(45) Date of Patent: May 5, 2015

(54) STORAGE SYSTEM MANAGEMENT APPARATUS AND MANAGEMENT METHOD

(75) Inventors: Takahiko Tomida, Yokohama (JP);
Katsutoshi Asaki, Yokohama (JP);
Takato Kusama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 63 days.

(21) Appl. No.: 13/388,880

(22) PCT Filed: Nov. 21, 2011

(86) PCT No.: PCT/JP2011/076826
§ 371 (c)(1),
(2), (4) Date: Feb. 3, 2012

(87) PCT Pub. No.: WO2013/076795
PCT Pub. Date: May 30, 2013

(65) Prior Publication Data
US 2013/0132696 A1 May 23, 2013

(51) Int. Cl.
*G06F 12/00* (2006.01)
*G06F 3/06* (2006.01)
*G06F 13/10* (2006.01)

(52) U.S. Cl.
CPC *G06F 3/06* (2013.01); *G06F 13/10* (2013.01); *G06F 3/0605* (2013.01); *G06F 3/0649* (2013.01); *G06F 3/0685* (2013.01)

(58) Field of Classification Search
USPC .......................................................... 711/165
See application file for complete search history.

(56) References Cited

U.S. PATENT DOCUMENTS

| 8,046,535 | B2 * | 10/2011 | Shibayama et al. .......... 711/114 |
| 2003/0140207 | A1 | 7/2003 | Nagase et al. |
| 2006/0047999 | A1 | 3/2006 | Passerini et al. |
| 2008/0209104 | A1 | 8/2008 | Tanaka et al. |
| 2009/0300283 | A1 | 12/2009 | Kudo |
| 2009/0300285 | A1 | 12/2009 | Nagai et al. |
| 2011/0161406 | A1 | 6/2011 | Kakeda et al. |
| 2011/0197044 | A1 | 8/2011 | Sudo et al. |
| 2011/0246745 | A1 * | 10/2011 | Fukui et al. ................... 711/209 |

(Continued)

FOREIGN PATENT DOCUMENTS

| EP | 2 378 409 A2 | 10/2011 |
| JP | 5-120091 | 5/1993 |

(Continued)

OTHER PUBLICATIONS

PCT International Search Report and Written Opinion on application PCT/JP2011/076826 mailed Feb. 7, 2012; 11 pages.
European Patent Office extended European search report on application EP 11 87 6332 mailed Feb. 26, 2015; 9 pages.

*Primary Examiner* — Aracelis Ruiz
(74) *Attorney, Agent, or Firm* — Foley & Lardner LLP

(57) ABSTRACT

The present invention is provided to make effective use of a storage area, and to enhance user usability. A management apparatus determines a reallocation destination of each logical storage area on the basis of an access load on each logical storage area by a host computer and an allocation status of each logical storage area in a storage-destination storage tier. A monitoring mode selection part for selecting any one of multiple monitoring modes selects a prescribed monitoring mode from the multiple monitoring modes on the basis of allocation time information related to a time at which each logical storage area is allocated to an allocation-destination storage tier.

20 Claims, 58 Drawing Sheets

(56) References Cited

U.S. PATENT DOCUMENTS

| | | | |
|---|---|---|---|
| 2011/0258405 A1* | 10/2011 | Asaki et al. | 711/162 |
| 2011/0283062 A1 | 11/2011 | Kumagai et al. | |
| 2012/0042124 A1 | 2/2012 | Miyamoto et al. | |
| 2012/0246386 A1 | 9/2012 | Akutsu et al. | |

FOREIGN PATENT DOCUMENTS

| | | |
|---|---|---|
| JP | 2007-066259 A | 3/2007 |
| JP | 2011-138321 A | 7/2011 |
| WO | WO 2011/029713 A1 | 3/2011 |
| WO | WO 2011/096017 A1 | 8/2011 |

* cited by examiner

FIG. 5

Physical page management table — T20

| Disk ID (C200) | Physical page ID (C201) |
|---|---|
| DISK1 | PP11 |
|  | PP12 |
| DISK2 | PP21 |
|  | PP22 |
| DISK3 | PP31 |
| ... | ... |

FIG. 6

Disk management table — T21

| Disk ID (C210) | Disk type (C211) | RAID level (C212) |
|---|---|---|
| DISK1 | SSD | RAID5 |
| DISK2 | SAS | RAID5 |
| DISK3 | SATA | RAID1 |
| ... | ... | ... |

FIG. 7

| Tier management table | |
|---|---|
| C220 | C221 |
| Tier ID | Disk ID |
| TIER11 | DISK1 |
| TIER12 | DISK2 |
| TIER13 | DISK3 |
| TIER21 | DISK4 |
| ... | ... |

Pool tier management table T23

| Pool ID C230 | Tier ID C231 | Characteristics C232 | Performance ranking C233 | Permissible number of I/Os C234 | |
|---|---|---|---|---|---|
| | | | | Lower-limit value | Upper-limit value |
| POOL1 | TIER11 | Disk type = SSD, RAID level = 5 | 1 | 100 | None |
| | TIER12 | Disk type = SAS, RAID level = 5 | 2 | 30 | 99 |
| | TIER13 | Disk type = SATA, RAID level = ANY | 3 | 0 | 29 |
| ... | ... | ... | ... | ... | ... |

FIG. 9

Logical page management table — T24

| Pool ID (C240) | Virtual volume ID (C241) | Logical page ID (C242) | Number of I/Os (C243) | Tier ID (C244) |
|---|---|---|---|---|
| POOL1 | VVOL1 | LP11 | 130 | TIER11 |
|  |  | LP12 | 111 | TIER11 |
|  |  | LP13 | 25 | TIER13 |
|  | VVOL2 | LP21 | 76 | TIER11 |
|  | VVOL3 | LP31 | 102 | TIER12 |
| ... | ... | ... | ... | ... |

FIG. 10

| Physical page-logical page association management table T25 | |
|---|---|
| Physical page ID C250 | Logical page ID C251 |
| PP11 | LP11 |
| PP12 | LP12 |
| PP21 | LP21 |
| PP22 | LP13 |
| PP31 | Unused |
| PP32 | LP31 |
| ... | ... |

| Application management table ||
|---|---|
| C300 | C301 |
| Application ID | Virtual volume ID |
| AP1 | VVOL1 |
| | VVOL3 |
| AP2 | VVOL2 |
| ... | ... |

FIG. 13

Logical page actual load data history table T31

| Application ID C310 | Pool ID C311 | Virtual volume ID C312 | Logical page ID C313 | Monitoring period C314 | Number of I/Os C315 | Tier ID C316 |
|---|---|---|---|---|---|---|
| AP1 | POOL1 | VVOL1 | LP11 | ... | ... | ... |
| | | | | 2011/10/10 8:00—9:00 | 26 | TIER13 |
| | | | | 2011/10/10 9:00—10:00 | 25 | TIER13 |
| | | | | 2011/10/10 10:00—11:00 | 67 | TIER12 |
| | | | | 2011/10/10 11:00—12:00 | 152 | TIER12 |
| | | | | 2011/10/10 12:00—13:00 | 150 | TIER11 |
| | | | | 2011/10/10 13:00—14:00 | 142 | TIER11 |
| | | | | 2011/10/10 14:00—15:00 | 90 | TIER11 |
| | | | | 2011/10/10 15:00—16:00 | 131 | TIER11 |
| | | | | 2011/10/10 16:00—17:00 | 130 | TIER11 |
| | | | | ... | ... | ... |
| | | | LP12 | 2011/10/10 9:00—10:00 | 112 | TIER11 |
| | | | LP13 | 2011/10/10 9:00—10:00 | 80 | TIER12 |
| | | | ... | ... | ... | ... |
| ... | | | | | | |

FIG. 14

Logical page load evaluation data history table T32

| C320 | C321 | C322 | C323 | C324 | C325 | | C326 | |
|---|---|---|---|---|---|---|---|---|
| | | | | | Number of I/Os evaluation value | | Next tier ID | |
| Application ID | Pool ID | Virtual volume ID | Logical page ID | Evaluation-target monitoring period | Single mode | Multiple mode | Single mode | Multiple mode |
| AP1 | POOL1 | VVOL1 | LP11 | ... | ... | ... | ... | ... |
| | | | | 2011/10/10 8:00–9:00 | 26 | 27 | TIER13 | TIER13 |
| | | | | 2011/10/10 9:00–10:00 | 25 | 26 | TIER13 | TIER13 |
| | | | | 2011/10/10 10:00–11:00 | 67 | 39 | TIER12 | TIER12 |
| | | | | 2011/10/10 11:00–12:00 | 152 | 77 | TIER11 | TIER12 |
| | | | | 2011/10/10 12:00–13:00 | 150 | 102 | TIER11 | TIER11 |
| | | | | 2011/10/10 13:00–14:00 | 142 | 115 | TIER11 | TIER11 |
| | | | | 2011/10/10 14:00–15:00 | 90 | 107 | TIER12 | TIER11 |
| | | | | 2011/10/10 15:00–16:00 | 131 | 115 | TIER11 | TIER11 |
| | | | | 2011/10/10 16:00–17:00 | 130 | 120 | TIER11 | TIER11 |
| | | | | ... | ... | ... | ... | ... |
| | | | LP12 | 2011/10/10 9:00–10:00 | 112 | 122 | TIER11 | TIER11 |
| | | | | ... | ... | ... | ... | ... |
| | | | LP13 | 2011/10/10 9:00–10:00 | 80 | 81 | TIER12 | TIER12 |
| | | | | ... | ... | ... | ... | ... |
| ... | | | | | | | | |

FIG. 15

Monitoring method definition table T33

| C330 | C331 | C332 | C333 | C334 |
|---|---|---|---|---|
| Monitoring method ID | I/O load evaluation function | Number of monitoring periods | Less-than-reference-value monitoring method ID | Equal-to-or-larger-than-reference-value monitoring method ID |
| Single period mode | I=i_latest | 1 | Single period mode | Multiple periods average mode |
| Multiple Periods average mode | I=i_latest + i_latest-1 + ... + i_latest-n+1<br>Where n is number of past unit monitoring periods included in computation | 3 | Single period mode | Multiple periods average mode |

FIG. 16

Pool tier management table T34

| Pool ID C340 | Tier ID C341 | Characteristics C342 | Performance ranking C343 | Permissible number of I/Os C344 ||
|---|---|---|---|---|---|
| | | | | Lower-limit value | Upper-limit value |
| POOL1 | TIER11 | Disk type = SSD, RAID level = 5 | 1 | 100 | None |
| | TIER12 | Disk type = SAS, RAID level = 5 | 2 | 30 | 99 |
| | TIER13 | Disk type = SATA, RAID level = ANY | 3 | 0 | 29 |
| ... | ... | ... | ... | ... | ... |

FIG. 17

Logical page tier residence ratio history table T35

| Logical page ID (C350) | Evaluation-target monitoring period (C351) | Tier residence ratio (C352) | |
|---|---|---|---|
| | | Single period mode | Multiple periods average mode |
| LP11 | ... | ... | ... |
| | 2011/10/10 8:00–9:00 | 0 | 0 |
| | 2011/10/10 9:00–10:00 | 0 | 0 |
| | 2011/10/10 10:00–11:00 | 0 | 0 |
| | 2011/10/10 11:00–12:00 | 33 | 0 |
| | 2011/10/10 12:00–13:00 | 67 | 33 |
| | 2011/10/10 13:00–14:00 | 100 | 67 |
| | 2011/10/10 14:00–15:00 | 67 | 100 |
| | 2011/10/10 15:00–16:00 | 67 | 100 |
| | 2011/10/10 16:00–17:00 | 67 | 100 |
| | ... | ... | ... |
| LP12 | 2011/10/10 9:00–10:00 | 67 | 33 |
| LP13 | 2011/10/10 9:00–10:00 | 0 | 0 |
| ... | ... | ... | ... |

FIG. 18

| Tier residence ratio computation monitoring period management table | T36 |
|---|---|
| Number of computation-target monitoring periods | 3 |

| Tier residence ratio reference value management table ||
| C370 | C371 |
| Virtual volume ID | Monitoring method switching reference value |
| VVOL1 | 70 |
| VVOL2 | 60 |
| VVOL3 | 70 |
| ... | ... |

FIG. 20

Logical page monitoring method history table T38

| Logical page ID (C380) | Evaluation-target monitoring period (C381) | Next candidate monitoring method ID (C382) |
|---|---|---|
| LP11 | ... | ... |
| | 2011/10/10 8:00—9:00 | Single period mode |
| | 2011/10/10 9:00—10:00 | Single period mode |
| | 2011/10/10 10:00—11:00 | Single period mode |
| | 2011/10/10 11:00—12:00 | Single period mode |
| | 2011/10/10 12:00—13:00 | Single period mode |
| | 2011/10/10 13:00—14:00 | Single period mode |
| | 2011/10/10 14:00—15:00 | Multiple periods average mode |
| | 2011/10/10 15:00—16:00 | Multiple periods average mode |
| | 2011/10/10 16:00—17:00 | Multiple periods average mode |
| | ... | ... |
| LP12 | 2011/10/10 9:00—10:00 | Multiple periods average mode |
| LP13 | 2011/10/10 9:00—10:00 | Single period mode |
| ... | ... | ... |

FIG. 21

Virtual volume selection monitoring method history table T39

| Virtual volume ID C390 | Evaluation-target monitoring period C391 | Next monitoring method ID C392 |
|---|---|---|
| VVOL1 | ... | ... |
| | 2011/10/10 8:00−9:00 | Single period mode |
| | 2011/10/10 9:00−10:00 | Single period mode |
| | 2011/10/10 10:00−11:00 | Single period mode |
| | 2011/10/10 11:00−12:00 | Single period mode |
| | 2011/10/10 12:00−13:00 | Single period mode |
| | 2011/10/10 13:00−14:00 | Single period mode |
| | 2011/10/10 14:00−15:00 | Multiple periods average mode |
| | 2011/10/10 15:00−16:00 | Multiple periods average mode |
| | 2011/10/10 16:00−17:00 | Multiple periods average mode |
| | ... | ... |
| VVOL2 | 2011/10/10 9:00−10:00 | Single period mode |
| VVOL3 | 2011/10/10 9:00−10:00 | Single period mode |
| ... | ... | ... |

FIG. 42

| Tier residence ratio reference value management table | | |
|---|---|---|
| C370 | C371 | C372 |
| Virtual volume ID | Monitoring method switching reference value | Correction method |
| VVOL1 | 70 | Automatic |
| VVOL2 | 60 | Manual |
| VVOL3 | 70 | Automatic |
| ... | ... | ... |

FIG. 48

Application group list screen G20

Application group list:

| Application group | Current monitoring method | Monitoring method switching reference value | Correction method |
|---|---|---|---|
| Database | Single period mode | 70 | Automatic |
| Web | Multiple periods average mode | 60 | Manual |
| Batch | Single period mode | 70 | Automatic |

OK    Create    Edit    Delete

| Application-group-unit tier residence ratio reference value management table ||||
|---|---|---|---|
| C400 | C401 | C402 | C403 |
| Application group ID | Current monitoring method ID | Monitoring method Switching reference value | Correction method |
| Database | Single period mode | 70 | Automatic |
| Web | Multiple periods average mode | 60 | Manual |
| Batch | Single period mode | 70 | Automatic |
| ... | ... | ... | ... |

FIG. 53

| Application group management table ||
| C410 | C411 |
| Application ID | Application group ID |
| AP1 | Database |
| AP2 | Web |
| AP3 | Database |
| AP4 | Batch |
| ... | ... |

T41

STORAGE SYSTEM MANAGEMENT APPARATUS AND MANAGEMENT METHOD

TECHNICAL FIELD

The present invention relates to a management apparatus and a management method for a storage system.

BACKGROUND ART

Technology, which utilizes hierarchized storage in units of pages for a more efficient storage system, is known (Patent Literature 1). This prior art defines multiple storage tiers in a logical pool, and allocates logical volumes to any tier of the multiple tiers on the basis of the performance of the individual logical volumes.

The storage system creates a virtual logical volume, and allocates this virtual logical volume to a host computer. The host computer performs either a write access or a read access with respect to a logical storage area (also called a logical page) comprising the virtual logical volume. When the host computer first accesses a logical page targeted for write access, a real storage area (also called a physical page) in the pool is associated with this logical page. Write data from the host computer is written to this physical page.

In a case where the host computer reads data from the virtual logical volume, the physical page storing the read-target data is identified based on the corresponding relationship between the logical page and the physical page. The storage system reads the read-target data from the identified physical page and sends this data to the host computer.

The association between a logical page and a physical page changes regularly in accordance with the amount of I/O (Input/Output) to the logical page. This change in the association is called page reallocation. The storage system monitors I/Os from the host computer to each logical volume, and stores the I/O load of each logical page. An I/O load threshold is defined beforehand for each storage tier in the pool. In a case where the I/O load of a certain logical page exceeds the threshold of the current allocation-destination storage tier, the storage system associates the data of this logical page with a physical page in a different storage tier. Generally speaking, as the I/O load of a logical page becomes larger, the data of this logical page is stored in a physical page of a higher performance storage tier. As the I/O load of the logical page becomes smaller, the data of this logical page is stored in a physical page of a lower performance storage tier.

CITATION LIST

Patent Literature

[PTL 1]
Japanese Patent Application Laid-open No. 2007-066259

SUMMARY OF INVENTION

Technical Problem

The page-unit hierarchical management technology of the past counts the number of I/Os within a predetermined monitoring period, thereby making it difficult to perform page reallocation in line with the utilization status of the virtual logical volume. For example, a case in which one virtual logical volume, which is used by one application program (hereinafter, application), and another virtual logical volume, which is used by another application, are created using a common pool will be explained.

It is assumed that the one application continues to perform a large number of I/Os for a relatively long period of time. In this case, even when the number of I/Os drops temporarily, for example, the data of the logical page of the one virtual logical volume, which is being used by the one application, should not be migrated to a low-performance storage tier. This is because the response performance would drop in a case where the one application once again accesses the data a great deal. This virtual logical volume will ultimately be reallocated to the original high-performance storage tier, and the temporary move to the low-performance storage tier is to no avail.

It is assumed that the time during which the other application continues to perform a large number of I/Os is relatively short. In this case, it is preferable that the data of the logical page of the other virtual logical volume, which is being used by the other application, be allocated to a low-performance storage tier in accordance with the drop in the number of I/Os. This is because allowing a page for which the number of I/Os has dropped to reside in a high-performance tier for a long time will prevent another page for which the number of I/Os is higher from being migrated to the high-performance tier.

From a management standpoint, manually setting the monitoring method for each virtual logical volume takes time and increases management costs.

With the foregoing problems in mind, an object of the present invention is to provide a management apparatus and a management method for a storage system, which make it possible to enhance usability. Another object of the present invention is to provide a management apparatus and a management method for a storage system, which enable more efficient use of the storage areas of the storage system, and, in addition, make it possible to improve usability from the management standpoint.

Solution to the Problem

A storage system management apparatus according to the present invention that solves for the above-mentioned problems is a management apparatus for managing the storage system. The storage system comprises a virtual logical volume to be provided to a host computer, and a pool comprising multiple storage tiers with respectively different performance, and, in addition, allocates multiple logical storage areas, which form the virtual logical volume, to a prescribed storage tier by associating the multiple logical storage areas with storage areas in a prescribed storage tier designated from among multiple storage tiers, and decides a reallocation destination for each logical storage area based on an access load placed on each logical storage area by the host computer and the allocation status of each logical storage area in the allocation-destination storage tier.

The management apparatus may comprise an information collection part for collecting prescribed information from the storage system, an access load evaluation part for evaluating the access load for each logical storage area, an allocation time information computation part for computing allocation time information related to the time at which each logical storage area is allocated to an allocation-destination storage tier as an allocation status, and a reallocation instruction part for deciding on a logical storage area to which any of the respective storage tiers is to be allocated on the basis of the access load and the allocation time information, for each logical storage area, and issuing an instruction to the storage system The management apparatus may comprise a monitoring mode selection part for selecting any one of multiple monitoring modes which have been prepared beforehand, and the access load evaluation part may evaluate the access loads of the logical storage areas based on the monitoring mode, which was selected from among the multiple monitoring modes.

The monitoring mode selection part is also able to select a prescribed monitoring mode from among the multiple monitoring modes based on allocation time information.

The allocation time information computation part calculates a ratio between the time at which the logical storage areas are allocated to the storage tier with the highest performance of the multiple storage tiers and a prescribed allocation reference period as the allocation time information, and the monitoring mode selection part is also able to select a prescribed monitoring mode from among the multiple monitoring modes by comparing the value of the allocation time information with a preconfigured monitoring mode selection reference value for selecting a prescribed monitoring mode from among the multiple monitoring modes.

The characteristic features of the present invention described hereinabove can be combined in various ways other than those specified. The present invention can also be understood as a computer program. The computer program is installed in a computer via either a communication medium or a recording medium.

BRIEF DESCRIPTION OF DRAWINGS

FIG. 5 shows an example of a physical page management table of the storage system.

FIG. 6 shows an example of a disk management table of the storage system.

FIG. 7 shows an example of a tier management table of the storage system.

FIG. 8 shows an example of a pool tier management table of the storage system.

FIG. 9 shows an example of a logical page management table of the storage system.

FIG. 10 shows an example of a table for managing a corresponding relationship between a physical page and a logical page of the storage system.

FIG. 12 shows an example of an application management table of the management server.

FIG. 13 shows an example of a table of the management server for managing a history of the actual load data (actual load data) of a logical page.

FIG. 14 shows an example of a table of the management server for managing a history of data obtained by evaluating the load of a logical page (evaluation data).

FIG. 15 shows an example of a table of the management server for defining a monitoring method.

FIG. 16 shows an example of a table of the management server for managing the tiers in the pool.

FIG. 17 shows an example of a table of the management server for managing a history of a tier residence ratio of a logical page.

FIG. 18 shows an example of a monitoring period management table of the management server for use in computing a tier residence ratio.

FIG. 19 shows an example of a table of the management server for managing a reference value of the tier residence ratio.

FIG. 20 shows an example of a table of the management server for managing a history of the monitoring methods of a logical page.

FIG. 21 shows an example of a table of the management server for managing a history of the monitoring methods selected for monitoring a virtual volume.

FIG. 42 shows an example of a management server table for managing tier residence ratio reference values.

FIG. 48 is an example of an application group list screen displayed by the management server.

FIG. 52 shows an example of a management server table for managing the reference values of the tier residence ratio in units of application groups.

FIG. 53 is an example of an application group management table of the management server.

DESCRIPTION OF THE EMBODIMENT

The embodiment of the present invention will be explained below based on the drawings. In the embodiment, as will be described further below, the monitoring method for use in a page reallocation is automatically selected in accordance with the actual utilization status of the virtual logical volume.

In the following explanation, various types of information may be explained using the expression "xxx table", but the various information may also be expressed using a data structure other than a table. To show that the various information is not dependent on the data structure, "xxx table" can be called "xxx information".

In the following explanation, there may be cases where the processing is explained having a "program" as the doer of the action. The stipulated processing is executed in accordance with a program being executed by a processor (for example, a CPU (Central Processing Unit)) while using a memory or other such storage resource and a communication port or other communication interface device as needed. Therefore, the processor may also be the doer of the processing. The processor may comprise dedicated hardware in addition to the CPU. A computer program may be installed in a computer from a program source. The program source, for example, may be either a program delivery server or a storage medium.

For example, each element, such as a pool volume, can be identified using an identifier (ID), a number, or a name.

One example of the present invention will be explained below using the drawings. The present invention is not limited to the examples described hereinbelow, and various applications, which coincide with the idea of the present invention, are included in the technical scope of the present invention. Unless expressly limited, the respective components may be either plural or singular.

EXAMPLE 1

Figure 1:
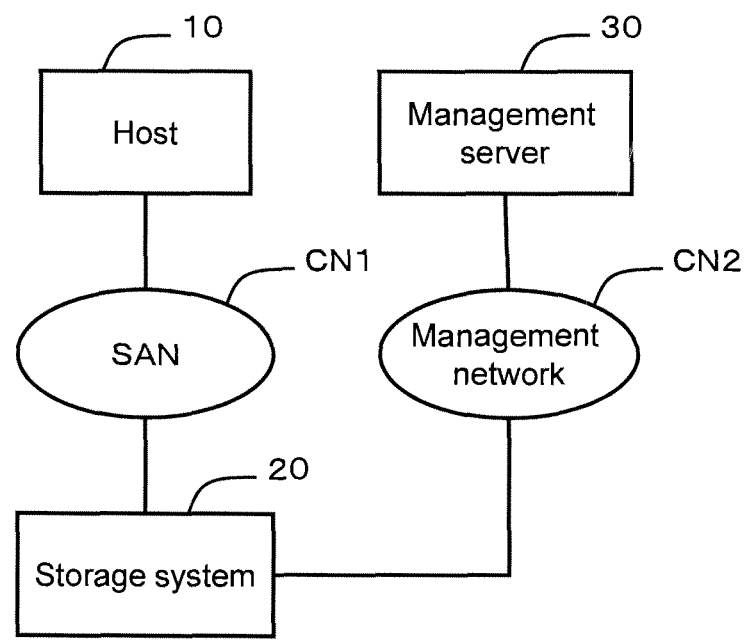
FIG. 1 shows an example of the configuration of a computer system comprising a storage system management apparatus.

FIG. 1 shows the overall configuration of a computer system. The computer system comprises at least one host computer (hereinafter, host) 10, at least one storage system 20, and one management server 30.

The host 10 and the storage system 20, for example, are coupled so as to be able to communicate in both directions via a communication network CN1 such as an IP-SAN (Internet Protocol-SAN) or a FC-SAN (Fibre Channel-Storage Area Network). The management server 30 and the storage system 20, for example, are coupled so as to be able to communicate in both directions via a management communication network CN2, such as a LAN (Local Area Network). For example, in a case where an iSCSI (internet Small Computer System Interface) is used, the communication networks CN1 and CN2 may be configured as a single LAN.

Figure 2:
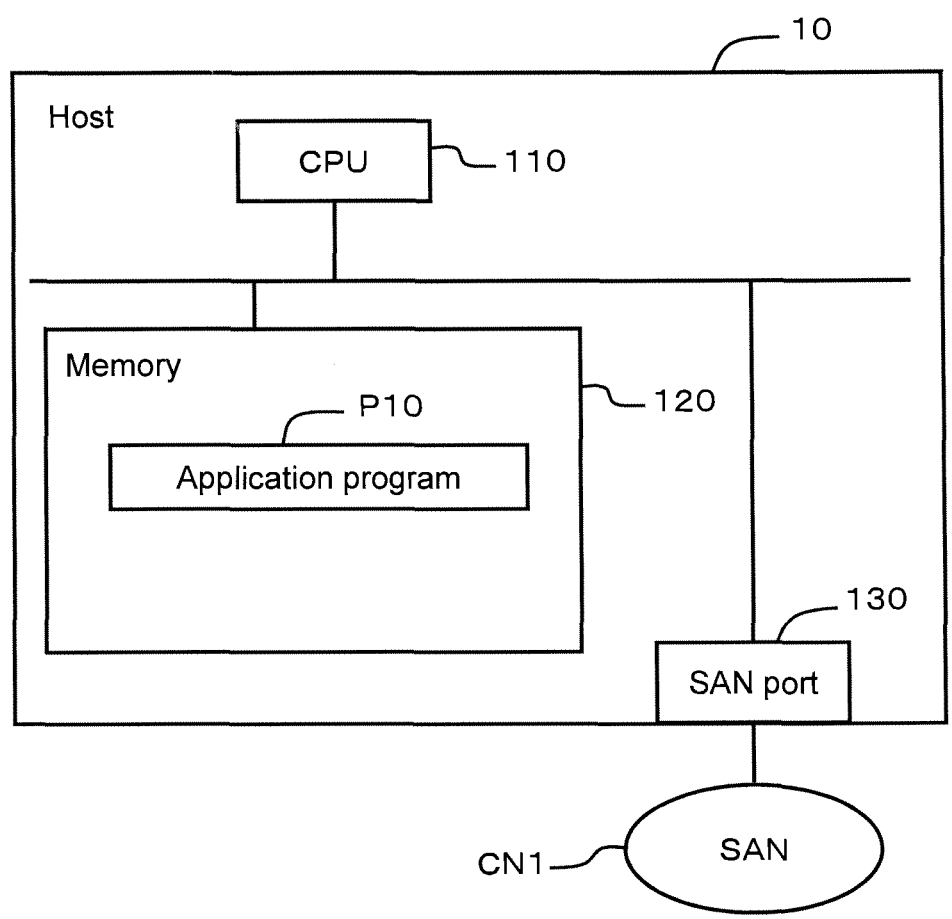
FIG. 2 shows an example of the hardware configuration of a host computer.

The configuration of the host 10 will be explained be referring to FIG. 2. The host 10, for example, comprises a microprocessor (CPU) 110, a memory 120, and a communication part 130. The CPU 110 reads and executes various applications 210 stored in the memory 120. The memory 120 is capable of storing a variety of application P10. The host 10 may comprise a so-called open server computer, or may comprise a mainframe machine.

Figure 3:
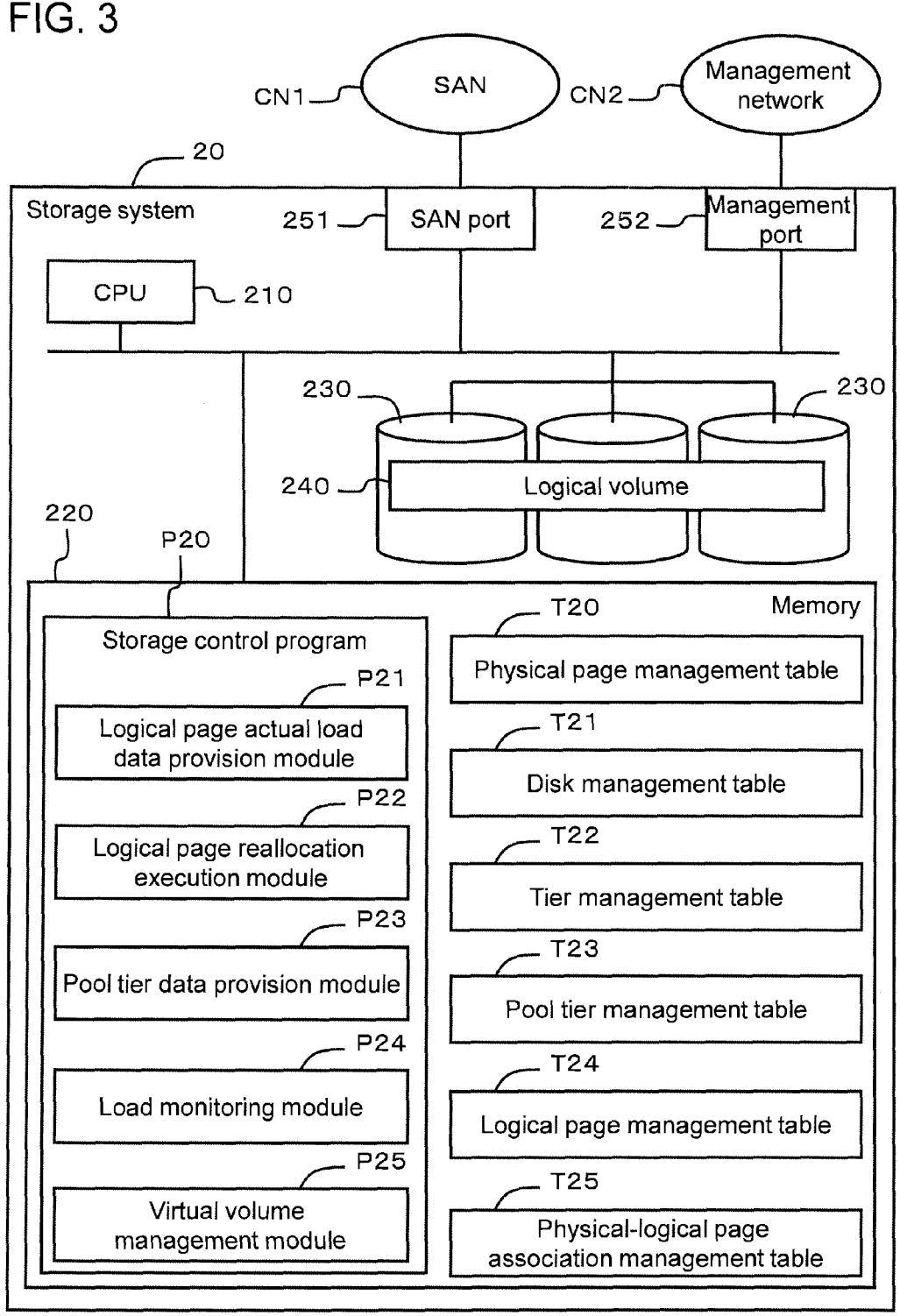
FIG. 3 shows an example of the hardware configuration of the storage system.

The configuration of the storage system 20 will be explained by referring to FIG. 3. The storage system 20, for example, comprises a microprocessor 210, a memory 220, multiple storage devices 230, and communication ports 251 and 252. The one communication port 251 is for coupling to the SAN network CN1. The other communication port 252 is for coupling to the management network CN2.

As for the storage device 230, for example, various devices capable of reading and writing data, such as a hard disk drive, a semiconductor memory drive, a flash memory device, and an optical disk drive, can be used. In a case where a hard disk drive is used, for example, a FC (Fibre Channel) disk, a SCSI (Small Computer System Interface) disk, a SATA disk, an ATA (AT Attachment) disk, and a SAS (Serial Attached SCSI) disk can be used.

For example, a variety of storage devices, such as a flash memory, a FeRAM (Ferroelectric Random Access Memory), a MRAM (Magnetoresistive Random Access Memory), a phase-change memory (Ovonic Unified Memory), and a RRAM (Resistance RAM: registered trademark) can also be used. In addition, for example, the configuration may also be such that different types of storage devices, like a flash memory device and a hard disk drive, are intermixed.

A single parity group can be formed from multiple storage devices 230, and the physical storage areas of the storage devices 230 can be organized as a single redundant storage area. Either one or multiple logical volumes 240 are created by using this redundant storage area. Either one or multiple logical volumes 240 can also be created using the storage area of a single storage device 230. The configuration of a virtual volume 270, which the storage system 20 provides to the host 10, will be explained further below using FIG. 4.

The memory 220 stores a storage management program P20, and various types of management tables T20, T21, T22, T23, T24, and T25. The storage management program P20 comprises multiple program modules P21, P22, P23, P24 and P25. The operation of each of the program modules P21 through P25 will be explained further below. The configurations of each of the management tables T20 through T25 will be explained further below. The management tables T20 through T25 may also be stored in an auxiliary storage device, such as a hard disk drive, instead of in the memory 220.

Figure 4:
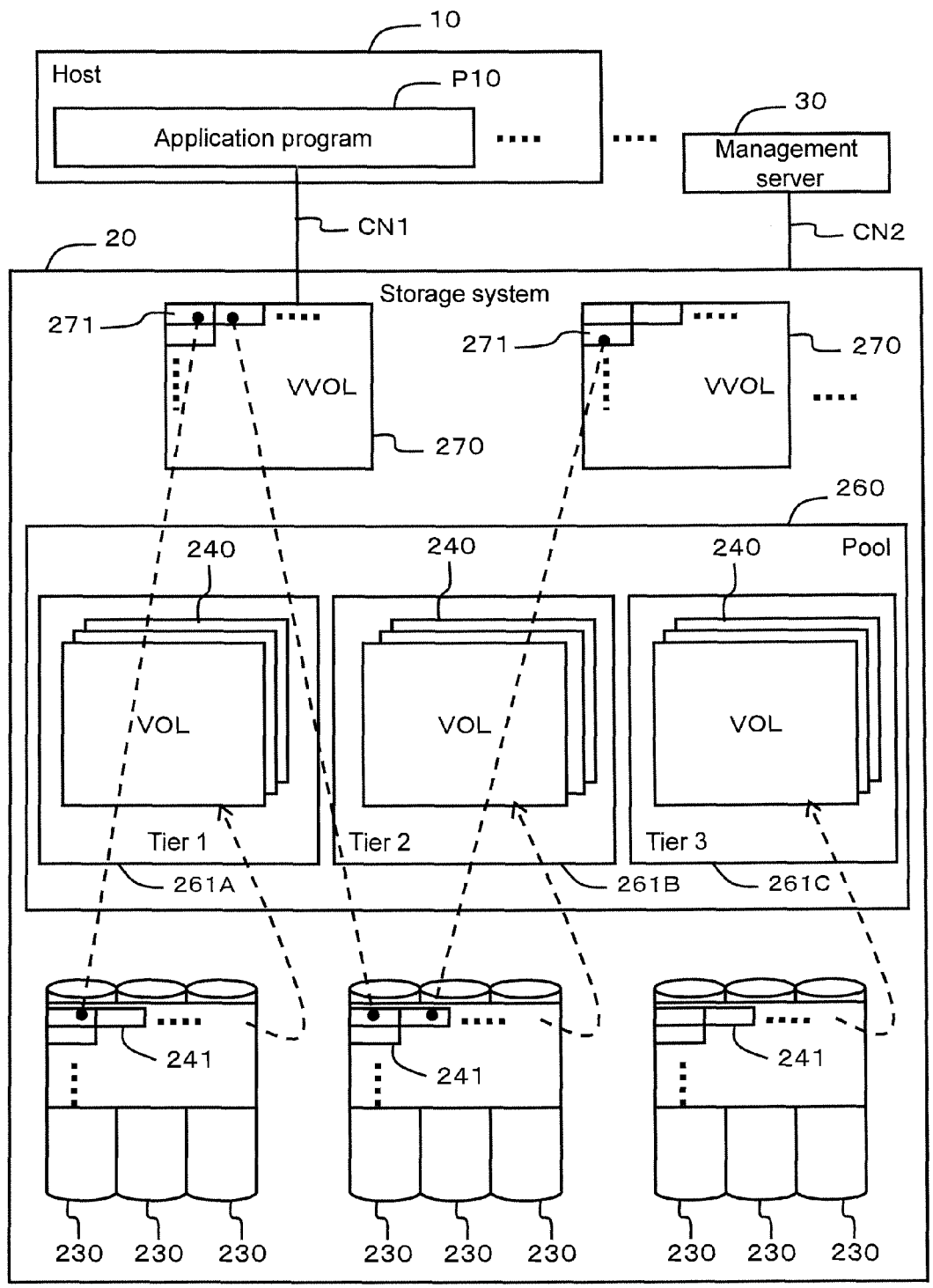
FIG. 4 is an illustration showing the relationship between a virtual logical volume and a pool.

The relationships between virtual volumes 270, a pool 260, and logical volumes 240 will be explained by referring to FIG. 4.

The pool 260 is configured logically, and comprises multiple storage tiers 261A, 261B, and 261C with respectively different performance. The first storage tier 261A is the tier with the highest performance. For example, logical volumes 240 created using the physical storage area of a flash memory device (SSD: Solid State Drive) are registered in the first storage tier 261A. The second storage tier 261B is a medium performance tier. For example, logical volumes 240 created using the physical storage area of a SAS are registered in the second storage tier 261B. The third storage tier 261C is the tier with the lowest performance. For example, logical volumes 240 created using the physical storage area of a SATA are registered in the third storage tier 261C.

Multiple virtual volumes 270 can be provided inside the storage system 20 as virtual logical volumes. The virtual volume 270 exists virtually, and data is actually stored in the respective logical volumes 240 comprising the pool 260.

A logical storage area of the virtual volume 270 comprises multiple logical pages 271. A physical page 241 is associated with a logical page 271 in accordance with a write access from the host 10. The physical storage area of a storage device 230 is partitioned into multiple physical pages (or segments) 241. Allocating a physical page 241 or a logical page 271 makes it possible to write data to this logical page 271.

The corresponding relationship between a physical page 241 and a logical page 271 is managed in accordance with a physical page-logical page association management table T25, which will be explained further below. The corresponding relationship between the physical page 241 and the logical page 271 is revised at a prescribed cycle in accordance with a process, which will be explained further below.

Next, the respective management tables will be explained. The configuration of each table described hereinbelow is merely an example, and the configuration may differ from the configuration shown in the drawings. For example, each table may comprise an item other than the items shown in the drawings, and a portion of the items from among the multiple items shown in the drawings may be deleted. The configuration may also be such that a table shown in the drawing is partitioned into multiple tables, or multiple tables shown in the drawings are combined into a single table.

FIG. 5 shows a physical page management table T20 of the storage system 20. The physical page management table T20 is for managing a physical page, and, for example, correspondingly manages a disk identifier C200 and a physical page identifier C201. An identifier is abbreviated as ID in the drawing. In this example, a storage device 230 is described as a disk for convenience sake.

The disk identifier C200 is information for identifying the respective storage devices 230. The physical page identifier C201 is information for identifying the respective physical pages 241. This table T20 can be used to check which physical page(s) 241 exist in which storage device 230.

FIG. 6 shows a disk management table T21 of the storage system 20. The disk management table T21 manages the respective storage devices 230 of the storage system 20. The disk management table T21, for example, correspondingly manages a disk identifier C210, a disk type C211, and a RAID (Redundant Array of Inexpensive Disks) level C212.

The disk identifier C210 is information for identifying the respective storage devices 230 the same as the disk identifier C200 described using FIG. 5. The disk type C211 shows the type of each storage device 230 (for example, SSD, SAS, or SATA). The RAID level C212 shows the level of the RAID configuration. The RAID levels, for example, can include RAID 1, RAID 5, and RAID 6.

Figure 7:
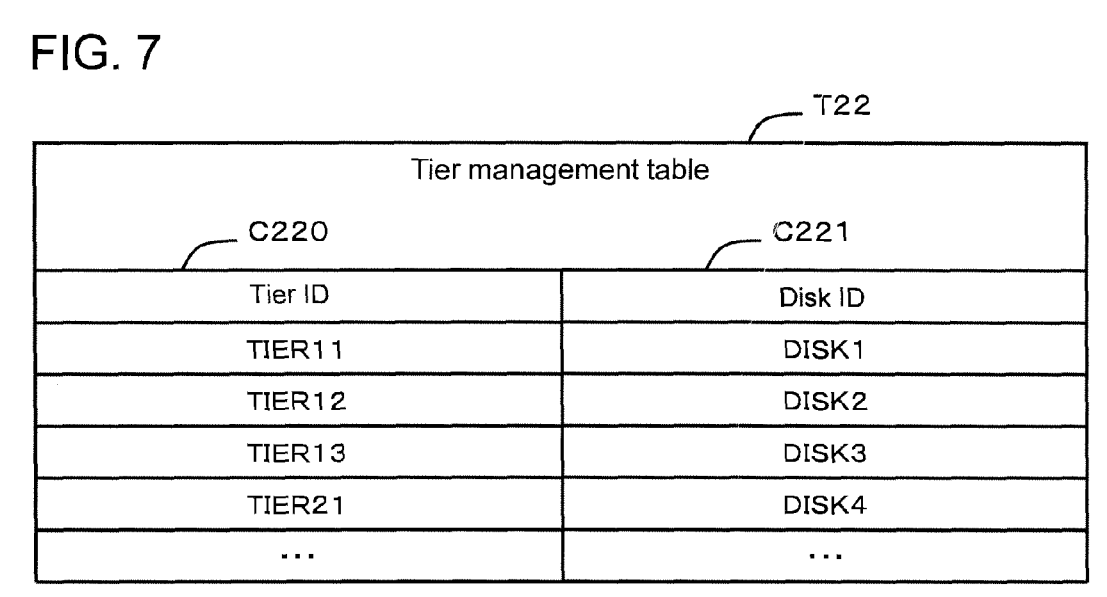

FIG. 7 shows a tier management table of the storage system 20. The tier management table T22 is for managing the respective storage tiers 261A through 261C comprising the pool 260. Storage tier may be abbreviated as tier below. When no specific distinction is being made, the tiers 261A through 261C may be called tier 261.

The tier management table T22, for example, correspondingly manages a tier identifier C220 and a disk identifier C221. The tier identifier C220 is information for identifying the respective tiers 261. The disk identifier C221 is the identifier of the storage device 230 registered in the respective tiers 261. The tier management table T22 can be used to check which storage device 230 is registered in which tier 261.

FIG. 8 shows a pool tier management table T23 of the storage system 20. The pool tier management table T23 manages the tier configuration of the pool 260.

The pool tier management table T23, for example, correspondingly manages a pool identifier C230, a tier identifier C231, a characteristics C232, a performance ranking C233, and a number of permissible I/Os C234.

The pool identifier C230 is information for identifying the respective pools 260 of the storage system 20. The tier identifier C231 is information for identifying the respective tiers 261 included in the pool 260. The characteristics C232 shows a performance attribute of a tier 261. The characteristics C232, for example, can be described using a disk type and a RAID level. The characteristics C232 is not limited to the attributes called disk type and RAID level, and may be defined using another attribute. The performance ranking C233 shows the ranking of a tier 261. The smaller the numeric ranking of a tier, the higher its performance is. The performance ranking C233 can be computed from a lower-limit value and an upper-limit value included in the number of permissible I/Os C234.

The number of permissible I/Os C234 is information showing the lower-limit value and the upper-limit value of the number of I/Os permitted by a tier 261. In a case where the number of I/Os with respect to the data of a certain logical page 271 belonging to a tier 261 exceeds the permissible upper-limit value of the tier 261, generally speaking, this logical page 271 must be reallocated to a higher-level tier. By contrast, in a case where the number of I/Os with respect to the data of a different logical page 271 belonging to the tier 261 falls below the permissible lower-limit value of the tier 261, generally speaking, this logical page 271 must be reallocated to a lower-level tier. The data of the logical page 271 is migrated between the tiers within a range of a number of I/Os predefined for each tier. In this example, as will be explained further below, the reallocation destination of a logical page 271 is decided in accordance with the utilization status of the virtual volume 270.

FIG. 9 shows a logical page management table T24 of the storage system 20. The logical page management table T24 is for managing the respective logical pages 271 comprising the virtual volume 270.

The logical page management table T24, for example, correspondingly manages a pool identifier C240, a virtual volume identifier C241, a logical page identifier C242, a number of I/Os C243, and a tier identifier C244.

The pool identifier C240 is information for identifying a pool 260. The virtual volume identifier C241 is information for identifying a virtual volume 270. The logical page identifier C242 is information for identifying the respective logical pages 271 comprising the virtual volume 270. The number of I/Os C243 is the number of I/Os for the respective logical pages 271. The tier identifier C244 is information for identifying the allocation-destination tier of a logical page 271.

FIG. 10 shows a physical page-logical page association management table T25 of the storage system 20. The physical page-logical page association management table T25 manages the corresponding relationship between a physical page 241 and a logical page 271. This table T25 correspondingly manages a physical page identifier C250 and a logical page identifier C251.

Figure 11:
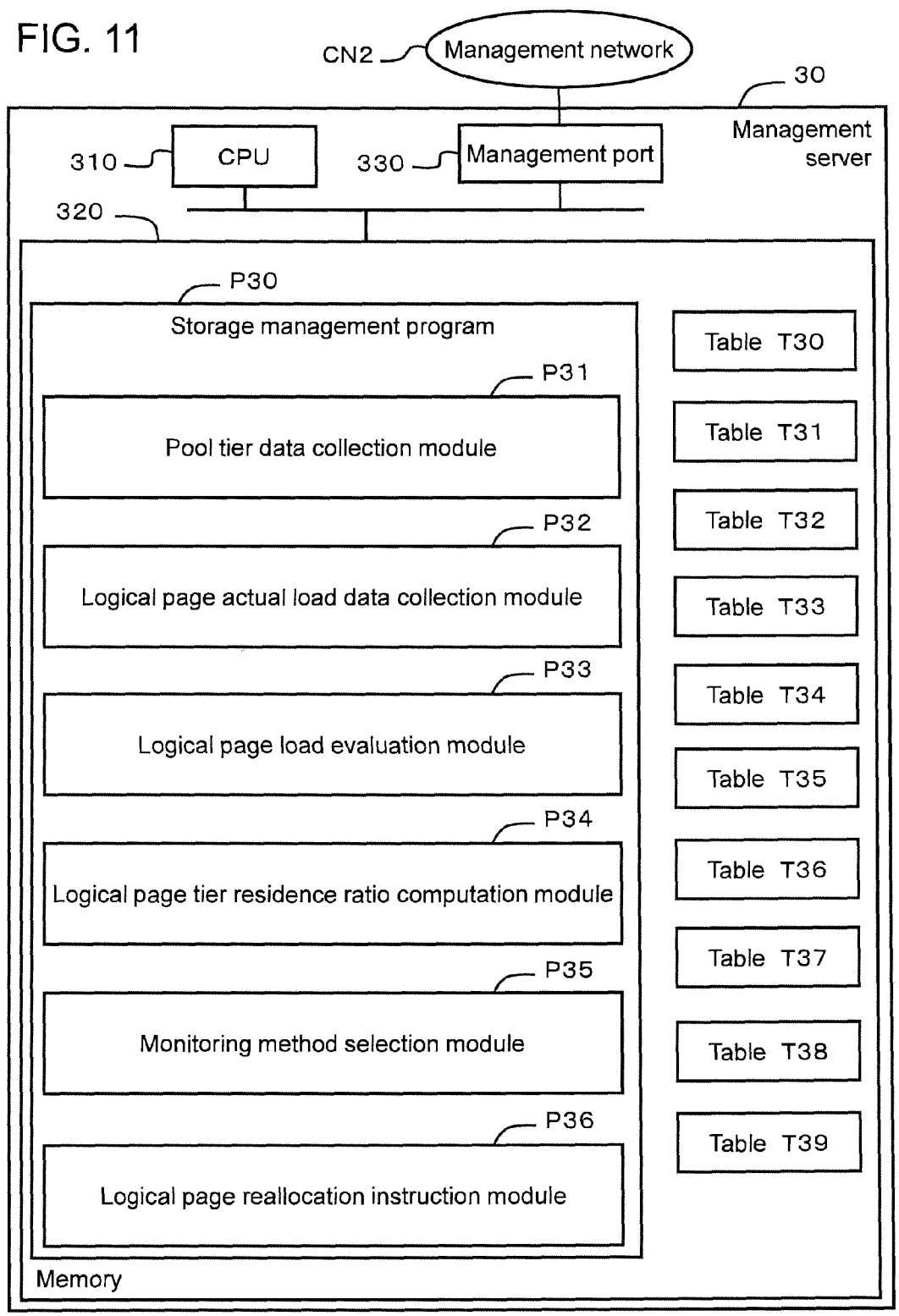
FIG. 11 shows an example of the hardware configuration of a management server.

FIG. 11 shows the configuration of the management server 30. The management server 30, for example, comprises a microprocessor 310, a memory 320, and a communication port 330 for coupling to the management communication network CN2. The memory 320 stores a storage management program P30 and multiple tables T30 through T39.

The storage management program P30 is a computer program for managing the storage system 20. The storage management program P30 comprises multiple program modules P31 through P36, which will be explained further below.

FIG. 12 shows an application management table T30 of the management server 30. The application management table T30 manages various types of applications P10, which run on the host 10.

The application management table T30, for example, correspondingly manages an application identifier C300 and a virtual volume identifier C301. The application identifier C300 is information for identifying an application P10. The virtual volume identifier C301 is information for identifying the virtual volume 270 used by the application P10. The application management table T30 can be configured by a user. The management server 30 can also automatically create the application management table T30 based on configuration information acquired from the storage system 20 and configuration information acquired from the host 10. The user, for example, is the administrator who manages the computer system.

FIG. 13 shows a table T31 of the management server 30 for managing a history of actual load data of a logical page. The logical page actual load data history table will be abbreviated as the actual load data management table below. Similarly, the term "logical page" may also be omitted from the name of the table when it is displayed.

The actual load data history table T31 stores the number of I/Os for each logical page 271 and the allocation-destination tier of each logical page 271 for each monitoring period. The actual load data history table T31, for example, correspondingly manages an application identifier C310, a pool identifier C311, a virtual volume identifier C312, a logical page identifier C313, a monitoring period C314, a number of I/Os C315, and a tier identifier C316.

The application identifier C310 is information for identifying an application P10. The pool identifier C311 is information identifying a pool 260. The virtual volume identifier C312 is information identifying a virtual volume 270. The logical page identifier C313 is information identifying each logical page 271.

The monitoring period C314 is a period for monitoring the number of I/Os with respect to a logical page 271, and in this example, for example, the number of I/Os is tabulated every hour. The number of I/Os C315 is the total value of the number of I/Os issued to the logical page 271 during the monitoring period. The tier identifier C316 is information identifying the allocation-destination tier of the logical page 271.

The actual load data history table T31 can be used to check changes in the number of I/Os for each monitoring period for each logical page 271, and the transition of the tiers 261 in which each logical page 271 is allocated.

The actual load data history table T31 is created in accordance with the module P32 for collecting the actual load data of a logical page chronologically recording the data collected during each monitoring period from the logical page management table T24 in the storage system 20.

FIG. 14 shows a table T32 for managing the history of data obtained by evaluating the load of a logical page. Hereinafter, this table T32 will be called the load evaluation data history table T32. The load evaluation data history table T32, for example, correspondingly manages an application identifier C320, a pool identifier C321, a virtual volume identifier C322, a logical page identifier C323, an evaluation-target monitoring period C324, a number of I/Os evaluation value C325, and a next tier identifier C326.

The application identifier C320 is information for identifying an application P10. The pool identifier C321 is information identifying a pool 260. The virtual volume identifier C322 is information identifying a virtual volume 270. The logical page identifier C323 is information identifying each logical page 271.

The evaluation target monitoring period C324 is the monitoring period used for evaluating the load of a logical page. The number of I/Os evaluation value C325 stores a value obtained by evaluating the number of I/Os of each logical page 271 for each evaluation target monitoring period C324. The number of I/Os evaluation value C325 respectively stores the number of I/Os calculated in accordance with a single period mode, and the number of I/Os calculated in accordance with a multiple periods average mode. The single period mode and the multiple periods average mode will be explained further below. In this drawing, the single period mode and the multiple periods average mode may be abbreviated as the single mode and the multiple mode, respectively.

The next tier identifier C326 shows the tier to which a logical page 271 should be allocated in accordance with the next page reallocation process. The next tier identifier C326 respectively stores an allocation-destination tier in a case which conforms to the single period mode, and an allocation-destination tier in a case which conforms to the multiple periods average mode.

In this example, an evaluation value for a number of I/Os and a next allocation-destination tier are calculated and stored for both the single period mode and the multiple periods average mode. This makes it possible to present the user with a calculation result for both modes in a setting screen G10, which will be explained further below, and can help the user make a determination.

The single period mode and the multiple periods average mode will be explained. In this example, two methods for monitoring the I/Os to a logical page 271 (monitoring methods) are used. These are the single period mode and the multiple periods average mode.

The single period mode, which is an example of a "first monitoring mode", is a method for evaluating the load of a logical page by focusing on the latest single monitoring period. In the single period mode, only the number of I/Os in the latest single monitoring period are monitored, and the load is evaluated on the basis of this number of I/Os. The monitoring period in the single period mode (first monitoring period) is a period equivalent to a single unit of time. In this example, the unit of time is configured to one hour, and as such, the monitoring period of the single period mode is the latest one hour.

The multiple periods average mode, which is an example of a "second monitoring mode", is a method for monitoring the number of I/Os during the latest successive multiple monitoring periods and evaluating the load on the basis of this number of I/Os. In this example, the monitoring period in the multiple periods average mode (second monitoring period), for example, is configured to three hours. In the multiple periods average mode, the average value of the number of I/Os during the three hour period is evaluated as the load of the logical page 271.

The characteristic feature of the single period mode is that it makes it easy to reflect the effects of subtle fluctuations in the number of I/Os during a relatively short period of time. By contrast, the characteristic feature of the multiple periods average mode is that it makes it difficult to be affected by subtle fluctuations in the number of I/Os over a short period of time.

For example, a case in which a logical page 271 of a virtual volume 270 being used by an application (A), which continues to carry out a large number of I/Os for a relatively long period of time, is monitored in accordance with the single period mode will be considered. In this case, it is difficult to stabilize response performance during the period of large numbers of I/Os. This is because in a case where, for example, the number of I/Os drops off even temporarily, the logical page 271 is migrated to a low-performance tier 261C (or 261B).

A case in which a logical page 271 of a virtual volume 270 being used by an application (B), which continues to perform a large number of I/Os for a relatively short time, is monitored in accordance with the multiple periods average mode will be considered. In this case, despite the fact that the logical page 271 is used infrequently, this logical page 271 resides in the high-performance tier 261 for a long period of time. The likelihood of another logical page 271 being raised to the high-performance tier 261A during this time diminishes. Therefore, the response performance of the entire storage system 20 decreases.

A monitoring method can also be configured for each pool 260. A case in which virtual volumes 270, which are being used by applications (A) and (B) having different I/O characteristics, exist in a common pool 260 will be considered. In a case where the monitoring method is configured to the single period mode, there is the likelihood that the response performance of the virtual volume 270 being used by the application (A) is unstable. By contrast, in a case where the monitoring method for the pool 260 is configured to the multiple periods average mode, there is the danger of the high-performance tier 261A being used wastefully.

Consequently, in this example, multiple monitoring modes, i.e. the single period mode and the multiple periods average mode, are provided, making it possible to automatically select the monitoring method best suited to the I/O characteristics of each virtual volume 270.

FIG. 15 shows a monitoring method definition table T33 of the management server 30. This definition table T33 defines a monitoring method capable of being used by the management server 30. The definition table T33, for example, comprises a monitoring method identifier C330, an I/O load evaluation function C331, a number of monitoring periods C332, a less-than-reference-value monitoring method identifier C333, and an equal-to-or-larger-than-reference-value monitoring method identifier C334.

The monitoring method identifier C330 is information for distinguishing between the single period mode and the multiple periods average mode. The I/O load evaluation function C331 is information, which defines a function for evaluating the I/O load, and, specifically, is a pointer to a function in a computer program. The number of monitoring periods C332 shows the time period for monitoring the number of I/Os.

The less-than-reference-value monitoring method identifier C333 is the monitoring method selected in a case where the tier residence ratio is smaller than the tier residence ratio reference value. Alternatively, the equal-to-or-larger-than-reference-value monitoring method identifier C334 is the monitoring method selected in a case where the tier residence ratio is equal to or larger than the tier residence ratio reference value. The selected monitoring method is used in the next monitoring period.

The tier residence ratio is a percentage of time, relative to a prescribed allocation reference time, during which a logical page has been resident in the current tier. In this example, as one example, the allocation reference time is configured to three hours, but this value is changeable. In a case where a certain logical page 271 has resided in a certain tier 261 for two hours, the tier residence ratio works out to roughly 67%. The allocation reference time may be called the "monitoring period for computing the tier residence ratio".

In a case where the tier residence ratio does not satisfy the tier residence ratio reference value, the single period mode is selected as the next monitoring method. In a case where the tier residence ratio is equal to or larger than the tier residence ratio reference value, the multiple periods average mode is selected as the next monitoring method. The storage management program P30 decides the monitoring method best suited for a virtual volume 270 for each virtual volume by comparing the tier residence ratio to the preconfigured tier residence ratio reference value.

FIG. 16 shows a pool tier management table T34 of the management server 30. The pool tier management table T34 manages the tiers 261 of a pool 260. A pool tier data collection module P31 collects information from the pool tier management table T23 in the storage system 20, and creates the pool tier management table T34. The pool tier management table T23 of the storage system 20 and the pool tier management table T34 of the management server 30 have the same content. Items C340 through C344 correspond to items C230 through C234 of FIG. 8, and as such, a redundant explanation will be omitted. Instead of a configuration in which the pool tier management table T34 is allocated to the management server 30, if necessary, the storage management program P30 is configured to directly acquire an entry from the pool tier management table T23 of the storage system 20.

FIG. 17 is a table T35 of the management server 30 for managing a history of the tier residence ratio for each logical page. The tier residence ratio history table T35, for example, correspondingly manages a logical page identifier C350, an evaluation target monitoring period C351, and a tier residence ratio C352.

The logical page identifier C350 is information for identifying each logical page 271. The evaluation target monitoring period C351 shows the period, which is targeted for calculation of the tier residence ratio. The tier residence ratio C352 stores the tier residence ratio calculated for each monitoring method (the single period mode and the multiple periods average mode). The tier residence ratio is computed for each monitoring method by a logical page tier residence ratio computation module P34.

FIG. 18 is a table T36 of the management server 30 for managing a monitoring period for computing the tier residence ratio.

The monitoring period for computing the tier residence ratio is the above-mentioned allocation reference time, and is a value for stipulating a past history range (how far to go back from the latest entry) to use a computation input.

In this example, the monitoring period for computing the tier residence ratio is expressed using a number of units of time. The configuration may be such that a start time and an end time are identified instead. The value of the monitoring period for computing the tier residence ratio can be changed by the user, and can also be automatically adjusted by the storage management program P30 in accordance with a prescribed criterion.

FIG. 19 shows a table T37 of the management server 30 for managing a tier residence ratio reference value. The tier residence ratio reference value corresponds to a "monitoring mode selection reference value". In the flowchart explanations, the tier residence ratio reference value is called the switching reference value for switching the monitoring method.

A logical page monitoring method selection module P35 selects a monitoring method for each logical page by determining the size relationship of the tier residence ratio reference value for each logical page.

In this example, one reference value may suffice in order to use both the single period mode and the multiple periods average mode monitoring methods. In the case of a configuration in which one monitoring method is selected from among three or more monitoring methods, a reference value is prepared using a number obtained by subtracting 1 from the total number of monitoring methods.

Various variations of the multiple periods average mode are possible. In this example, the multiple periods average mode is defined using an arithmetic average as the simplest example. Instead, a multiple periods average mode in accordance with a weighted average may be employed. In addition, more numerous types of multiple periods average modes can be put to use by changing the degree of weighting or changing the number of monitoring periods. These multiple variations are also included within the scope of the present invention.

In this example, a case in which the reference value of the tier residence ratio is configured to 70% will be given as an example and explained. The reference value may be configured to a different value other than 70%. The configuration may be such that a user may configure the reference value, or the storage management program P30 may automatically configure the reference value on the basis of a prescribed criterion. In this example, a tier residence ratio reference value is stored for each virtual volume in order to configure a monitoring method for each virtual volume.

FIG. 20 is a table T38 of the management server 30 for managing the monitoring method history of a logical page.

The monitoring method history management table T38, for example, correspondingly manages a logical page identifier C380, an evaluation target monitoring period C381, and a next monitoring method candidate identifier C382.

The next monitoring method candidate identifier C382 identifies a scheduled monitoring method candidate to be used in the next monitoring period. The next monitoring method candidate is selected by the logical page monitoring method selection module P35.

FIG. 21 is a table T39 of the management server 30 for managing the history of monitoring methods selected for each virtual volume. In this example, a monitoring method candidate is calculated for each logical page, and the most numerous candidate from thereamong is selected as the monitoring method to be applied to the entire virtual volume.

Therefore, the monitoring method history table T39 correspondingly manages a virtual volume identifier C390, an evaluation target monitoring period C391, and a next monitoring method identifier C392.

Instead of a configuration in which the monitoring method to be applied to the next monitoring period is selected in accordance with a so-called majority vote, the configuration may be such that in a case where the monitoring method has been changed in any one of the virtual volumes, this changed monitoring method is selected.

For example, a case in which any one of the logical pages 271 comprising a virtual volume 270 has changed to the multiple periods average mode when the single period mode was being applied to this virtual volume 270 is conceivable. In this case, the multiple periods average mode is applied to this virtual volume in the next monitoring period.

A case in which the I/O load of a specific logical page from among the logical pages 271 comprising a single virtual volume 270 changes ahead of the others is conceivable. In this case, the monitoring method to be applied to the virtual volume as a whole changes in line with the logical page for which the I/O load changed first. This makes it possible to rapidly conform to the change in the I/O characteristic.

In this example, a case in which the monitoring method is selected in units of virtual volumes is explained, but as in the other examples, which will be explained further below, the monitoring method may be selected in units of applications. Or, the monitoring method may be selected for each logical page. In this example, a monitoring method is calculated for each logical page, but this is in order to select a candidate for the monitoring method to be applied to the entire virtual volume. In this example, one monitoring method is selected for each virtual volume. Instead of this, respectively different monitoring methods may be applied to each logical page in the same virtual volume in accordance with the I/O load of each logical page.

Figure 22:
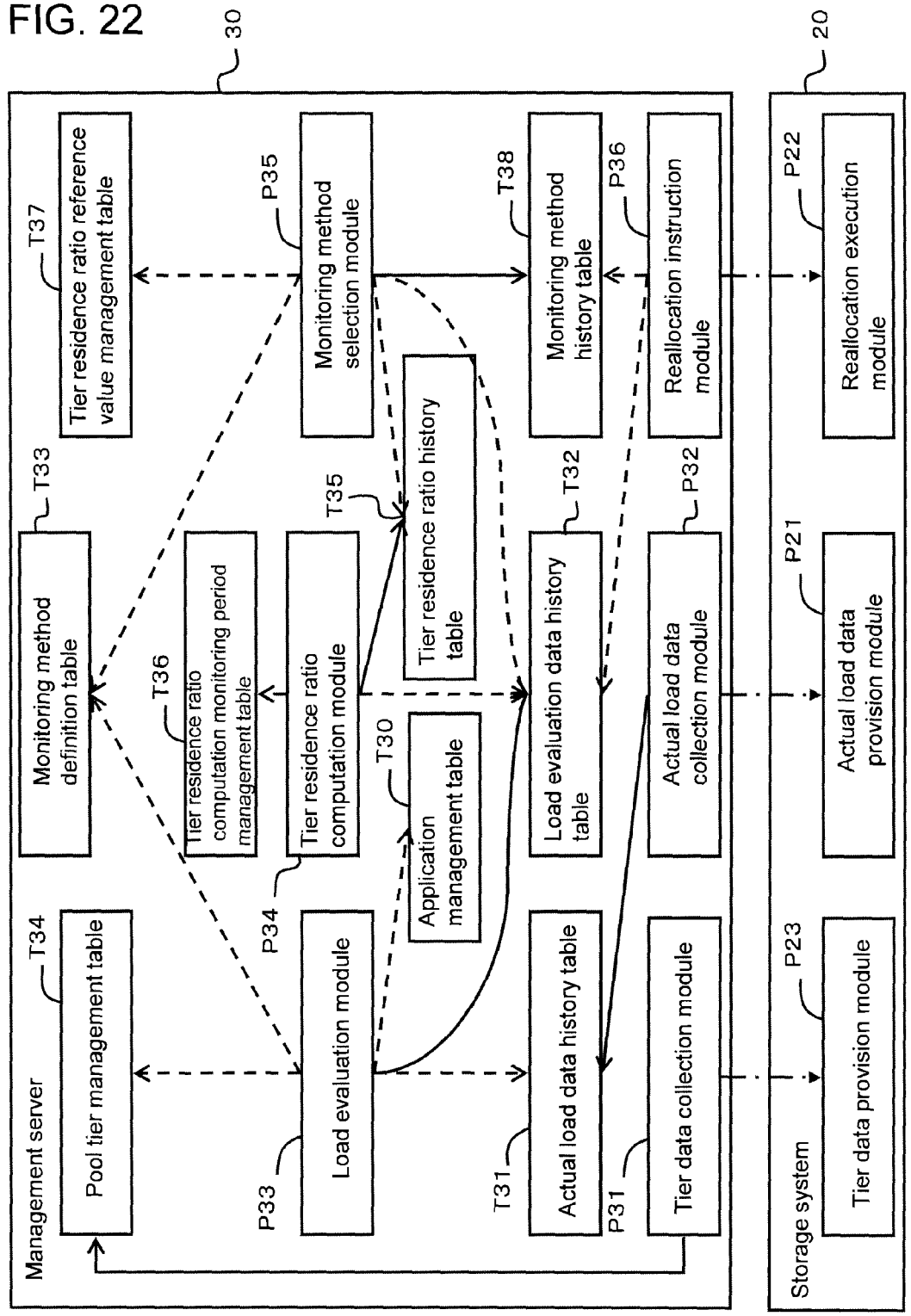
FIG. 22 is an illustration showing the relationship between the modules and the tables of the storage system and the modules and the tables of the management system.
Figure 23:
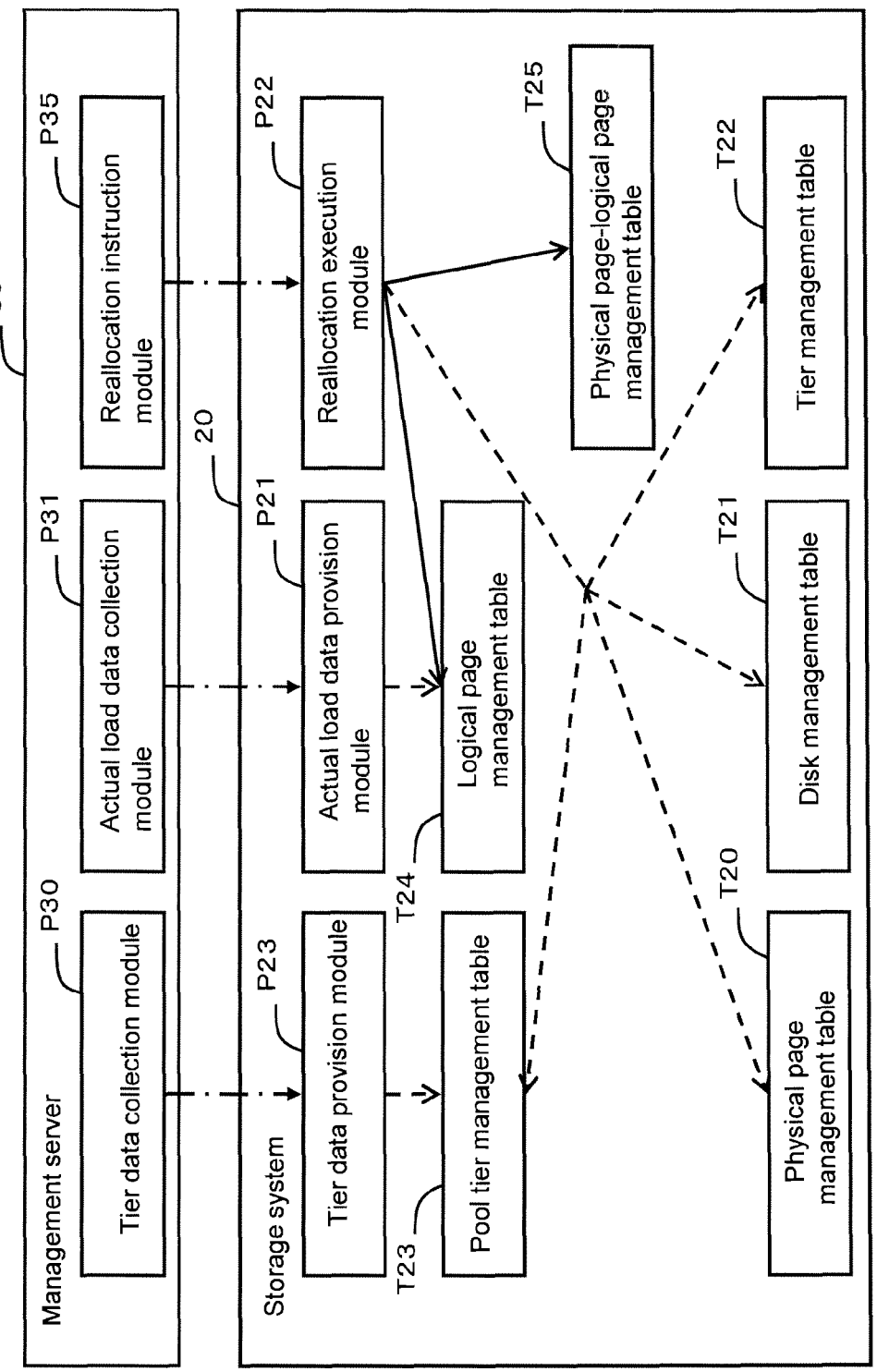
FIG. 23 is a continuation of the illustration in FIG. 22.

FIGS. 22 and 23 are illustrations showing the relationships between the program modules and the tables. FIG. 22 shows these relationships primarily for the management server 30, and FIG. 23 shows these relationships primarily for the storage system 20. The dotted-line arrows in the drawings denote references. The solid-line arrows in the drawings denote updates. The dashed-dotted-line arrows in the drawings denote requests.

For example, the pool tier data collection module P31 requests that a pool tier data provision module P23 of the storage system 20 send information, and acquires the information from the pool tier data provision module P23. The pool tier data collection module P31 stores the acquired information in the pool tier management table T34.

In this example, the storage management program P30 of the management server 30 collects prescribed information on a regular basis from the storage system 20 in accordance with the selected monitoring period, and executes the following processes. Each process will be explained in detail further below, but an overview of the processing will be explained first.

First of all, the storage management program P30 acquires the number of I/Os of a logical page and information on the tier in which it resides as the actual load data of the logical page.

The storage management program P30 computes an evaluation value for the number of I/Os and a set of suitable tiers as reallocation destinations for each monitoring method on the basis of the actual load data. The number of I/Os evaluation value and set of reallocation tiers are called the load evaluation data of the logical page.

The storage management program P30 calculates the tier residence ratio for each monitoring method on the basis of the logical page load evaluation data. The tier residence ratio is a percentage of the time during which the logical page has resided in the current tier relative to a prescribed allocation reference time. The allocation reference time can be changed by the user. In this example, for example, the allocation reference time is configured to three hours. In the following explanation, the allocation reference time may be called the "monitoring time for computing the tier residence ratio".

The storage management program P30 selects for each virtual volume a monitoring method to be applied to the virtual volume 270 by comparing the preconfigured tier residence ratio reference value to the tier residence ratio. Lastly, the storage management program P30 decides the reallocation-destination tier of the logical page 271 on the basis of the selected monitoring method. The monitoring of the number of I/Os and the reallocation of the logical page are executed parallelly.

In this example, the monitoring method to be applied to each virtual volume 270 is automatically selected in accordance with the tier residence ratio by carrying out the above-described processing. In accordance with this, it is possible to select either one of the single period mode or the multiple periods average mode in accordance with how each virtual volume 270 is being used (I/O characteristics). As a result, each logical page 271 can be allocated to the optimum tier 261 in accordance with I/O characteristics.

The selection of the monitoring method significantly affects the decision regarding the reallocation destination of a logical page. Therefore, it is preferable that the monitoring method be selected on the basis of the I/O characteristics of the logical page. Alternatively, the tier residence ratio is the quantification of a trend with respect to the length of a high I/O load period, which is one aspect of logical page I/O characteristics. Consequently, combining the monitoring method and the tier residence ratio makes it possible for a logical page to optimally allocated in accordance with the I/O characteristics.

However, the tier residence ratio computation process comprises a feedback loop by way of the decision regarding the page reallocation-destination tier. As a result, the characteristics of the I/O load evaluation of a monitoring method, which was selected one time, continue for a long period of time. This trend is especially pronounced in the multiple periods average mode, which performs historical information-based computation for multiple monitoring periods.

The tier residence ratio is used in the selection of the monitoring method. The calculated load evaluation data is used for selecting a reallocation-destination tier of a logical page using the selected monitoring method. The reallocation-destination tier is used in the computation of the tier residence ratio for the next time that processing is executed. Then, this computation result is used in the selection of the monitoring method.

Consequently, in this example, actual data with respect to the number of I/Os and the reallocation-destination tier, and historical data with respect to each evaluation value (number of I/Os evaluation value, migration-destination candidate tier, and tier residence ratio) calculated when the respective monitoring methods are applied are stored. In accordance with this, in this example, it is possible to prevent the dissociation of the actual data and the evaluation values, and to quickly select an appropriate monitoring method, which conforms to changes in the number of I/Os.

Figure 24:
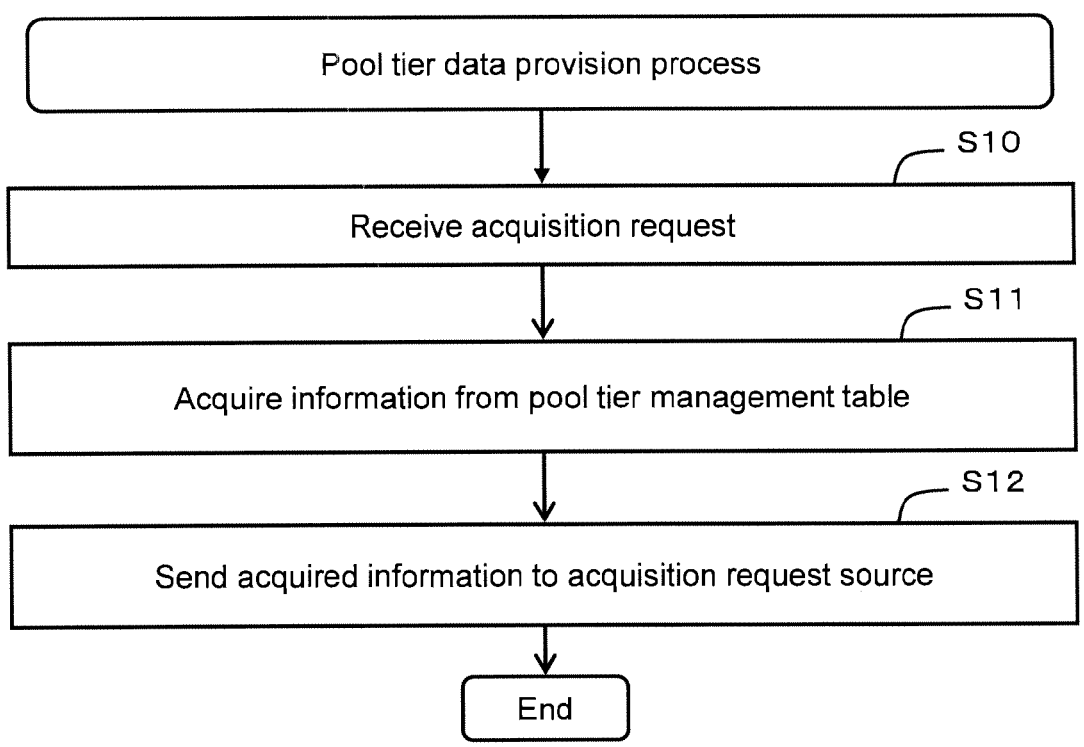
FIG. 24 is a flowchart of a storage system-implemented process for providing pool tier data.

FIG. 24 is a flowchart showing processing by the pool tier data provision module P23 of the storage system 20.

The pool tier data provision module P23, upon receiving an acquisition request from the pool tier data collection module P31 on the management server 30 (S10), acquires information stored in the pool tier management table T23 of the storage system 20 (S11). The pool tier data provision module P23 sends the acquired information to the pool tier data collection module P31 (S12).

Figure 25:
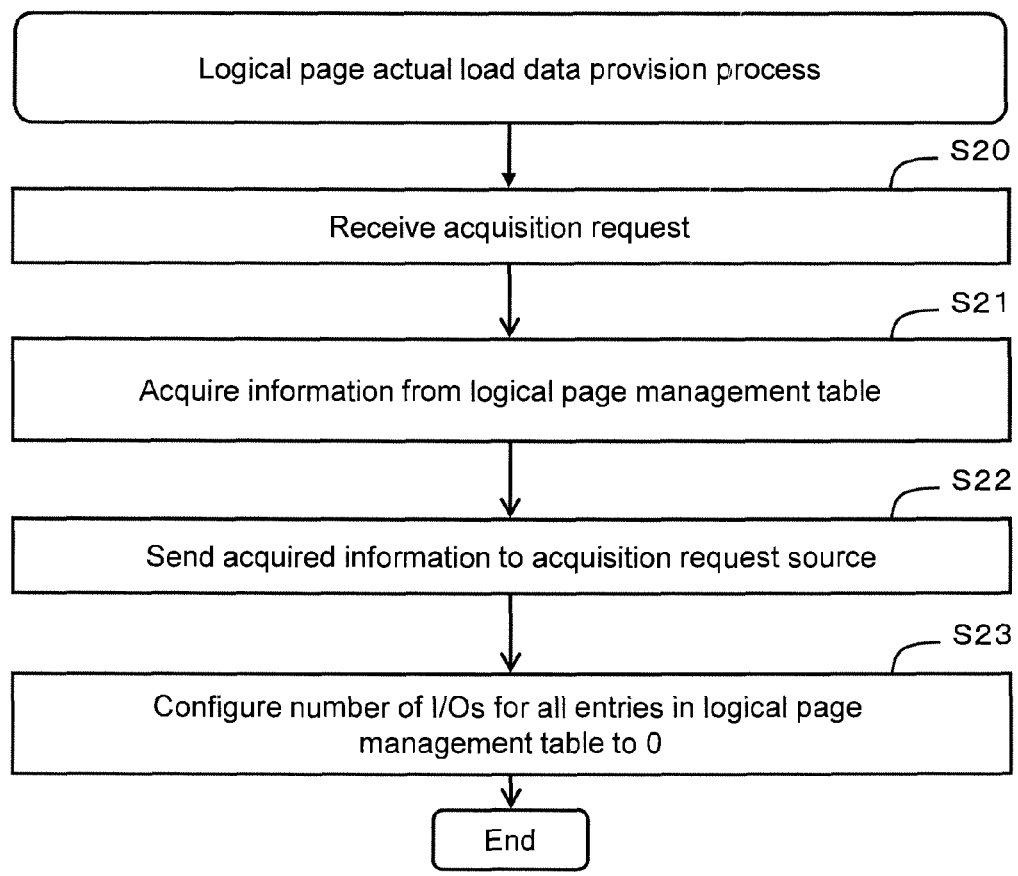
FIG. 25 is a flowchart of a storage system-implemented process for providing actual characteristic data (actual characteristic data) of a logical page.

FIG. 25 is a flowchart showing the processing of a logical page actual load data provision module P21 of the storage system 20.

The actual load data provision module P21, upon receiving an acquisition request from a logical page actual load data collection module P32 on the management server 30 (S20), acquires the information of the logical page management table T24 of the storage system 20 (S21).

The actual load data provision module P21 sends the acquired information to the actual load data collection module P32 (S22). Lastly, the actual load data provision module P21 configures the value of the number of I/Os 0243 in the logical page management table T24 to all 0s (S23).

Figure 26:
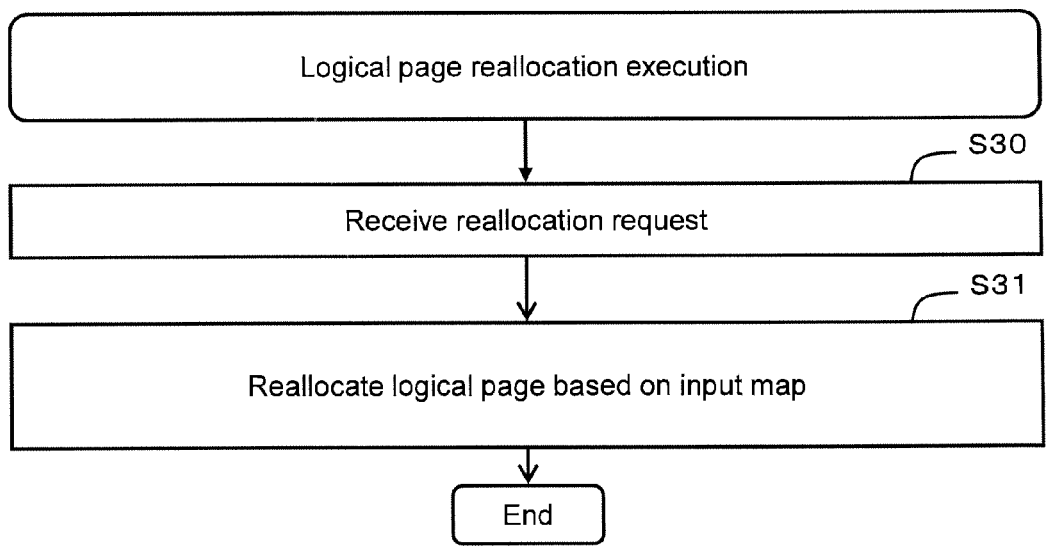
FIG. 26 is a flowchart of a storage system-implemented process for executing the reallocation of a logical page.

FIG. 26 is a flowchart showing the processing of a logical page reallocation execution module P22 of the storage system 20.

The reallocation execution module P22 receives a reallocation request from a logical page reallocation instruction module P36 on the management server 30 (S30). The reallocation request comprises a map showing the corresponding relationship between a logical page identifier and the identifier of a reallocation-destination tier.

The reallocation execution module P22 acquires the current corresponding relationship between a logical page and a tier from the logical page management table T24, and carries out a reallocation as follows (S31). First, the reallocation execution module P22 determines whether or not the current corresponding relationship matches the corresponding relationship shown in the map.

In the case of a match, the reallocation execution module P22 determines that the reallocation of the target logical page is not necessary. In the case of a mismatch, the reallocation execution module P22 determines that the reallocation of the target logical page is necessary.

In a case where it has been determined that a reallocation is necessary, the reallocation execution module P22 references the pool tier management table T23, the tier management table T22, the physical page management table T20, and the physical page-logical page association management table T25, and searches for a free physical page in the reallocation-destination tier. The reallocation execution module P22 copies data stored in the physical page corresponding to the target logical page to a free physical page, which has been retrieved. Lastly, the reallocation execution module P22 rewrites the corresponding relationship between the physical page and the logical page of the physical page-logical page association management table T25 (S31).

Figure 27:
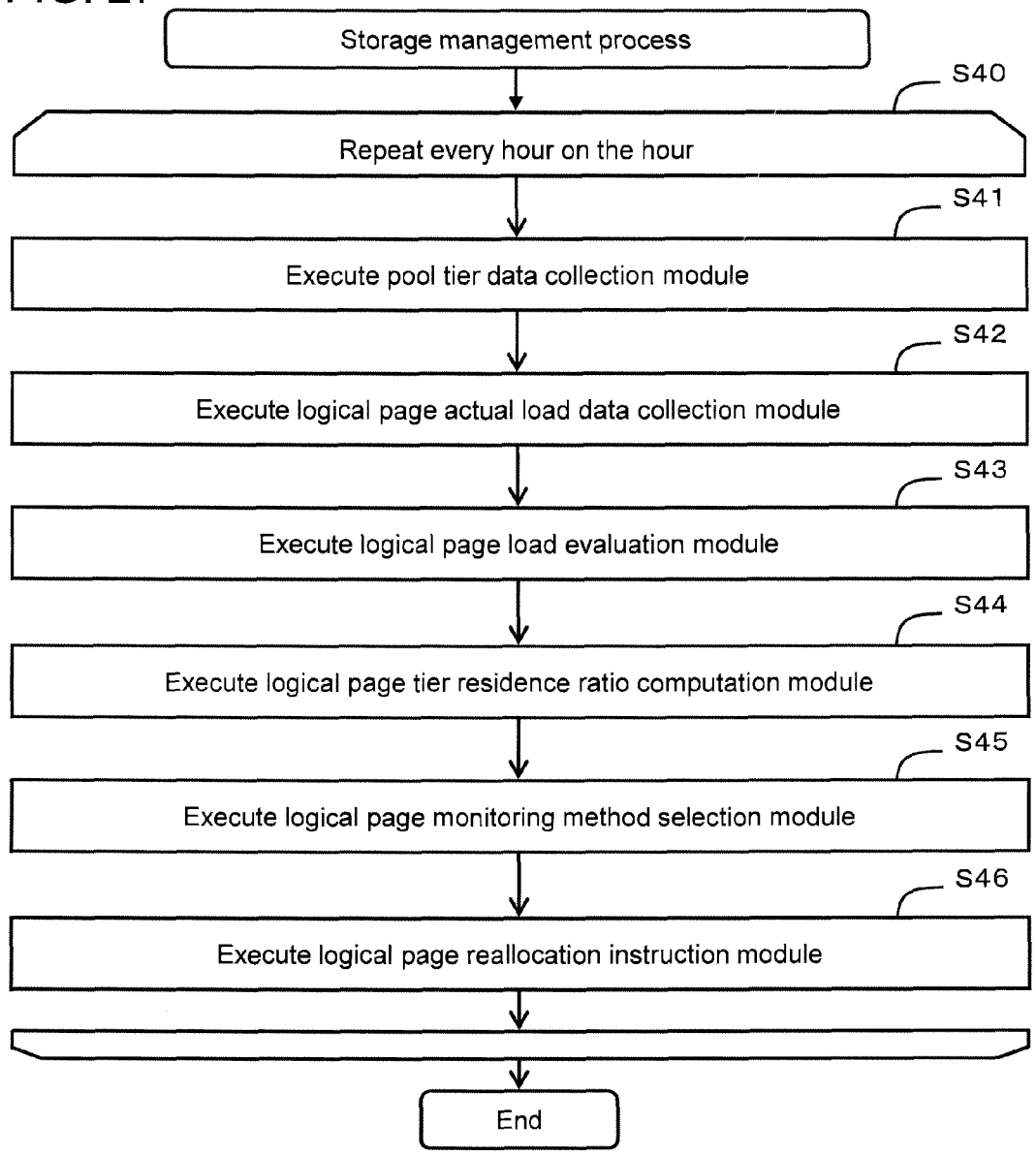
FIG. 27 is a flowchart of a management server-implemented storage management process.

FIG. 27 is a flowchart showing the processing of the storage management program P30 of the management server 30.

In this example, as an example, the process for deciding on the reallocation destination of a logical page is executed every hour on the hour (S40).

The storage management program P30 first executes the pool tier data collection module P31 (S41). Next, the storage management program P30 executes the logical page actual load data collection module P32 (S42), and executes a logical page load evaluation module P33 (S43).

In addition, the storage management program P30 also executes the logical page tier residence ratio computation module P34 (S44), and executes the logical page monitoring method selection module P35 (S45). Lastly, the storage management program P30 executes the logical page reallocation instruction module P36 (S46).

Figure 28:
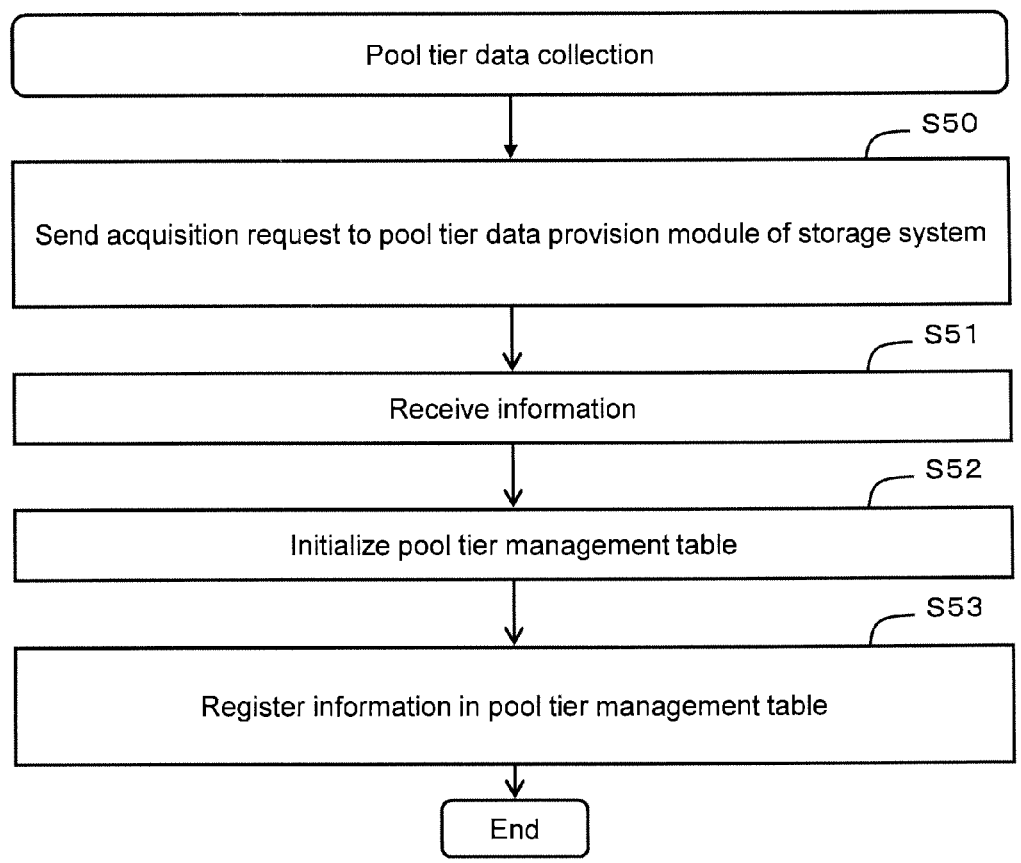
FIG. 28 is a flowchart of a management server-implemented process for collecting the tier data of the pool.

FIG. 28 is a flowchart showing the processing of the pool tier data collection module P31 of the management server 30. The pool tier data collection module P31 sends an acquisition request to the pool tier data provision module P23 of the storage system 20 (S50).

The pool tier data collection module P31 acquires information from the pool tier data provision module P23 (S51). The pool tier data collection module P31 initializes the pool tier management table T34 of the management server 30 (S52), and stores the information acquired from the pool tier data provision module P23 in the pool tier management table T34 (S53).

Figure 29:
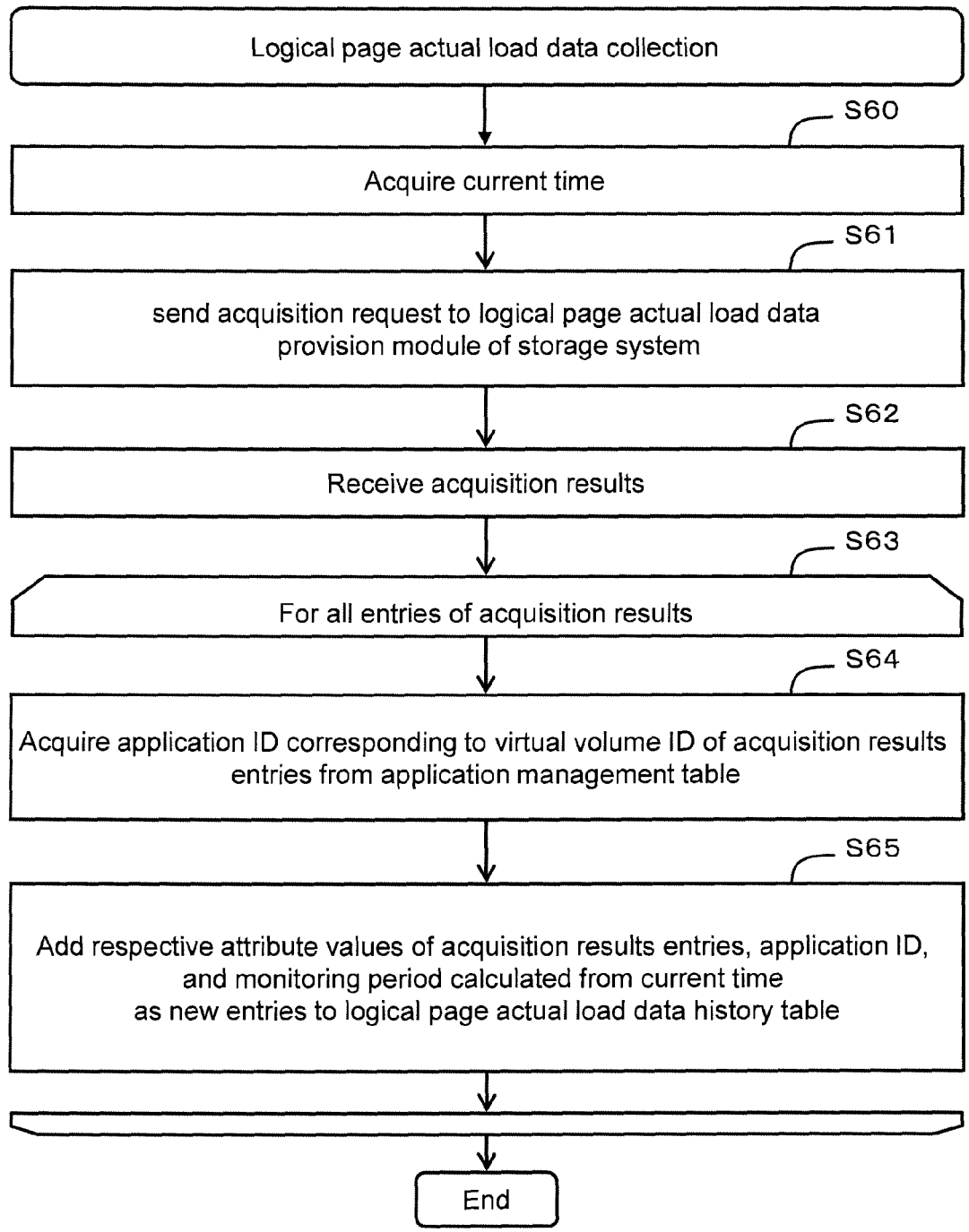
FIG. 29 is a flowchart of a management server-implemented process for collecting the actual load data of logical page.

FIG. 29 is a flowchart showing the processing of the logical page actual load data collection module P32 of the management server 30.

The actual load data collection module P32 acquires the current time (S60), sends an acquisition request to the logical page actual load data provision module P21 of the storage system 20 (S61), and acquires information from the actual load data provision module P21 (S62).

The actual load data collection module P32 executes Step S64 and Step S65 for all the acquired entries (S63).

The actual load data collection module P32 acquires the application identifier corresponding to the virtual volume identifier C241 of an acquired entry from the application management table T30 (S64).

The actual load data collection module P32 adds the information of an entry acquired from the storage system 20, the application identifier, and the monitoring period determined from the current time to the logical page actual load data history table T31 (S65).

In accordance with this, the logical page number of I/Os and the reallocation-destination tier identifier for the latest monitoring period of the storage system 20 are added to the logical page actual load data history table T31 of the management server 30.

Figure 30:
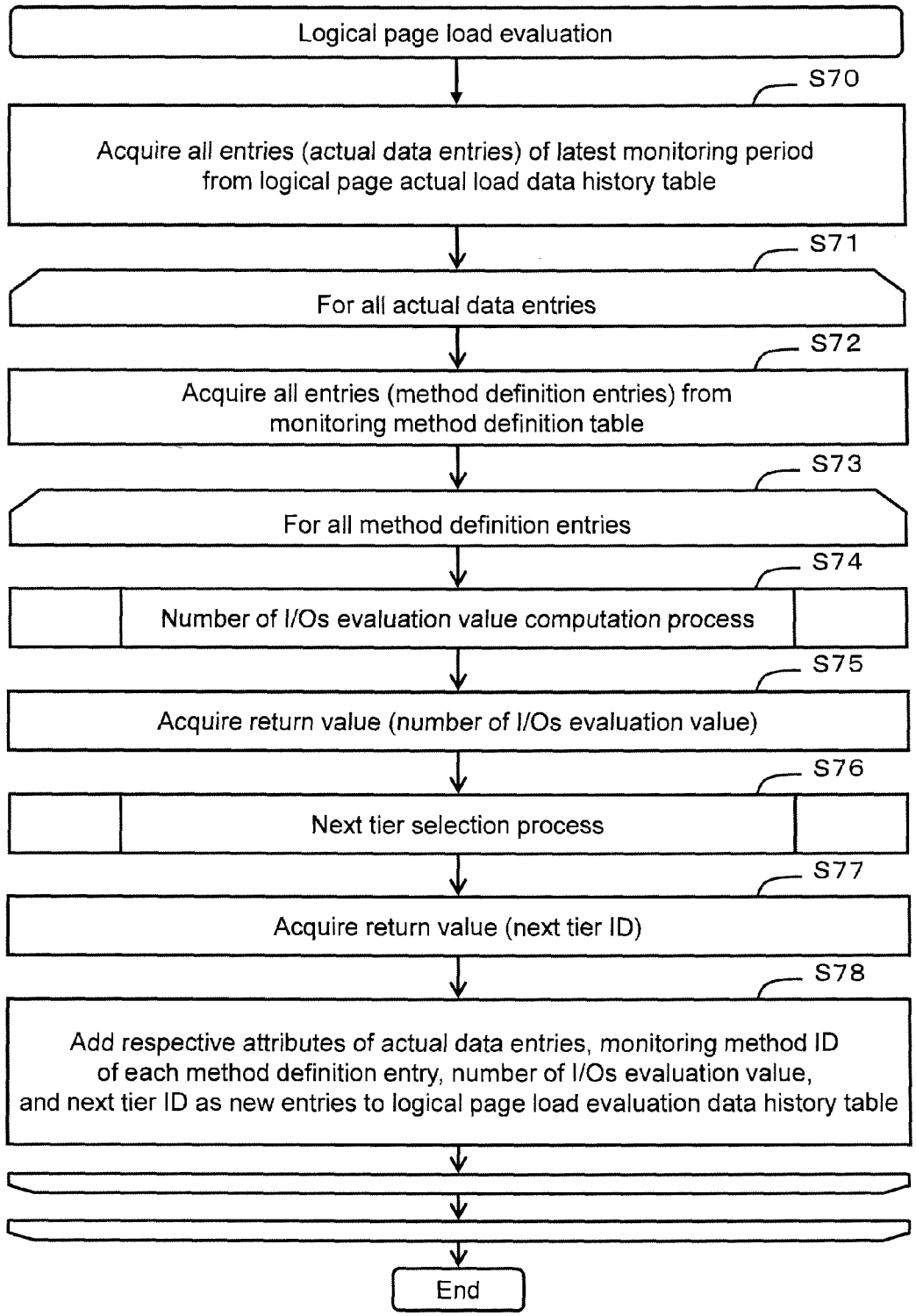
FIG. 30 is a flowchart showing a management server-implemented process for evaluating the performance of a logical page.

FIG. 30 is a flowchart showing the processing of the logical page load evaluation module P33 of the management server 30.

The load evaluation module P33 module P33 acquires all the actual data entries of the latest monitoring period from the logical page actual load data history table T31 (P70). The load evaluation module P33 executes for all the actual data entries the following steps: S72 through S78 (S71).

The load evaluation module P33 acquires all the method definition entries from the monitoring method definition table T33 (S72). The load evaluation module P33 executes for all the method definition entries the following steps: S74 through S78 (S73).

The load evaluation module P33 executes the process for computing a number of I/Os evaluation value (S74). This process will be explained in detail further below using FIG. 31. The load evaluation module P33, upon acquiring the return value (the number of I/Os evaluation value) from Step S74 (S75), executes a process for selecting the next allocation-destination tier (S76). This next tier selection process will be explained further below using FIG. 32.

The load evaluation module P33, upon acquiring the return value (the next tier ID) from Step S76 (S77), adds the respective attributes of the actual data entries, the monitoring method ID of each method definition entry, the number of I/Os evaluation value, and the next tier identifier as new entries to the logical page load evaluation data history table T32 (S78).

As described hereinabove, in this example, a number of I/Os evaluation value is computed for all the monitoring methods registered in the management server 30 (single period mode and multiple periods average mode).

Figure 31:
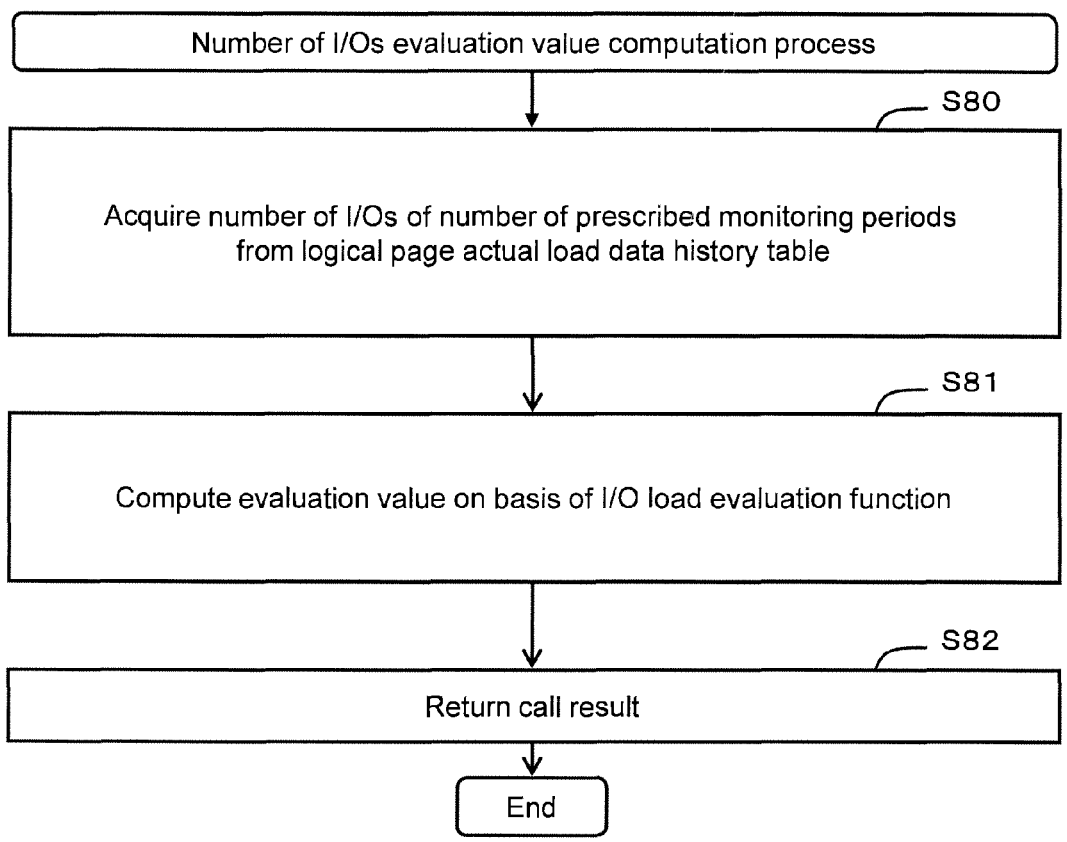
FIG. 31 is a flowchart showing a management server-implemented process for computing an evaluation value of an I/O characteristic.

FIG. 31 is a flowchart of the number of I/Os evaluation value computation process described in Step S74 in FIG. 30.

The load evaluation module P33 acquires the number of I/Os of the number of monitoring periods corresponding to the monitoring method from the logical page actual load data history table T31 (S80). The load evaluation module P33 reads the load evaluation function of the monitoring method defined in the monitoring method definition table T33, and computes the I/O load evaluation value of the logical page (S81). The load evaluation module P33 returns the computation result to the flowchart of FIG. 30 (S82).

Figure 32:
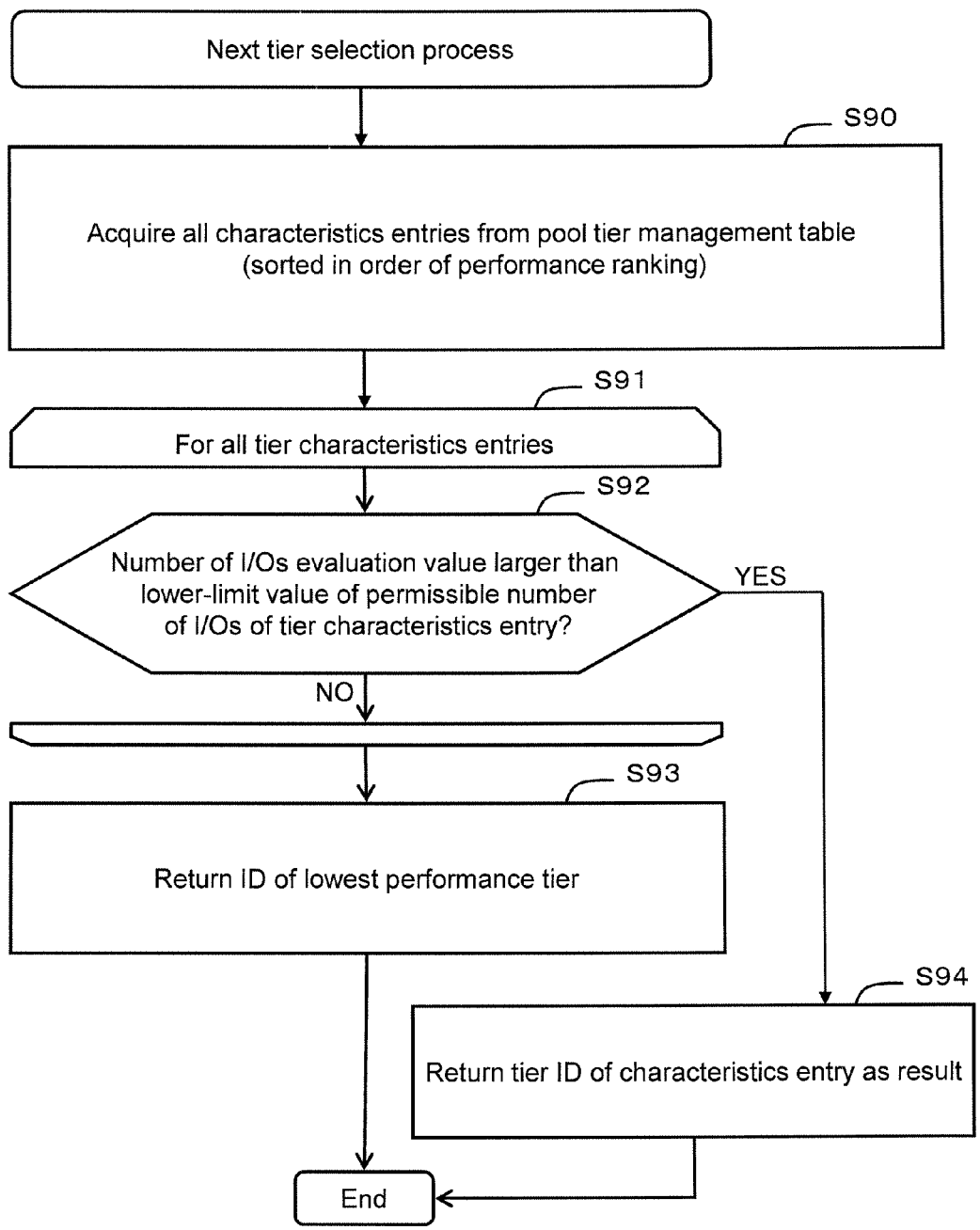
FIG. 32 is a flowchart showing a management server-implemented process for selecting the storage tier to which allocation is to be carried out in the next page reallocation process (next tier).

FIG. 32 is a flowchart of the next tier selection process described in Step S76 in FIG. 30.

The load evaluation module P33 acquires all the characteristics entries from the pool tier management table T34 (S90). The characteristics entries are sorted in order of performance ranking.

The load evaluation module P33 executes the following Step S92 for all the characteristics entries (S91). The load evaluation module P33 determines whether the number of I/Os evaluation value calculated in FIG. 31 is larger than the lower-limit value of the permissible number of I/Os C344 (S92).

In a case where the determination is that the number of I/Os evaluation value is not larger than the lower-limit value (S92: NO), the load evaluation module P33 returns the tier identifier of the lowest performance tier 261C in the processing of FIG. 30 (S93).

In a case where the determination is that the number of I/Os evaluation value is larger than the lower-limit value (S92: YES), the load evaluation module P33 returns the identifier of the current tier in the processing of FIG. 30 (S94). Furthermore, in this example, the configuration is such that a reallocation-destination tier is selected having the lower-limit value of the permissible number of I/Os C344 of each tier as the criterion, but the configuration may also be such that the characteristics entries are sorted in ascending order of performance, and the reallocation-destination tier is selected having the upper-limit value of the permissible number of I/Os as the criterion.

Figure 33:
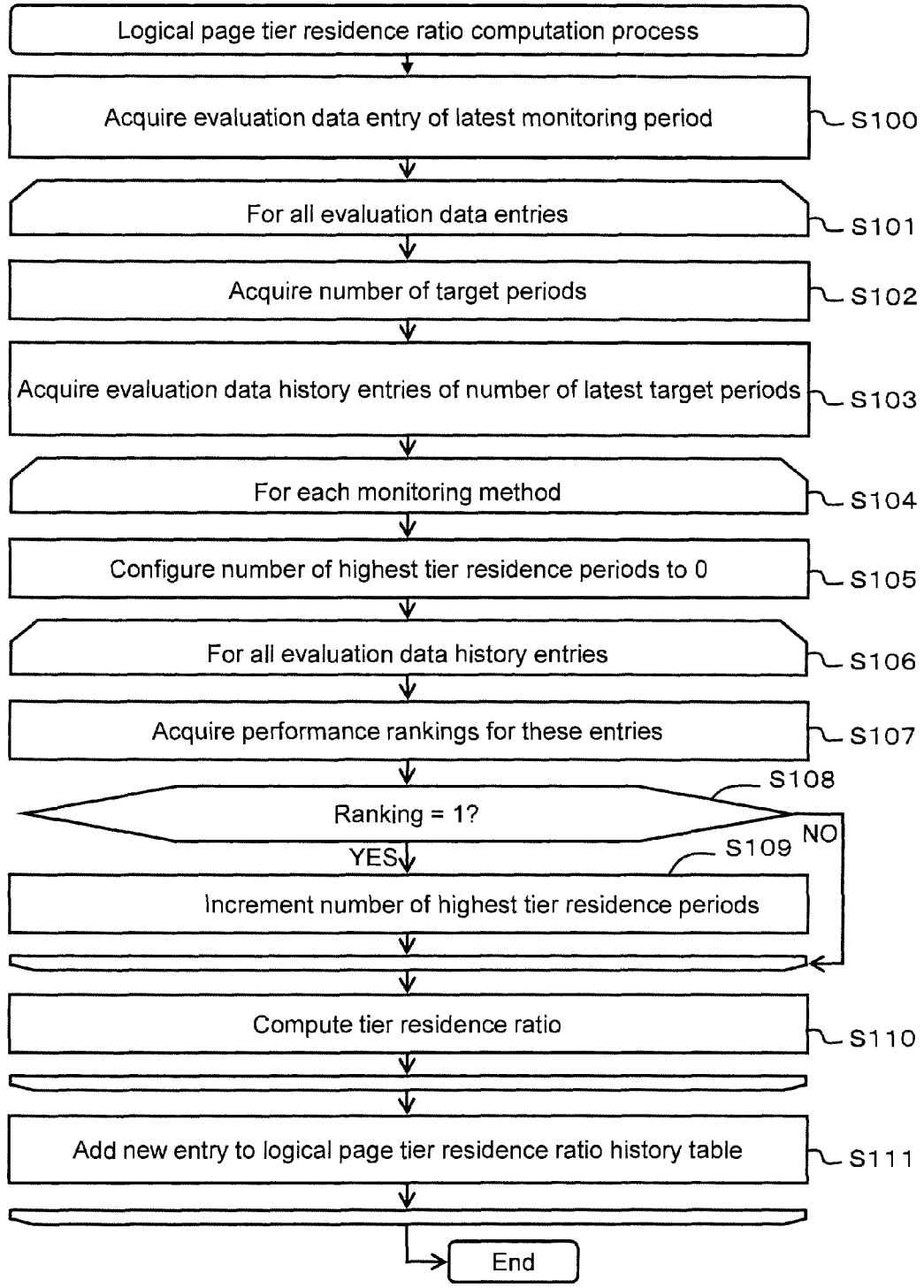
FIG. 33 is a flowchart of a management server-implemented process for computing the tier residence ratio of a logical page.

FIG. 33 is a flowchart showing the processing of the logical page tier residence ratio computation module P34 of the management server 30.

The tier residence ratio computation module P34 acquires all the evaluation data entries during the latest monitoring period from the logical page load evaluation data history table T32 (S100). The tier residence ratio computation module P34 executes the following steps S101 through S111 for all the evaluation data entries (S101).

The tier residence ratio computation module P34 acquires the number of monitoring periods targeted for computation (number of target periods) from the tier residence ratio computation monitoring period management table T36 (S102). The tier residence ratio computation module P34 acquires historical entries of performance evaluation data of the number of latest target periods from the logical page load evaluation data history table T32 (S103).

The tier residence ratio computation module P34 executes the following steps S105 through S110 for each monitoring method (single period mode and multiple periods average mode) (S104). The tier residence ratio computation module P34 configures the number of highest tier residence periods for counting the number of periods that a logical page resides in the highest performance tier to 0 (S105).

The tier residence ratio computation module P34 executes the following steps S107 through S111 for all evaluation data historical entries (S106). The tier residence ratio computation module P34 references the pool tier management table T34 and acquires the performance rankings of the evaluation data historical entries (S107).

The tier residence ratio computation module P34 determines whether an acquired performance ranking is "1" (S108). That is, the tier residence ratio computation module P34 determines whether the historical entry is for the highest performance tier 261A.

In a case where the performance ranking is "1" (S108: YES), the tier residence ratio computation module P34 increments the value of the number of highest tier residence periods by one (S109). In a case where the performance ranking is not "1" (S108: NO), the tier residence ratio computation module P34 skips Step S109 and moves to Step S110.

The tier residence ratio computation module P34 calculates the tier residence ratio by dividing the number of highest tier residence periods by the number of target periods acquired in Step S102 (S110). The tier residence ratio computation module P34 stores the calculated tier residence ratio in the logical page tier residence ratio history table T35 (S111).

The tier residence ratio is a percentage of the periods during which the logical page has been allocated to the highest performance tier 261A. This ratio is determines as $r=p/n$, where r is the tier residence ratio, n is the number of target periods, and p is the number of periods during which the logical page has been residing in the highest performance tier.

Figure 34:
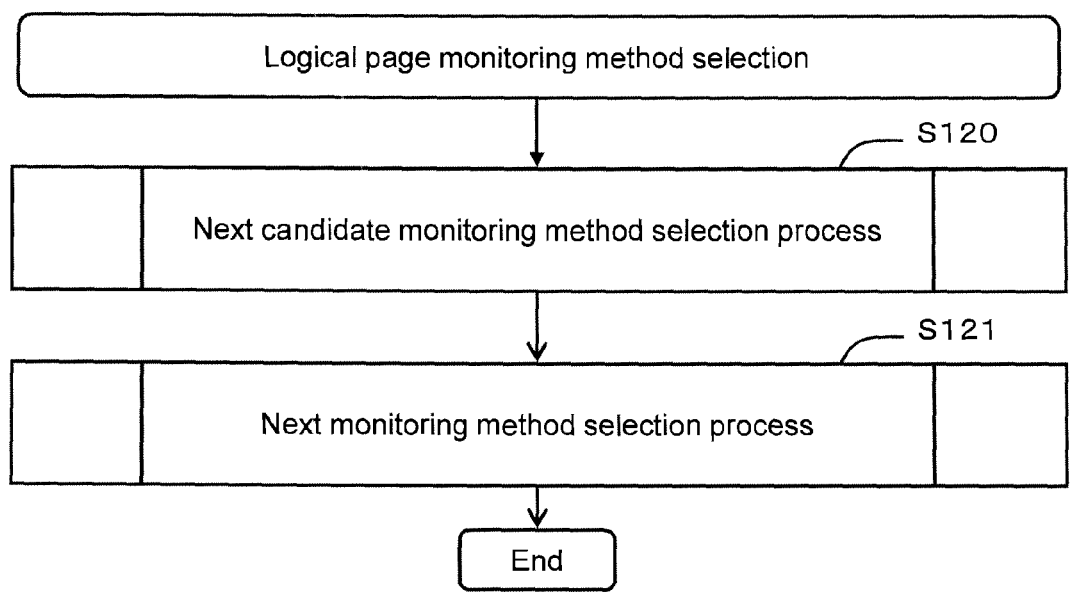
FIG. 34 is a flowchart of a management server-implemented process for selecting the monitoring method of a logical page.

FIG. 34 shows the processing of logical page monitoring method selection module P35 of the management server 30.

The monitoring method selection module P35 first executes a process for selecting a candidate monitoring method to be used in the next monitoring period for each logical page (S120). Step S120 will be explained in detail further below using FIG. 35.

Next, the monitoring method selection module P35 executes a process for selecting the monitoring method to be applied to an entire virtual volume on the basis of the monitoring method candidate selected for each logical page (S121). Step S121 will be explained in detail further below using FIG. 37.

Figure 35:
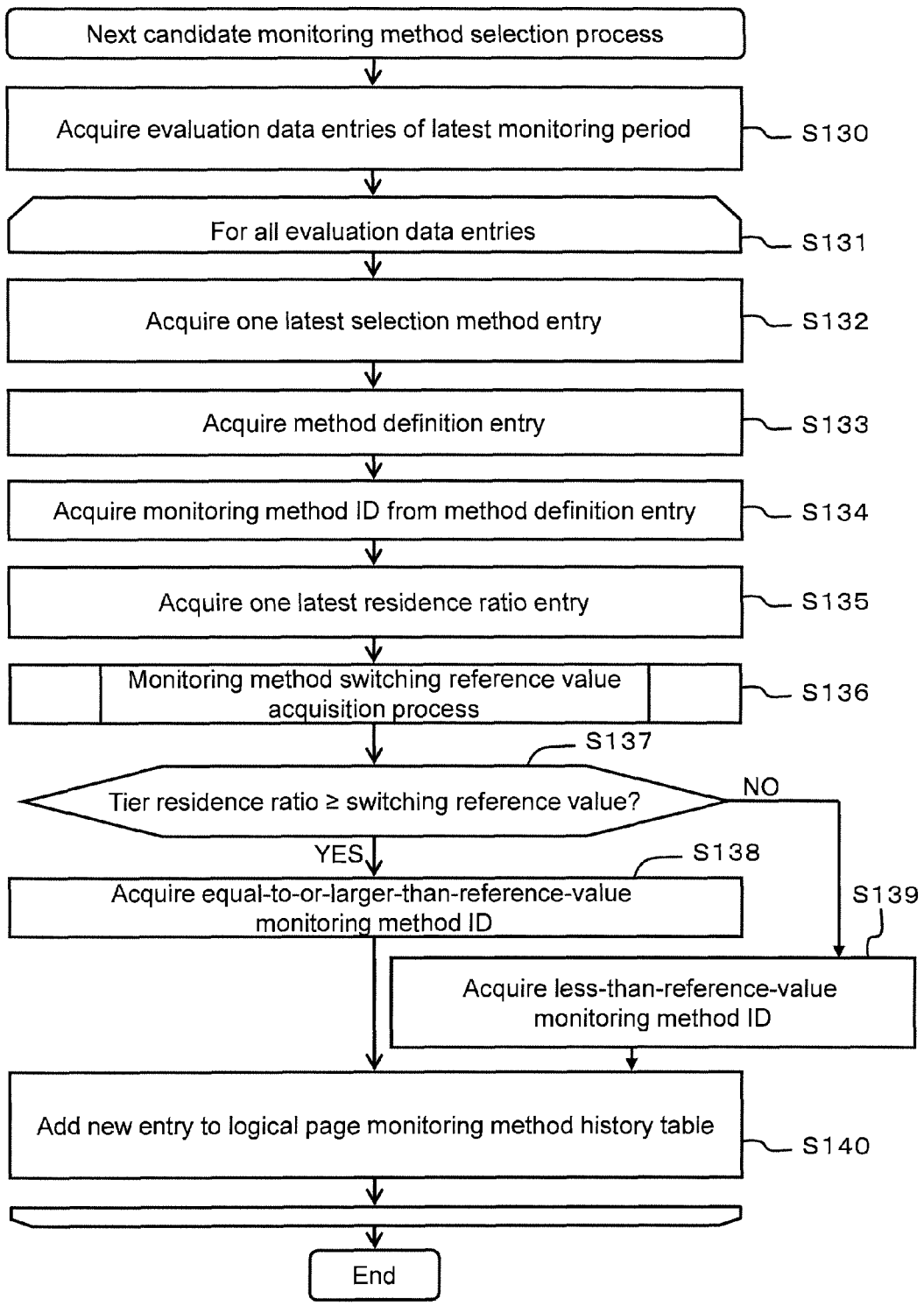
FIG. 35 is a flowchart of a management server-implemented process for selecting a monitoring method candidate to be used next time.

FIG. 35 is a flowchart of the processing shown in Step S120 in FIG. 34. The monitoring method selection module P35 acquires all the evaluation data entries of the latest monitoring period from the logical page load evaluation history table T32 (S130). The monitoring method selection module P35 executes the following steps S132 through S140 for all the evaluation data entries (S131).

The monitoring method selection module P35 uses the virtual volume identifier as a key to acquire one entry (an entry of the selected monitoring method) from the virtual volume selection monitoring method history table T39 (S132).

The monitoring method selection module P35 acquires an entry, which matches the next monitoring method identifier C392 of the entry acquired in Step S132, from the monitoring method definition table T33 (S133).

The monitoring method selection module P35 acquires the monitoring method identifier C330 from the entry acquired in Step S133 (S134). The monitoring method selection module P35 acquires one corresponding latest tier residence ratio entry from the logical page tier residence ratio history table T35 (S135).

Next, the monitoring method selection module P35 executes a process for acquiring a reference value for switching the monitoring method (S136). Step S136 will be explained in detail further below using FIG. 36.

The monitoring method selection module P35 determines whether the tier residence ratio acquired in Step S135 is equal to or larger than the switching reference value acquired in Step S136 (S137). In a case where the determination is that the tier residence ratio is equal to or larger than the switching reference value (S137: YES), the monitoring method selection module P35 acquires the monitoring method identifier C334 with respect to a case of equal to or larger than the reference value from the monitoring method definition table T33 (S138).

Alternatively, in a case where the determination is that the tier residence ratio is less than the switching reference value (S137: NO), the monitoring method selection module P35 acquires the monitoring method identifier C333 with respect to a case of less than the reference value from the monitoring method definition table T33 (S139).

Lastly, the monitoring method selection module P35 adds the respective attributes of the monitoring method historical entries and the identifier of the next monitoring method as new entries to the logical page monitoring method history table T38 (S140).

Figure 36:
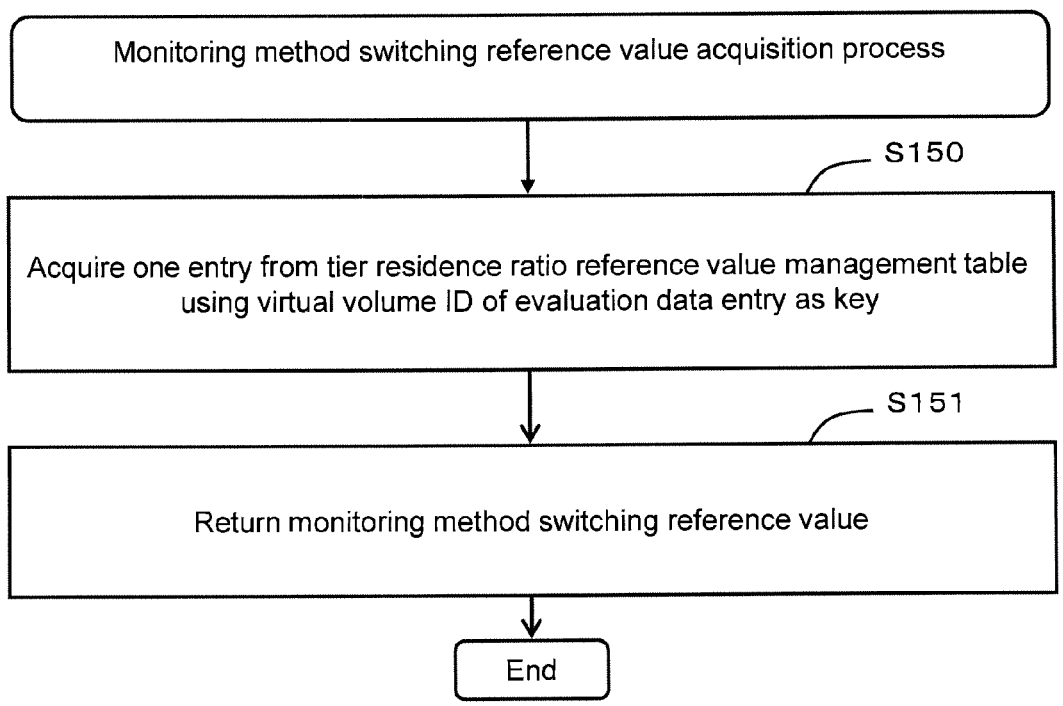
FIG. 36 is a flowchart of a management server-implemented process for acquiring a reference value for switching the monitoring method.

FIG. 36 is a flowchart of a process for acquiring a reference value for switching the monitoring method described in Step S136 in FIG. 35.

The monitoring method selection module P35 selects a switching reference value from the tier residence ratio reference value management table T37 using the virtual volume identifier of the evaluation data entry as a key (S150), and returns the selected switching reference value in the processing of FIG. 35 (S151).

Figure 37:
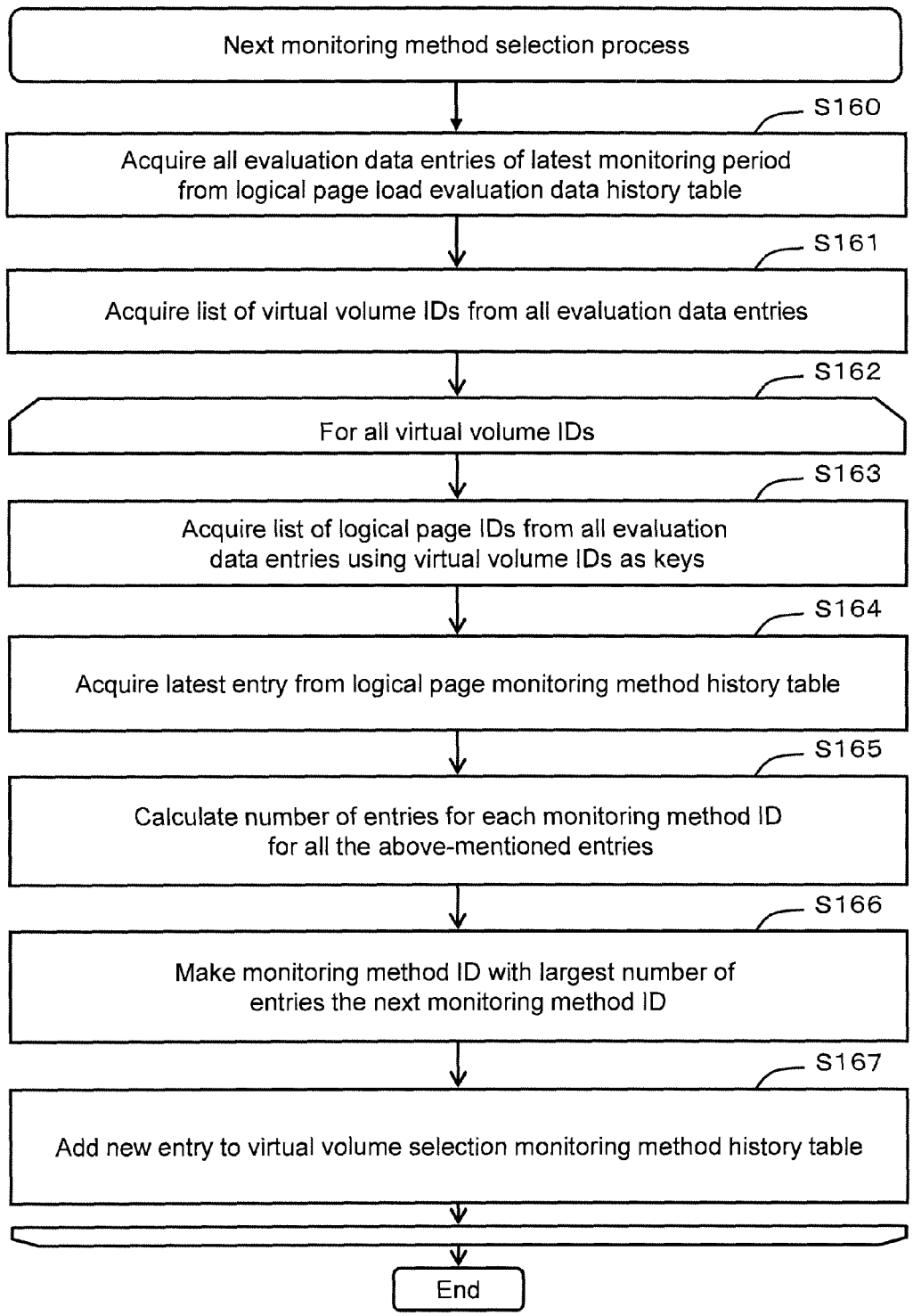
FIG. 37 is a flowchart of a management server-implemented process for selecting the next monitoring method.

FIG. 37 is a flowchart of the next monitoring method process described in Step S121 in FIG. 34. In this process, one monitoring method (the next monitoring method), which is to be applied to the entire virtual volume, is decided from among the logical page monitoring method candidates selected in Step S120 of FIG. 34.

The monitoring method selection module P35 acquires all the evaluation data entries of the latest monitoring period from the logical page load evaluation history table T32 (S160). The monitoring method selection module P35 acquires a list of virtual volume identifiers from the respective evaluation data entries (S161).

The monitoring method selection module P35 executes the following steps S163 through S167 for all the virtual volume identifiers (S162).

The monitoring method selection module P35 acquires a list of logical page identifiers from all the evaluation data entries using the virtual volume identifier as a key (S163). The monitoring method selection module P35 acquires the latest entry from the logical page monitoring method history table T38 (S164).

The monitoring method selection module P35 tabulates for each monitoring method the candidates for the next monitoring method selected for each logical page (S165). That is, the monitoring method selection module P35 counts the number of logical pages for which the single period mode is selected and the number of logical pages for which the multiple periods average mode is selected.

The monitoring method selection module P35 selects the monitoring method with the largest number of entries as the monitoring method for use in the next monitoring period (S166). Lastly, the monitoring method selection module P35 adds a new entry to the virtual volume selection monitoring method history table T39. The entry comprises the virtual volume identifier C390, the evaluation-target monitoring period C391, and the next monitoring method identifier C392.

A method for selecting one monitoring method candidate with the largest number of entries has been explained here, but another method may be used. For example, in a case where a monitoring method that differs from the current monitoring method is selected for any one of the logical pages 271 comprising the virtual volume 270, the changed monitoring method may be applied to the entire virtual volume. For example, in a case where the I/O characteristics of a portion of the logical pages change, and thereafter, the I/O characteristics of the remaining logical pages gradually change, the monitoring method can be changed ahead of this I/O characteristics change.

In addition, a specified either one or multiple logical pages may be used as a monitoring-target logical page(s) for monitoring whether or not the monitoring method has changed. In a case where the monitoring method of the monitoring-target logical page changes, the monitoring method applied to the entire virtual volume changes.

Figure 38:
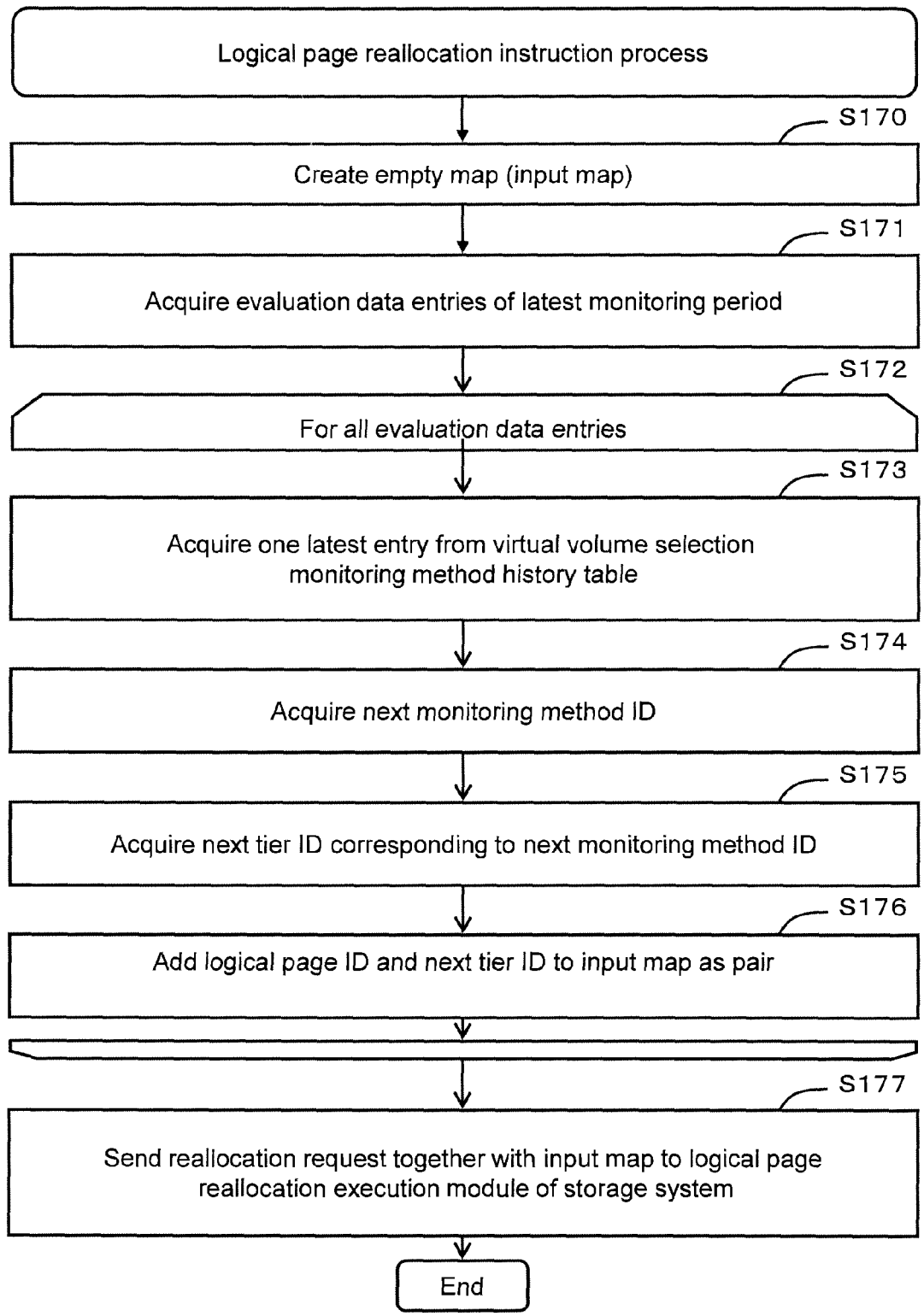
FIG. 38 is a flowchart showing a management server-implemented process for instructing a logical page reallocation.

FIG. 38 is a flowchart showing the processing of the logical page reallocation instruction module P36 of the management server 30.

The reallocation instruction module P36 creates an empty input map (S170). The input map is used for issuing a page reallocation instruction to the storage system 20.

The reallocation instruction module P36 acquires all the evaluation data entries of the latest monitoring period from the logical page load evaluation data history table T32 (S171). The reallocation instruction module P36 executes the following steps S173 through S176 for all the evaluation data entries (S172).

The reallocation instruction module P36 acquires the latest one entry from the virtual volume selection monitoring method history table T39 (S173). The reallocation instruction module P36 acquires the next monitoring method identifier C392 from this entry (S174).

The reallocation instruction module P36 acquires the tier identifier corresponding to the next monitoring method acquired in Step S174 from the next tier identifier C326 of the logical page load evaluation data history table T32 (S175).

The reallocation instruction module P36 adds a combination of the logical page identifier and the next tier identifier to the input map created in Step S170 (S176). Lastly, the reallocation instruction module P36 sends a reallocation request together with the input map to the reallocation execution module P22 in the storage system 20 (S177).

According to this example, which is configured in this manner, an appropriate monitoring method can be selected in accordance with the utilization status (I/O characteristics) of the virtual volume 270. Therefore, each logical page 271 comprising the virtual volume 270 can be allocated to the optimum tier 261 in accordance with the virtual volume utilization status. As a result of this, the high-performance tier 261A can be used effectively, unnecessary page reallocation can be held in check, and response performance can be made relatively stable. In addition, since the monitoring method changes automatically, the time and trouble involved in user management can be alleviated, and usability can be enhanced.

EXAMPLE 2

A second example will be explained by referring to FIGS. 39 through 45. Each of the following examples, to include this example, is equivalent to a variation of the first example. Therefore, the description will focus on the points of difference with the first example. In this example, a user interface G10 (FIG. 41) for enabling the user to check a setting status related to a page reallocation, and to change a setting value manually is provided.

Figure 39:
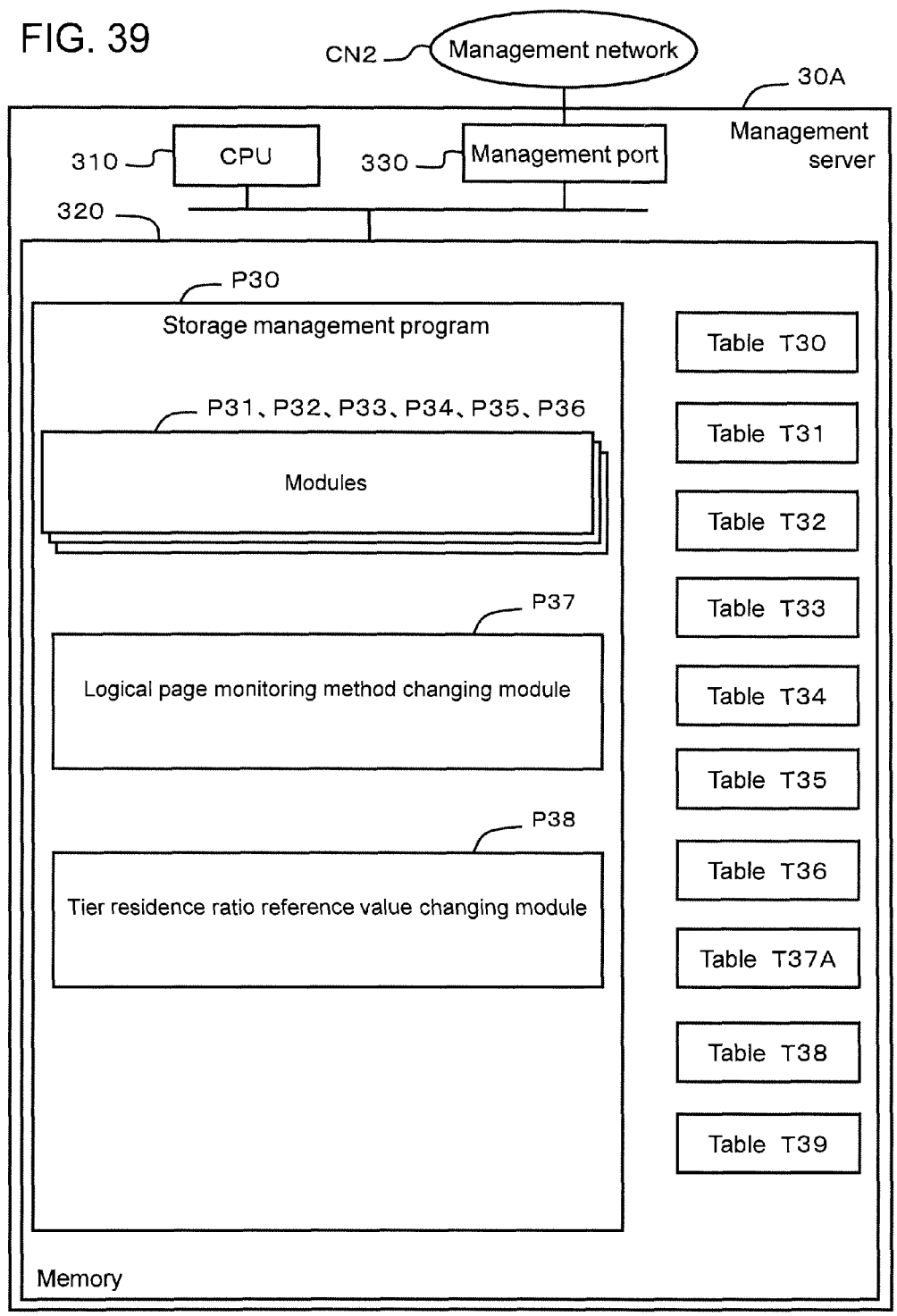
FIG. 39 shows an example of the configuration of a management server related to a second example.

FIG. 39 shows the configuration of a management server 30A of this example. In comparison to the management server 30 of the first example, the management server 30A of this example adds new program modules P37 and P38 to the storage management program P30. These new modules P37 and P38 will be explained in detail further below using FIGS. 43 and 44. These new modules P37 and P38 are computer programs for changing the monitoring method and the reference value of the tier residence ratio in accordance with an instruction from the user.

Figure 40:
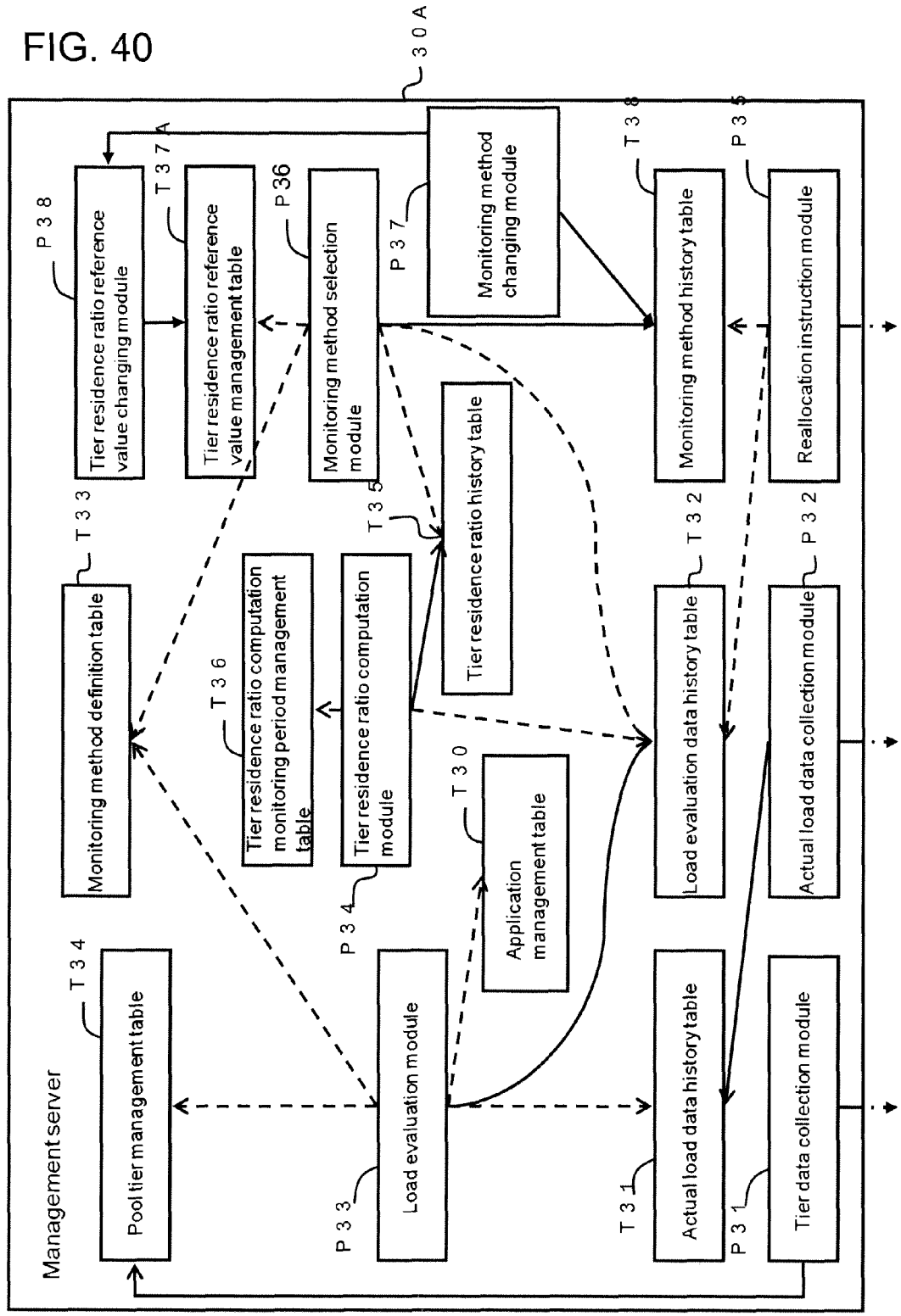
FIG. 40 is an illustration showing the relationship between the modules and the tables of the management server.

FIG. 40 shows the relationships between the various types of modules P31 through P38 and tables T30 through T38 of the management server 30A.

Figure 41:
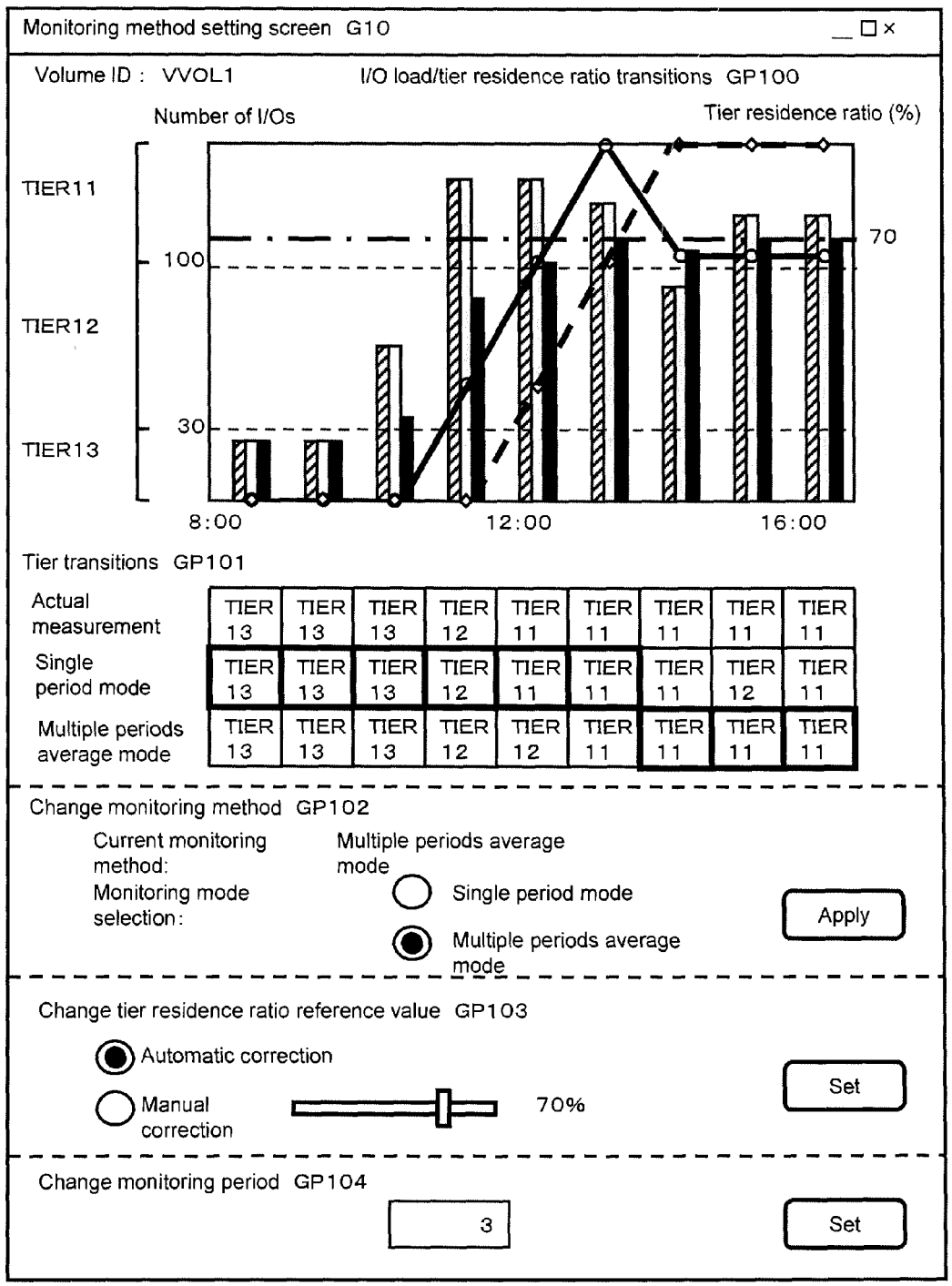
FIG. 41 shows an example of monitoring method setting screen displayed by the management server.

FIG. 41 shows the setting screen G10 displayed by the management server 30A. The user can check various types of statuses related to the monitoring method and change a setting value by way of the setting screen G10.

The setting screen G10, for example, can comprise a graph display part GP100, a tier transition display part GP101, a monitoring method changing part GP102, a tier residence ratio reference value changing part GP103, and a monitoring period changing part GP104.

The graph display part GP100 displays a graph of variations in time of the I/O load (the number of I/Os per unit of time). The vertical axis on the left side of the graph shows the number of permissible I/Os of each tier 261. The vertical axis on the right side of the graph shows the tier residence ratio. The "70%" shown in the vertical axis on the right side is the reference value of the tier residence ratio.

The horizontal axis of the graph shows the passage of time. As an example, the variations in time of the I/O load from 8 o' clock in the morning until 4 o' clock in the afternoon are displayed using a bar graph. The diagonal-line bars show the actual measured values of the I/O load. The white bars show the I/O load calculated using the single period mode. The black bars show the I/O load calculated using the multiple periods average mode.

Multiple line graphs are also displayed together with the bar graph. The solid-line line graph shows the time variations of the tier residence ratio in the case of the single period mode. The broken-line line graph shows the time variations of the tier residence ratio in the case of the multiple periods average mode.

As is clear from the graph, in the case of the multiple periods average mode, since an average value of the I/O loads of multiple periods is used, the affect on the tier residence ratio can be minimized even in a case where the actual measured value of the I/O load decreased temporarily. By contrast, in the single period mode, the tier residence ratio can be made to quickly conform to a change in the actual measured value of the I/O load.

The tier transition display part GP101 calculates and displays for each monitoring method to which of the respective tiers 261A (tier 11), 261B (tier 12) or 261C (tier 13) the data of each logical page 271 of the virtual volume 270 will be allocated. The tier transition display part GP101 displays the allocation-destination tier in units of virtual volumes.

It is also possible to display the respective allocation-destination tiers for each logical page in the virtual volume on the screen. However, in this case, the user's visibility decreases, making it difficult for the user to grasp the status. Consequently, in this example, information regarding the allocation-destination tier is consolidated and presented to the user. This enables the user to quickly and adequately grasp the status and enhances usability.

Various methods can be thought of for consolidating the allocation-destination tier information. One method adopts a majority rule with respect to the logical pages comprising a virtual volume, and displays the most numerous of the allocation-destination tiers on the tier transition display part GP101 as the allocation-destination tier, which is representative of the virtual volume. Another method makes the allocation-destination tier of the logical page that triggered a method switch representative of the virtual volume. A configuration that color codes the logical page allocation-destination tier, and renders the tier transition display as a heat map is also conceivable. In this case, the user can confirm at a glance where each logical page of the virtual volume is allocated based on the color distribution status.

Regardless of what monitoring method has actually been selected, both the allocation-destination tier (reallocation-destination tier) in a case where the single period mode is selected and the allocation-destination tier (reallocation-destination tier) in a case where the multiple periods average mode is selected are displayed on the display part GP101.

Therefore, the user can easily learn which tier each logical page has been allocated to in a case where a monitoring method, which had not been selected, is selected.

The monitoring method changing part GP102 is for the user to manually change the monitoring method. The user can manually change the current monitoring method to another monitoring method by checking the graph display part GP100 and the tier transition display part GP101.

The tier residence ratio reference value changing part GP103 is for changing a correction mode for the reference value of the tier residence ratio, and for the user to perform a manual change. The reference value of the tier residence ratio can be corrected automatically. For example, it is possible to change the tier residence ratio in accordance with the utilization status of each tier 261. When the user selects manual correction, the reference value of the tier residence ratio can be changed manually. When changing the reference value of the tier residence ratio, the user can refer to the display contents of the graph display part GP100 and the tier transition display part GP101.

The reference value of the tier residence ratio can also be corrected automatically in accordance with changing the monitoring mode manually.

Properly configuring the tier residence ratio reference value, which constitutes the criterion for switching the monitoring method, is considered to be a difficult task for the ordinary user. Consequently, in this example, when the monitoring method is changed manually by the user, it is determined to be because the tier residence ratio reference value was not configured properly.

For example, in a case where the monitoring mode is switched manually from the multiple periods average mode to the single period mode, it is determined that the reference value of the tier residence ratio was lower than the value intended by the user, and the reference value is revised upwards. For example, 10 is added to the reference value. In contrast to this, in a case where the monitoring mode is switched manually from the single period mode to the multiple periods average mode, it is determined that the reference value of the tier residence ratio was higher than the value intended by the user, and the reference value is revised downwards. For example, 10 is subtracted from the reference value.

The monitoring period changing part GP104 is for the user to manually change the number of monitoring periods for computing the tier residence ratio of the tier residence ratio computation monitoring period management table T36 shown in FIG. 18. When the user inputs a value to the monitoring period changing part GP104 and presses the set button, the value of the tier residence ratio computation monitoring period management table T36 is overwritten with the user specified value.

The configuration may also be such that multiple tier residence ratios can be configured in the tier residence ratio computation monitoring period management table T36. For example, the configuration may be such that various tier residence ratios can be configured in either virtual volume units, application units, or other units as in the tier residence ratio reference value management table T37A shown in FIG. 42. This enables the realization of more fine-tuned control.

FIG. 42 shows a tier residence ratio reference value management table T37A of the management server 30A. This reference value management table T37A comprises a new correction method C372 not found in the reference value management table T37 of FIG. 19. The correction method C372 is information for selecting either automatic correction or manual correction of the reference value of the tier residence ratio.

Figure 43:
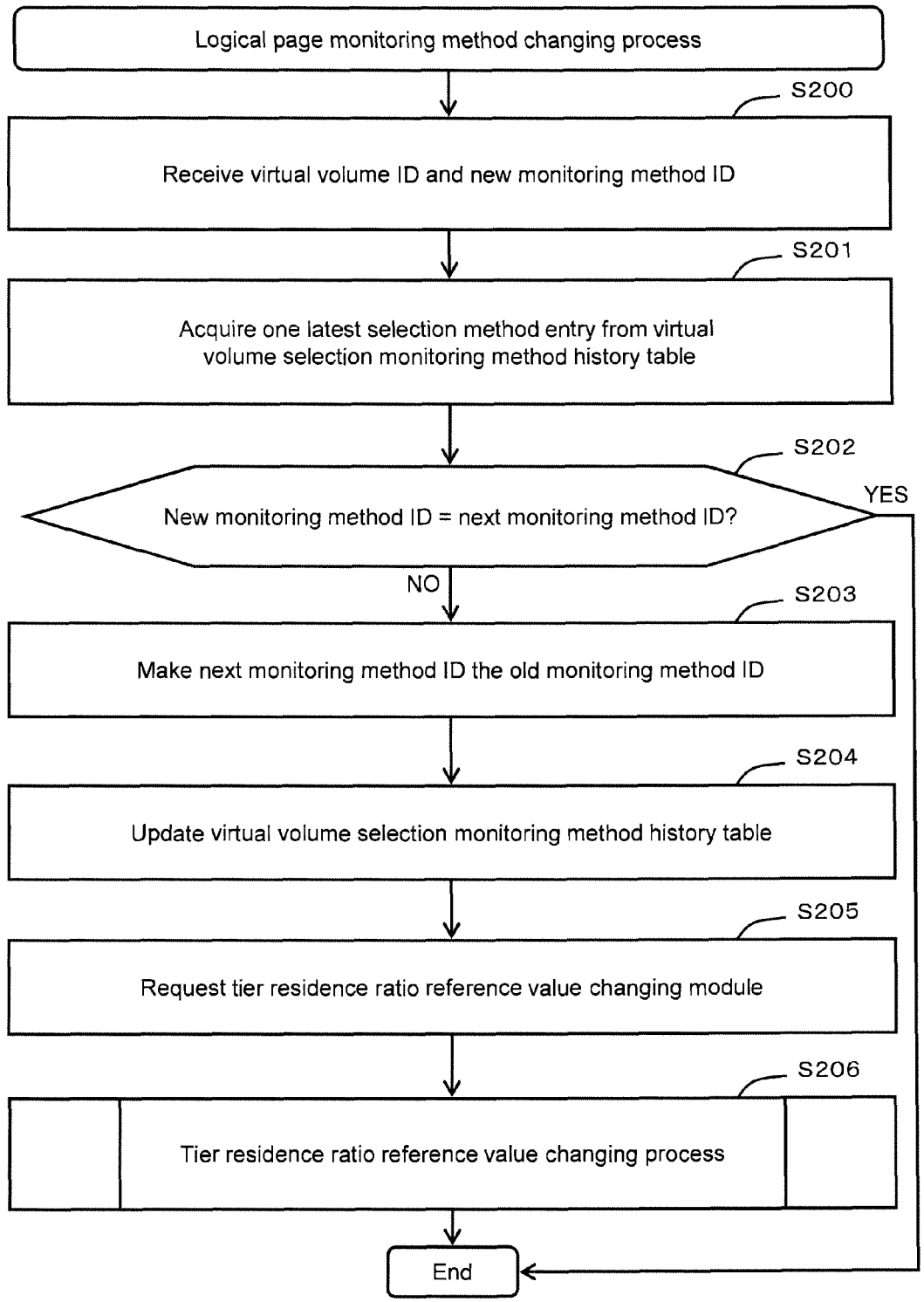
FIG. 43 is a flowchart of a management server-implemented process for changing the monitoring method of a logical page.

FIG. 43 is a flowchart showing the processing of a logical page monitoring method changing module P37 of the management server 30A.

The monitoring method changing module P37 first receives a virtual volume identifier and a newly specified new monitoring method identifier as input values (S200). The monitoring method changing module P37 uses the virtual volume identifier as a key to acquire one new entry (next monitoring method identifier C392) from the virtual volume selection monitoring method history table T39 (S201).

The monitoring method changing module P37 determines whether the inputted new monitoring method identifier matches the next monitoring method identifier (S202). In a case where the two identifier match (S202: YES), this processing is ended.

In a case where the new monitoring method identifier does not match the next monitoring method identifier (S202: NO), the monitoring method changing module P37 makes the next monitoring method identifier the old monitoring method identifier (S203).

The monitoring method changing module P37 updates the entry acquired in Step S201 from the virtual volume selection monitoring method history table T39 using the new monitoring method identifier selected by the user (S204). In accordance with this, the I/O load is evaluated in accordance with the user-selected monitoring method in the next monitoring period.

The monitoring method changing module P37 sends a request to a tier residence ratio reference value changing module P38 for the automatic correction of the tier residence ratio (S205). The monitoring method changing module P37 executes a process for changing the reference value of the tier residence ratio (S206).

Figure 44:
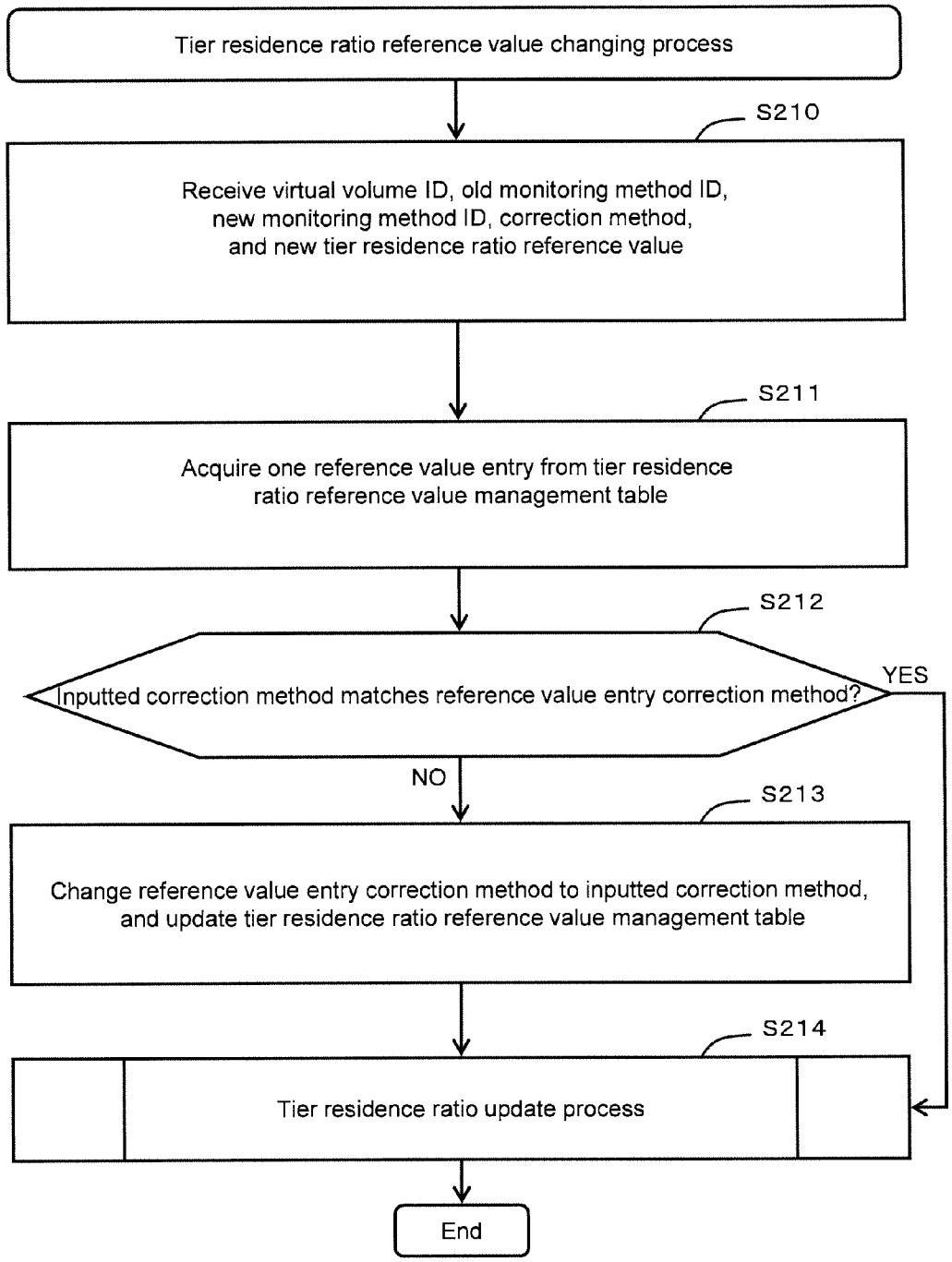
FIG. 44 is a flowchart showing a management server-implemented process for changing the reference value of the tier residence ratio.

FIG. 44 shows the processing of the tier residence ratio reference value changing module P38 of the management server 30A. FIG. 44 shows Step S206 in FIG. 43 in detail.

The reference value changing module P38 receives a virtual volume identifier, an old monitoring method identifier, a new monitoring method identifier, a correction method, and a new tier residence ratio reference value as input (S210). At this point in time, the value of the new tier residence ratio reference value is null.

The reference value changing module P38 acquires one reference value entry from the tier residence ratio reference value management table T37A using the virtual volume identifier as a key (S211). The reference value changing module P38 determines whether the correction method inputted in Step 5210 matches the correction method C372 in the entry acquired in Step 5211 (S212). In a case where the inputted correction method matches the current correction method (C372) (S212: YES), the reference value changing module P38 skips Step 5213 and moves to Step 5214.

In a case where the inputted correction method does not match the current correction method (S212: NO), the reference value changing module P38 changes the correction method which is under an entry state (C372) to the correction method inputted in Step S210, and updates the tier residence ratio reference value management table T37A (S213).

Lastly, the reference value changing module P38 executes a process for updating the reference value of the tier residence ratio (S214).

Figure 45:
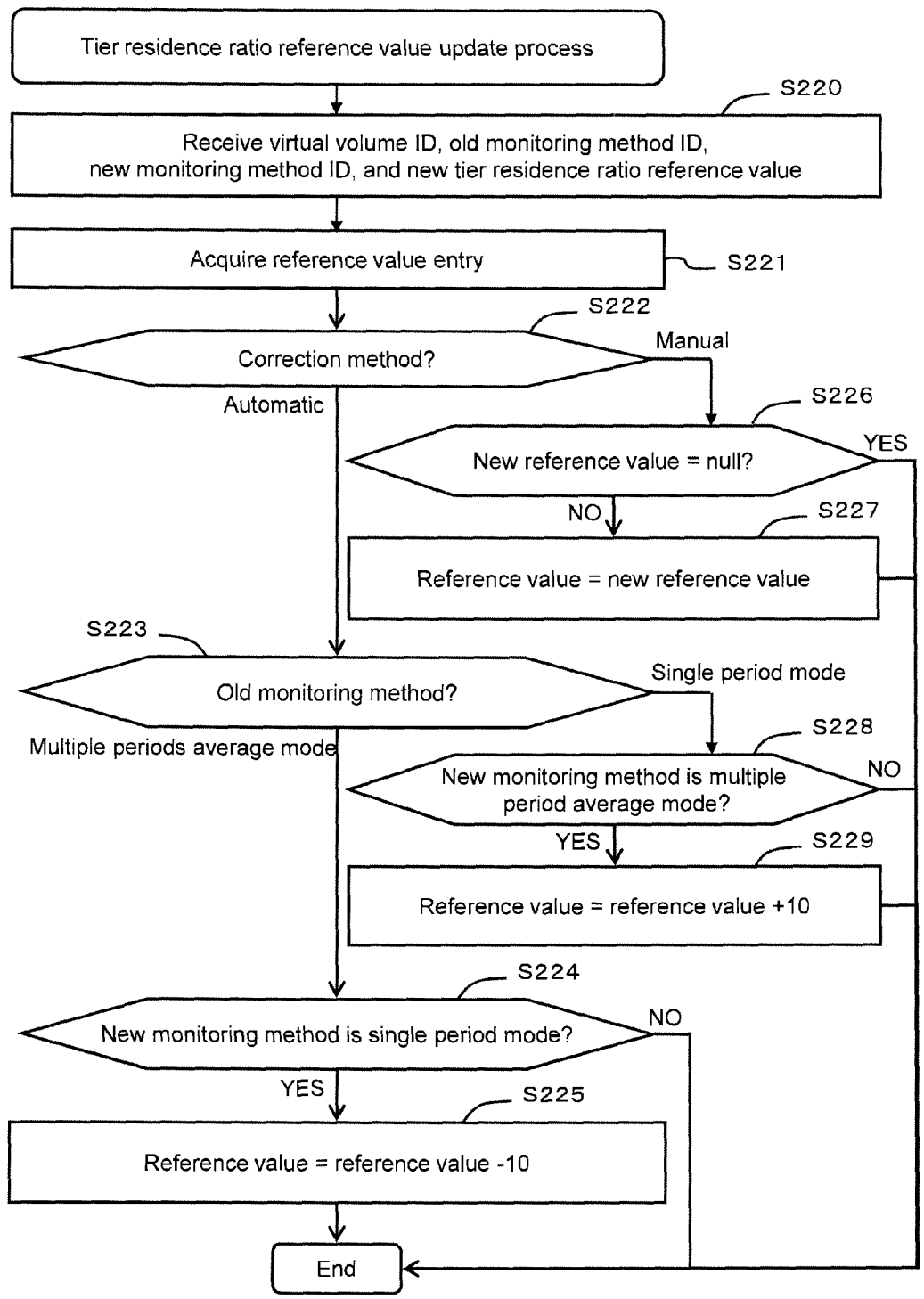
FIG. 45 is a flowchart of a management server-implemented process for updating the reference value of the tier residence ratio.

FIG. 45 is a flowchart of the process for updating the reference value of the tier residence ratio. This process shows Step S214 in FIG. 44 in detail.

The reference value changing module P38 receives a virtual volume identifier, an old monitoring method identifier (the current monitoring method identifier), a user-selected new monitoring method identifier, and a new tier residence ratio reference value as input (S220). In addition, the reference value changing module P38 acquires a reference value entry from the tier residence ratio reference value management table T37A (S221).

The reference value changing module P38 determines whether the value of the correction method C372 in the acquired reference value entry is "automatic" or "manual" (S222).

In a case where automatic is configured in the correction method (S222: automatic), the reference value changing module P38 determines whether the old monitoring method is the single period mode or the multiple periods average mode (S223).

In a case where the old monitoring method is configured to the multiple periods average mode (S223: multiple periods average mode), the reference value changing module P38 determines whether the new monitoring mode selected by the user is the single period mode (S224).

In a case where the new monitoring mode is the single period mode (S224: YES), the reference value changing module P38 subtracts 10 from the reference value of the tier residence ratio, and updates the tier residence ratio reference value management table T37A (S225). Since the user-desired monitoring method differs from the current monitoring method, the reference value for switching the tier residence ratio is corrected so as to make it closer to the user-intended value.

In Step S222, in a case where "manual" is configured as the correction method for the reference value entry (S222: manual), the reference value changing module P38 determines whether the new reference value received in Step S220 is null (S226). In a case where the new reference value is null (S226: YES), this processing ends. This is because the user has not inputted a numerical value despite the fact that it is the manual correction mode.

Alternatively, in a case where the new reference value is not null (S226: NO), the reference value changing module P38 overwrites the reference value in the reference value entry with the new reference value, updates the tier residence ratio reference value management table T37A (S227), and ends the processing.

In Step S223, in a case where the determination is that the old monitoring method is configured to the single period mode (S223: single period mode), the reference value changing module P38 determines whether the new monitoring method is the multiple periods average mode (S228). In a case where the new monitoring method is not the multiple periods average mode (S228: NO), the processing is ended since the old monitoring method and the new monitoring method are both the single period mode.

In a case where the new monitoring method is the multiple periods average mode (S228: YES), the reference value changing module P38 adds 10 to the reference value and updates the tier residence ratio reference value management table T37A (S229).

Thus, in a case where the monitoring method has been changed from the multiple periods average mode to the single period mode, the reference value is determined to be lower than the user-intended value, and the reference value is revised upward (+10). Alternatively, in a case where the monitoring method has been changed from the single period mode to the multiple periods average mode, the reference value is determined to be higher than the user-intended value, and the reference value is revised downward (−10).

Configuring this example in this manner also achieves the same effects as the first example. In addition, in this example, a screen G10 for displaying information related to a reallocation and monitoring is provided to the user. Also, in this example, the user is able to use the setting screen G10 to change the monitoring method, the tier residence ratio reference value, and the monitoring period. Therefore, a reallocation corresponding to the user's intent can be performed, enhancing usability.

In this example, in a case where the user changes the monitoring method manually, the tier residence ratio reference value is corrected automatically in accordance with this change, further enhancing usability.

The user can judge relatively easily whether any monitoring method of multiple monitoring methods is suitable based on the display contents of the graph display part GP100 and the tier transition display part GP101. However, it is difficult for an ordinary user to configure a tier residence ratio reference value, which is suitable for the I/O characteristics and the monitoring method. Consequently, in this example, the changing of the monitoring method by the user is reflected in the tier residence ratio reference value.

EXAMPLE 3

A third example will be explained by referring to FIGS. 46 through 58. In this example, a concept called application group is introduced. The application group is an aggregation of the multiple applications P10 in the configuration of the second example. It is supposed that a certain application can become an element of one certain application group.

In this example, as will be explained further below, the user can check chronological changes in the I/O load, the allocation-destination tier, the tier residence ratio, and the monitoring method, and can change the monitoring method and the tier residence ratio reference value in units of application groups.

Multiple applications having similar I/O characteristics belong to the same application group, and are managed as a single application group. According to the introduction of the application group, the user is able to realize the optimization of page reallocation using a unit that is larger than a virtual volume unit. In addition, increasing the granularity of the management target makes it possible to reduce the number of management targets that the user has to manage, enabling user storage management costs to be lowered as a result.

In this example, a case in which the user manually configures which application belongs to which application group will be explained. Instead of this, the configuration may also be such that a prescribed criterion for defining what type of application belongs to which application group is prepared beforehand, and an application group is automatically created in accordance with this criterion. The user can also manually revise an application group, which has been created automatically.

Figure 46:
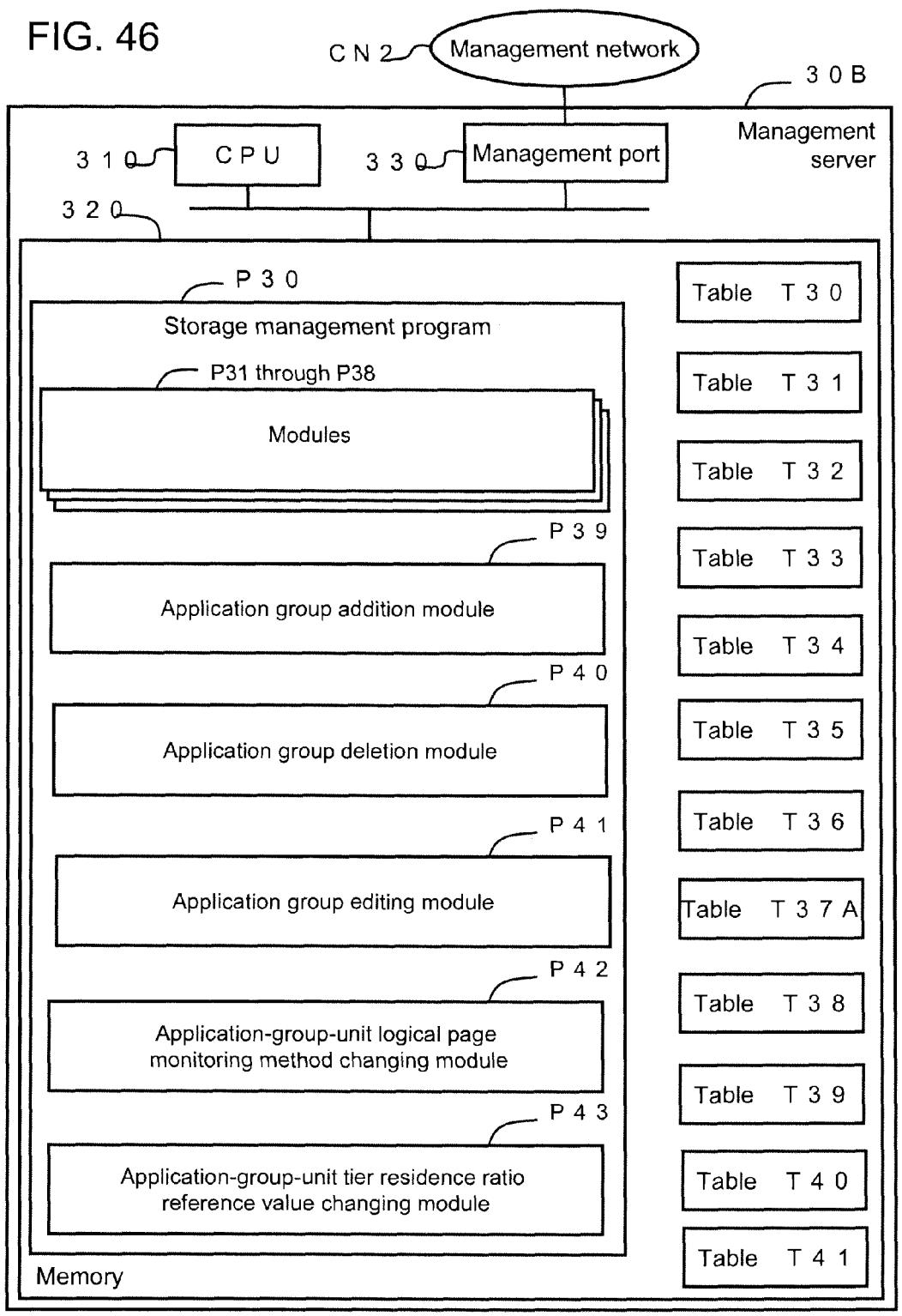
FIG. 46 shows an example of the configuration of a management server related to a third example.

FIG. 46 shows the configuration of a management server 30B of this example. The management server 30B of this example adds new program modules P39 through P43 and new tables T40 and T41 not included in the management server 30A described in the second example.

Figure 47:
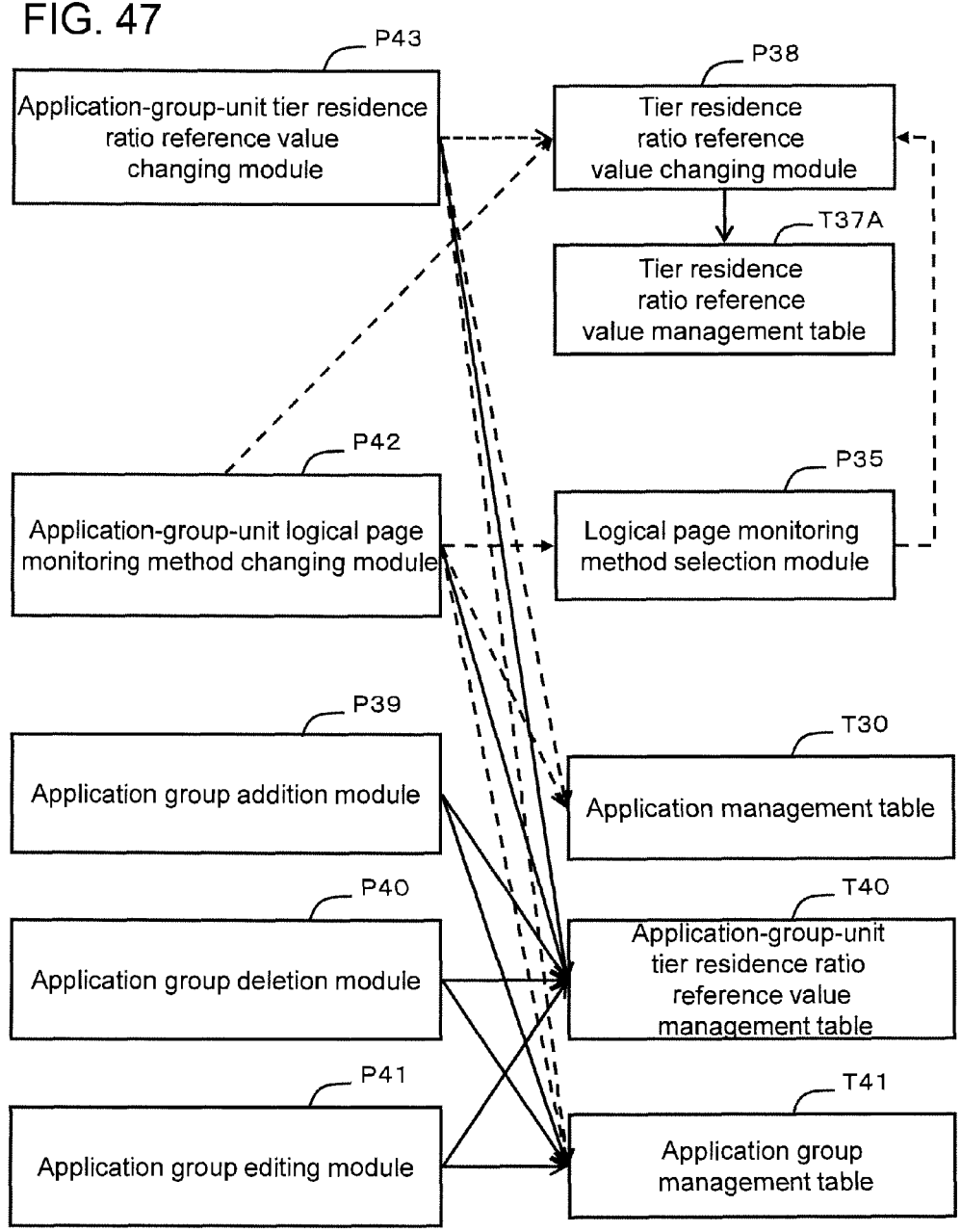
FIG. 47 is an illustration showing the relationships between the modules and the tables related to a configuration for managing an application group from among the modules and the tables of the management server.

FIG. 47 is an illustration showing the relationships between the modules P39 through P43 and the tables T40 and T41 newly added in the management server 30B of this example.

FIG. 48 shows an application group list screen G20 displayed by the management server 30B. The application group list screen G20, for example, displays the name of the currently selected monitoring method, the tier residence ratio reference value (the monitoring method switching reference value in the drawing), and the selected correction method for each application group.

For example, an OK button, a create button, an edit button, and a delete button can also be provided in the application group list screen G20. When the user presses the OK button, the application group list screen G20 closes.

When the user presses the create button, the management server 30B moves to a creation screen G30, which will be described using FIG. 49, enabling a new application group to be created. When the user presses the edit button after selecting the existing application group, the management server 30B moves to an editing screen G40, which will be described using FIG. 50, enabling the content of the application group to be edited. Pressing the delete button after selecting the existing application group enables the user to delete the application group.

Figure 49:
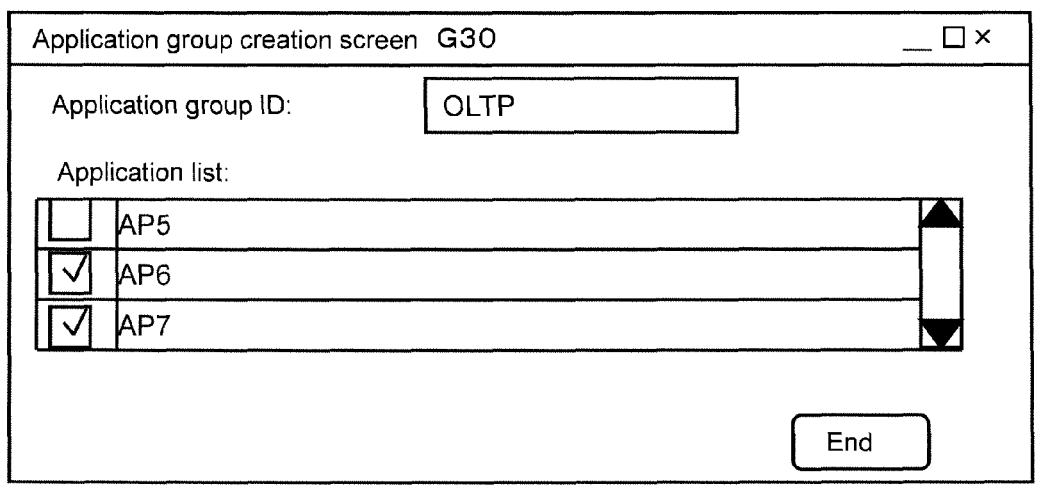
FIG. 49 is an example of an application group creation screen displayed by the management server.

FIG. 49 is an example of the application group creation screen G30 displayed by the management server 30B. The application group creation screen G30 displays an application group identifier for identifying the application group to be created. In addition, the application group creation screen G30 comprises an application selection part for the user to select from the application list an application to be included in the new application group.

Figure 50:
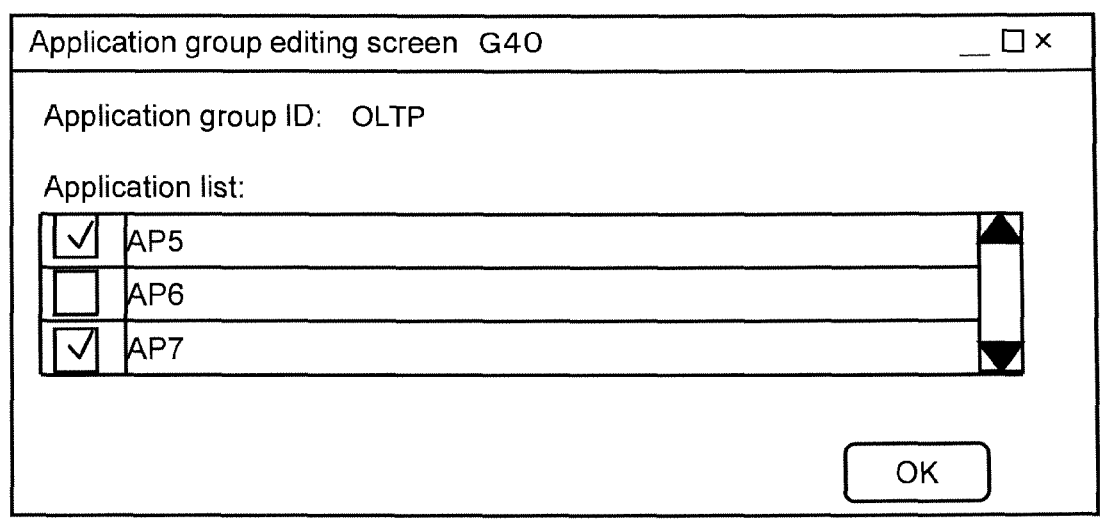
FIG. 50 is an example of an application group editing screen displayed by the management server.

FIG. 50 shows an example of the application group editing screen G40 displayed by the management server 30B. By using the application group editing screen G40, the user is able to delete an application registered in the edit-target application group, or to add a new application.

Figure 51:
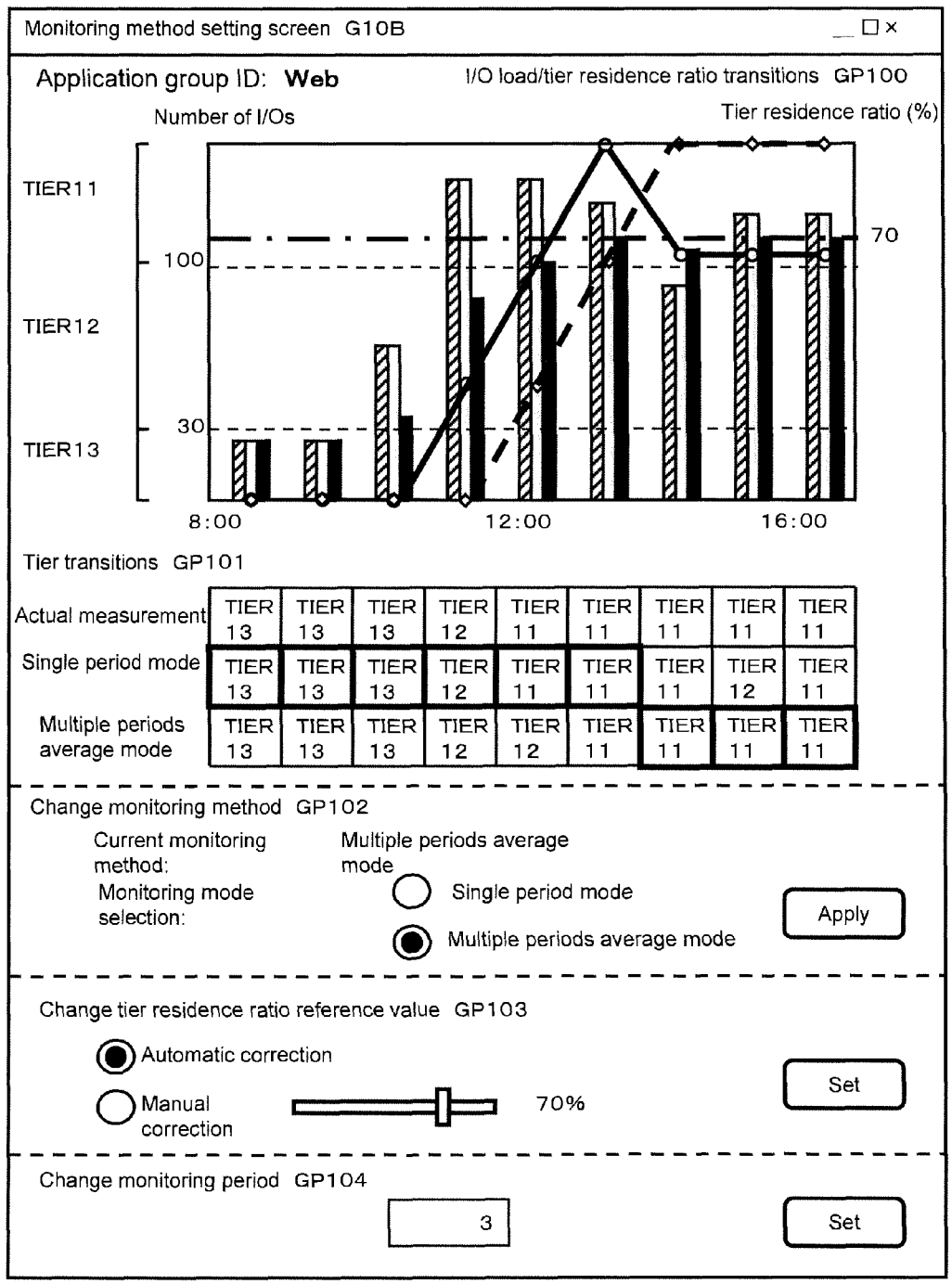
FIG. 51 is an example of a monitoring method setting screen displayed by the management server.

FIG. 51 shows a monitoring method setting screen G10B displayed by the management server 30B. This setting screen G10B differs from the setting screen G10 (FIG. 41) described in the second example in that the display unit has been changed from the virtual volume unit to an application group unit.

FIG. 52 is a table T40 of the management server 30B for managing the reference value of the tier residence ratio in units of application groups.

This tier residence ratio reference value management table T40, for example, correspondingly manages an application group identifier C400, an identifier C401 denoting the current monitoring method, a reference value C402 for switching the monitoring method, and a correction method C403. When table T40 of FIG. 52 is compared to table T37A of FIG. 42, the two tables differ in that the virtual volume identifier has been changed to the application group identifier, and, in addition, the identifier of the current monitoring method has been added.

FIG. 53 shows an example of an application group management table T41 of the management server 303. The application group management table T41, for example, correspondingly manages an application identifier C410 and an application group identifier C411. The application groups, for example, include "database", which groups together database-related applications, "web", which groups together web applications, and "batch", which groups together batch processes.

Figure 54:
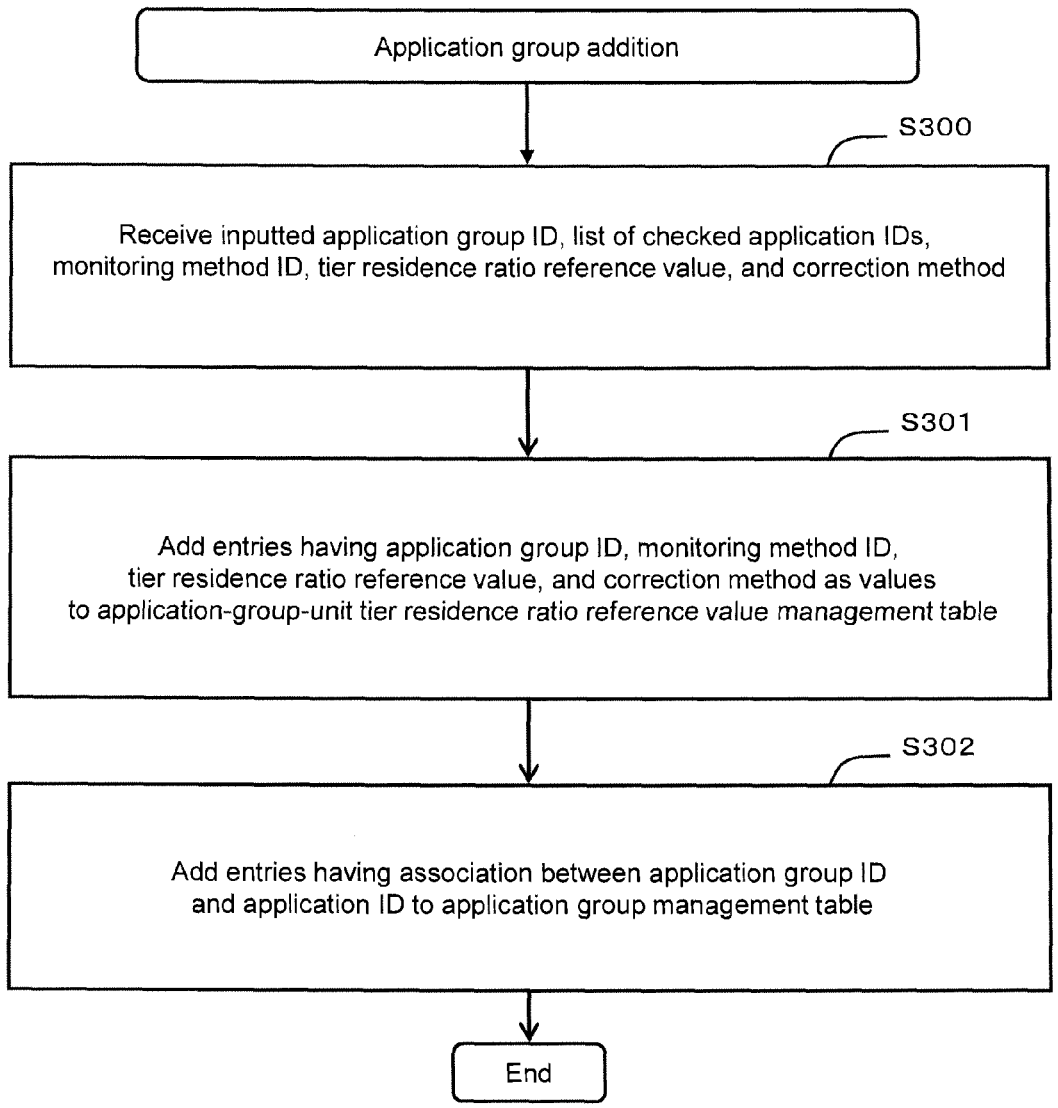
FIG. 54 is a flowchart of a management server-implemented process for adding an application group.

FIG. 54 is a flowchart showing the processing of an application group addition module P39 of the management server 30B. The application group addition module P39 is executed when an end button is pressed in a state in which an application group identifier has been inputted in the application group creation screen G30, and, in addition, a minimum of one application has been selected.

A preconfigured initialization value is used for the monitoring method identifier, the tier residence ratio reference value, and the correction method, which are other inputs in this process.

The application group addition module P39 receives an application group identifier, a monitoring method identifier, a tier residence ratio reference value, and a correction method as input (S300).

The application group addition module P39 adds a new entry to the application-group-unit tier residence ratio reference value management table T40 (S301). This new entry comprises the information received in Step S300.

The application group addition module P39 adds an entry, which is associated with the application identifier and the application group identifier, in the application group management table T41 (S302).

Figure 55:
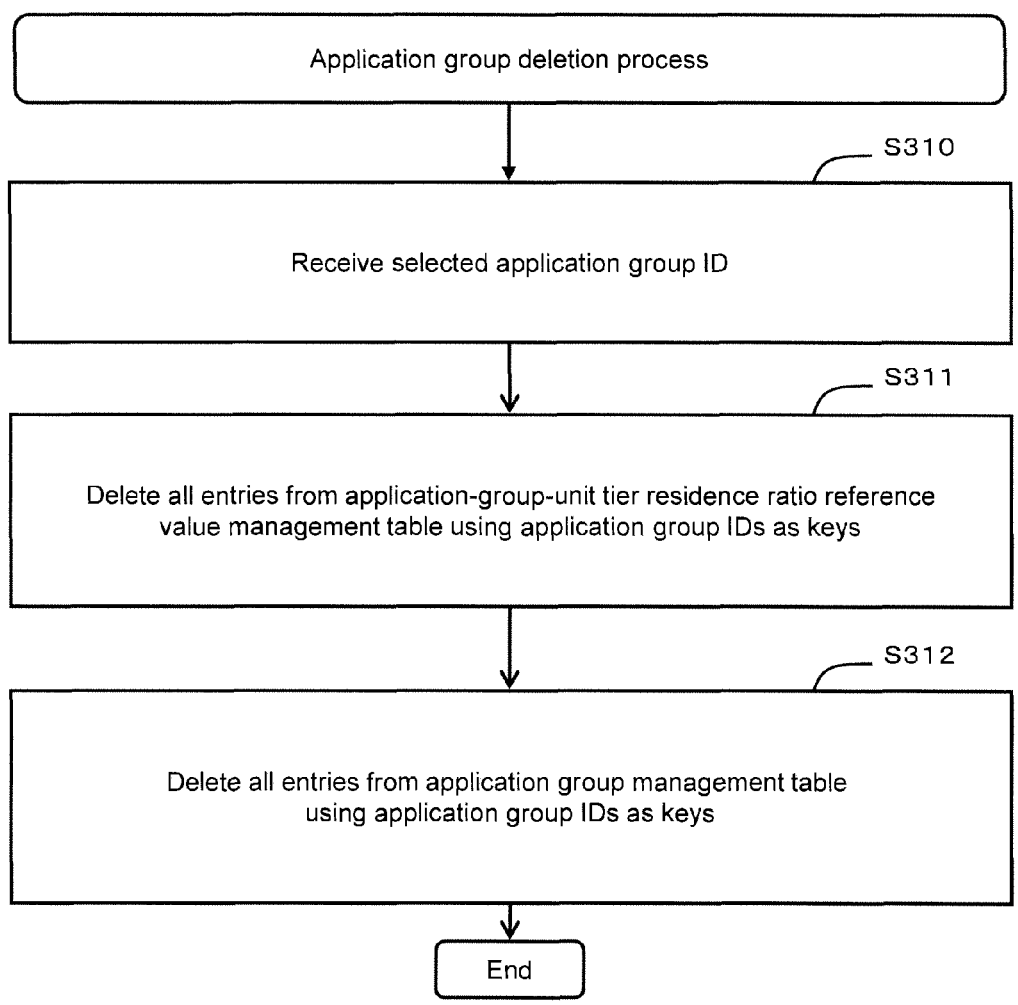
FIG. 55 is a flowchart of a management server-implemented process for deleting an application group.

FIG. 55 is a flowchart showing the processing of an application group deletion module P40 of the management server 30B. This processing is executed when the delete button is pressed in a state in which one application groups has been selected in the application group list screen G20.

The application group deletion module P40 receives an application group identifier selected as a deletion-target as input (S310). The application group deletion module P40 deletes all the entries comprising the specified application group identifier from the application-group-unit tier residence ratio reference value management table T40 (S311). Lastly, the application group deletion module P40 deletes all the entries comprising the specified application group identifier from the application group management table T41 (S312).

Figure 56:
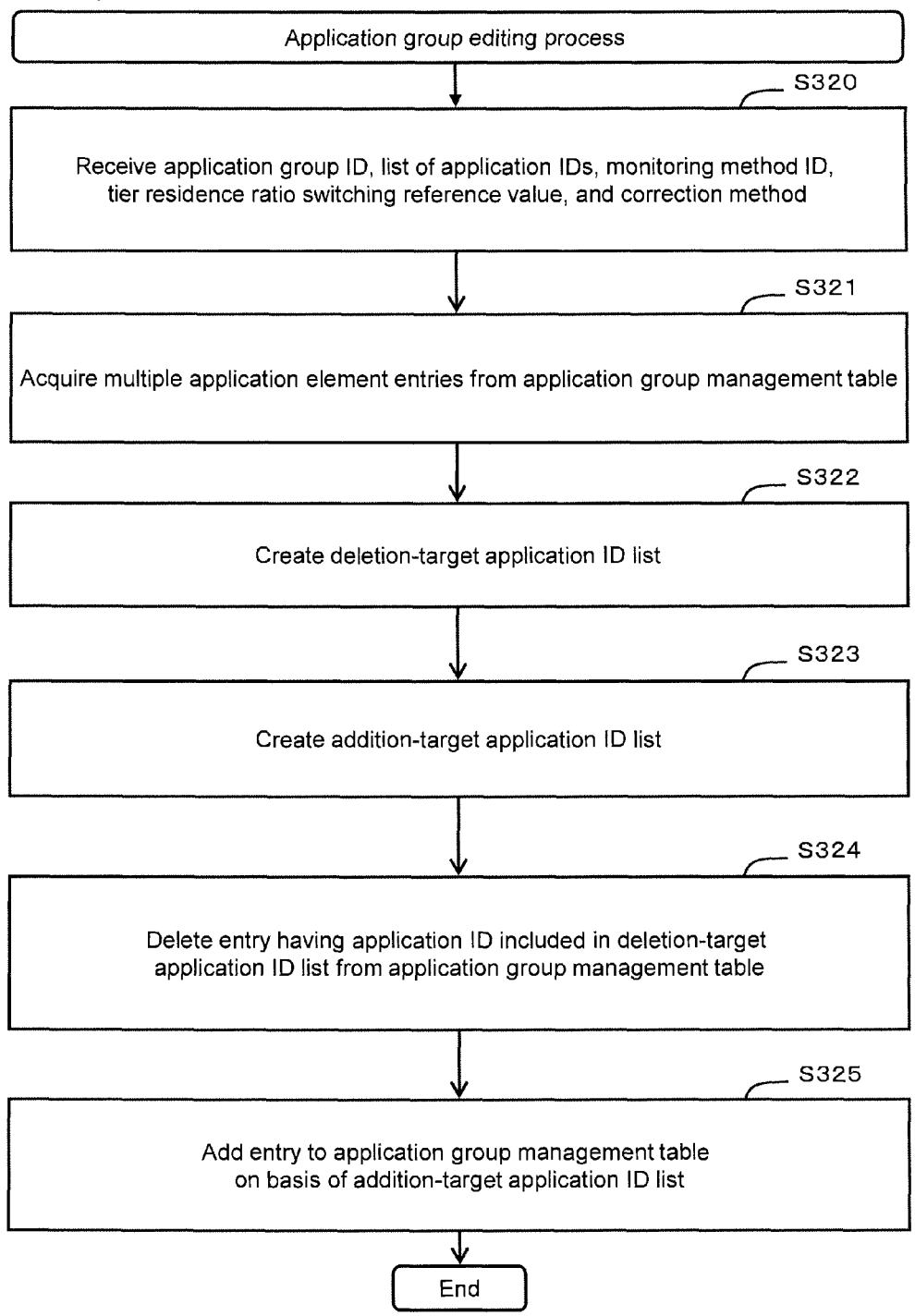
FIG. 56 is a flowchart of a management server-implemented process for editing an application group.

FIG. 56 is a flowchart showing the processing of an application group editing module P41 of the management server 30B. This processing is executed when the end button is pressed in a state in which a minimum of one application has been checked in the application group editing screen G40.

The editing module P41 receives an application group identifier, a list of application identifiers, a monitoring method identifier, a tier residence ratio switching reference value, and a correction method as input (S320).

The editing module P41 acquires multiple application entries from the application group management table T41 (S321). The editing module P41 creates a list of deletion-target application identifiers (S322). The deletion-target application identifier is an application identifier, which is not included in the list of application identifiers inputted in Step S320, but is included in the application entry acquired in Step S321.

Next, the editing module P41 creates a list of add-target application identifiers (S323). The add-target application identifier is an application identifier, which is included in the list of application identifiers inputted in Step S320, but is not included in the application entry acquired in Step S321.

The editing module P41 deletes all entries having the application identifier included in the deletion-target application identifier list from the application group management table T41 (S324).

The editing module P41 adds an entry to the application group management table T41 on the basis of the add-target application identifier list (S325).

Figure 57:
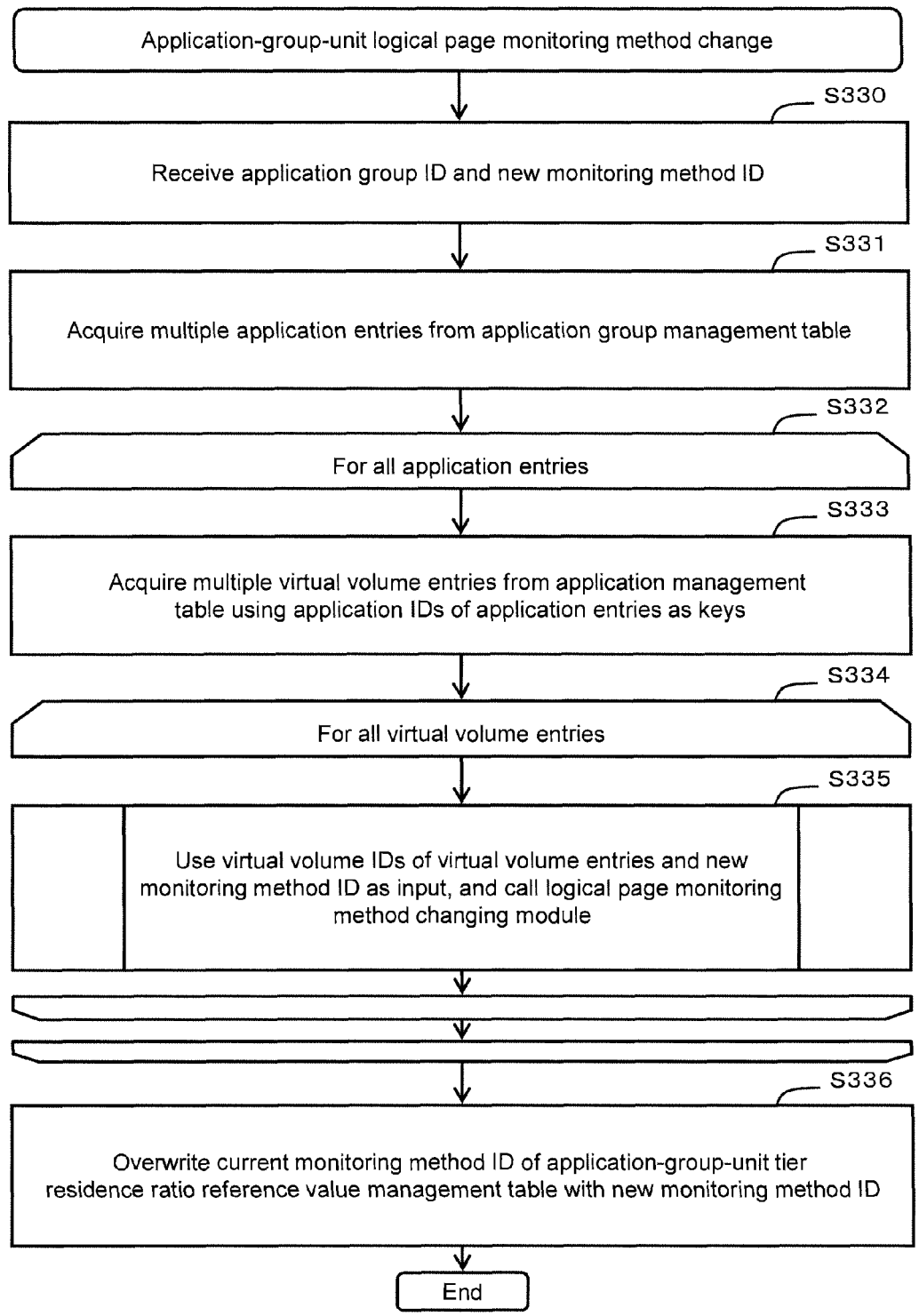
FIG. 57 is a flowchart of a management server-implemented process for changing the monitoring method of a logical page in units of application groups.

The flowchart of FIG. 57 shows the processing of a management server 30B module P42 for changing the monitoring method of a logical page in units of application groups. This processing is executed in a case where the monitoring method change set button is pressed in the monitoring method setting screen G10B.

The monitoring method changing module P42 receives an application group identifier and a new monitoring method identifier as input (S330), and, in addition, acquires multiple application entries from the application group management table T41 (S331). The monitoring method changing module P42 executes the following steps S333 through S335 for all the application entries (S332).

The monitoring method changing module P42 uses the application identities of the application entries to acquire multiple virtual volume entries from the application group management table T41 (S333). The monitoring method changing module P42 executes the following step S335 for all the virtual entries (S334).

The monitoring method changing module P42 uses the virtual volume identifier and the new monitoring method identifier as input and calls the logical page monitoring method selection module P35 (S335).

The monitoring method changing module P42 overwrites the monitoring method identifier C401 of the application-group-unit tier residence ratio reference value management table T40 with the new monitoring method identifier (S336).

Figure 58:
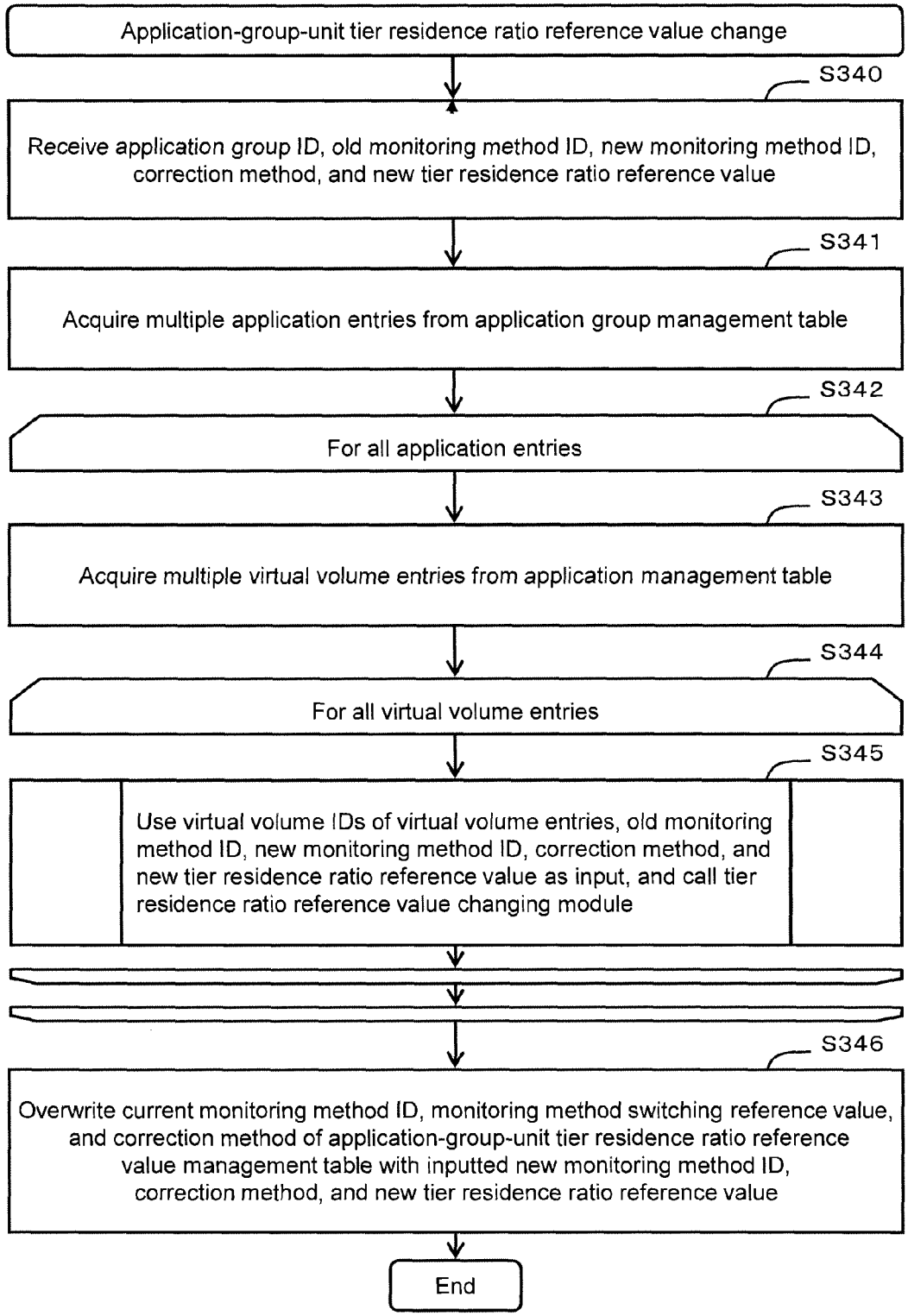
FIG. 58 is a flowchart of a management server-implemented process for changing the reference value of a tier residence ratio in units of application groups.

The flowchart of FIG. 58 shows the processing of a management server 30B module P43 for changing the reference value of the tier residence ratio in units of application groups. This processing is executed in a case where the set button for changing the reference value of the tier residence ratio has been pressed in the monitoring method setting screen G10B.

The reference value changing module P43 receives an application group identifier, an old monitoring method identifier, a new monitoring method identifier, a correction method, and a new tier residence ratio reference value as input (S340).

The reference value changing module P43 acquires multiple application entries from the application group management table T41 (S341), and executes the following steps S343 through S345 for all the application entries (S342).

The reference value changing module P43 acquires multiple virtual volume entries from the application group management table T41 (S343), and executes the following step S345 for all the virtual volume entries (S344).

The reference value changing module P43 uses the virtual volume identifiers of the virtual volume entries, the old monitoring method identifier, the new monitoring method identifier, the correction method, and the new tier residence ratio reference value as input and calls the tier residence ratio reference value changing module P38 described above (S345).

The reference value changing module P43 updates the application-group-unit tier residence ratio reference value management table T40 (S346). The reference value changing module P43 respectively overwrites the current monitoring method identifier C401, the monitoring method switching reference value C402 and the correction method C403 with the new monitoring method identifier, the correction method, and the new tier residence ratio reference value inputted in Step S340.

Configuring this example in this manner also achieves the same effects as the second example. In addition, in this example, user usability can be increased even more since the monitoring method and so forth are configured in units of application groups.

The present invention is not limited to the embodiment described hereinabove, and various changes are possible without departing from the gist thereof.

For example, in the embodiment, the monitoring period changing part GP104 shown in FIGS. 41 and 51 is described as being for the user to manually rewrite the value of the tier residence ratio computation monitoring period management table T36 of FIG. 18. Instead, the configuration may be such that the monitoring period changing part GP104 is used for rewriting the value of the number of monitoring periods C332 of the monitoring method definition table T33 of FIG. 15. The determination of an allocation-destination tier can be directly affected by the user manually changing the period for calculating the I/O evaluation value for each monitoring method.

For example, the present invention can be expressed as a computer program invention as follows.

"A computer program for managing a storage system using a computer,
wherein the storage system comprises a virtual logical volume for provision to a host computer, and a pool comprising multiple storage tiers with respectively different performance, and, in addition, is configured so as to associate multiple logical storage areas comprising the virtual logical volume with a storage area in an instructed prescribed storage tier of the multiple storage tiers, and to allocate this storage area to the prescribed storage tier,
wherein the computer program causes the computer to respectively execute the steps of:
information collection for collecting prescribed information from the storage system;
access load evaluation for evaluating the access load for each of the logical storage areas on the basis of the prescribed information;
allocation time information calculation for calculating allocation time information related to the time at which the each logical storage area is allocated to an allocation-destination storage tier; and a reallocation instruction for determining the each logical storage area to be allocated to any of the respective storage tiers on the basis of the access load and the allocation time information."

REFERENCE SIGNS LIST

10 Host computer
20 Storage system
30, 30A, 30B Management server
P30 Storage management program

The invention claimed is:

1. A storage system management apparatus for managing a storage system, the storage system including a pool comprising storage tiers with respectively different performances, and a virtual logical volume formed by logical storage areas, to be provided to a host computer, and configured to allocate a logical storage area to an instructed prescribed storage tier of the storage tiers, the storage system management apparatus comprising:
 a non-transient memory storing a storage management program, and
 a processing unit configured to execute the storage management program to:
  (1) collect prescribed information from the storage system;
  (2) produce an evaluation of an access load for each of the logical storage areas based on the prescribed information;
  (3) calculate allocation time information, which is a ratio between a time at which each of the logical storage areas is allocated to a highest performance storage tier and a prescribed allocation reference period;
  (4) determine a storage tier for each of the logical storage areas based on the access load of the logical storage areas and the allocation time information; and
  (5) provide a reallocation instruction to the storage system based on a result of the determining of the storage tier.

2. The storage system management apparatus according to claim 1, wherein the processing unit is further configured to execute the storage management program to:
 select a monitoring mode from a plurality of monitoring modes; and
 processing the evaluation of the access load based on the selected monitoring mode.

3. The storage system management apparatus according to claim 2, wherein the selection of the monitoring mode is processed based on the allocation time information.

4. The storage system management apparatus according to claim 3, wherein the selection of the monitoring mode is processed by comparing the allocation time information and preconfigured monitoring mode selection reference information.

5. The storage system management apparatus according to claim 4, wherein the selection of the monitoring mode comprises:
 for each of the logical storage areas, selecting a candidate for the monitoring mode; and
 selecting a most numerous monitoring mode from the candidates, as the selected monitoring mode.

6. The storage system management apparatus according to claim 4, wherein the selection of the monitoring mode comprises:
 for each of the logical storage areas, selecting a candidate of the monitoring mode;
 selecting a monitoring mode from candidates differing from a current monitoring mode, as the selected monitoring mode.

7. The storage system management apparatus according to claim 4, wherein the processing unit is further configured to execute the storage management program to:
 (6) select a user-selected monitoring mode as the selected monitoring mode.

8. The storage system management apparatus according to claim 7, wherein the processing unit is further configured to execute the storage management program to:
 (7) display the access load, the allocation time information, and the result of the determination in a setting screen for selection by a user.

9. The storage system monitoring apparatus according to claim 4, wherein the processing unit is further configured to execute the storage management program to:
 (8) in the setting screen, accept the prescribed allocation reference period.

10. The storage system management apparatus according to claim 2, wherein the monitoring mode is selected for each of the virtual logical volumes.

11. The storage system management apparatus according to claim 2, wherein the selection of the monitoring mode is processed based on a type of an application program executed by the host computer.

12. The storage system monitoring apparatus according to claim 1, wherein:
 the monitoring modes include at least a first monitoring mode and a second monitoring mode,
 a second monitoring period of the second monitoring mode is set so as to be longer than a first monitoring period of the first monitoring mode, and
 the evaluation is processed based on a number of access requests issued from the host computer to the virtual logical volume within a selected period which is the first monitoring period or the second monitoring period.

13. A computer system comprising:
 a host computer;
 a storage system which includes a pool comprising storage tiers with respectively different performances, and a virtual logical volume formed by logical storage areas, to be provided to a host computer, and which is configured to allocate a logical storage area to an instructed prescribed storage tier of the storage tiers; and
 a storage system management apparatus configured to
  (1) collect prescribed information from the storage system;
  (2) produce an evaluation of an access load for each of the logical storage areas based on the prescribed information;
  (3) calculate allocation time information, which is a ratio between a time at which each of the logical storage areas is allocated to a highest performance storage tier and a prescribed allocation reference period;
  (4) determine a storage tier for each of the logical storage areas based on the access load of the logical storage areas and the allocation time information; and
  (5) provide a reallocation instruction to the storage system based on a result of the determination.

14. The computer system according to claim 13, wherein the storage system management apparatus is configured to:
 select a monitoring mode from a plurality of monitoring modes; and
 process the evaluation based on the selected monitoring mode.

15. The computer system according to claim 14, wherein the selection of the monitoring mode is processed based on the allocation time information.

16. The storage system management apparatus according to claim 15, wherein the selection of the monitoring mode is processed by comparing the allocation time information and preconfigured monitoring mode selection reference information.

17. The storage system management apparatus according to claim 16, wherein the selection of the monitoring mode is processed by:
- for each of the logical storage areas, selecting a candidate of the monitoring mode;
- selecting a most numerous monitoring mode from candidates for the monitoring mode as the selected monitoring mode.

18. The storage system management apparatus according to claim 16, wherein the selection of the monitoring mode is processed by:
- for each of the logical storage areas, selecting a candidate of the monitoring mode;
- selecting the monitoring mode from candidates differing from a current monitoring mode, as the selected monitoring mode.

19. A storage system monitoring apparatus according to claim 16, wherein the processing unit is further configured to:
- (8) in the setting screen, accept the prescribed allocation reference period.

20. The storage system management apparatus according to claim 14, wherein the selection of the monitoring mode is processed based on a type of an application program executed by the host computer.

* * * * *